US012718078B2

(12) United States Patent
Hopkins et al.

(10) Patent No.: US 12,718,078 B2
(45) Date of Patent: Aug. 25, 2026

(54) MECHANICAL NEURAL NETWORKS: ARCHITECTED MATERIALS THAT LEARN BEHAVIORS

(71) Applicant: THE REGENTS OF THE UNIVERSITY OF CALIFORNIA, Oakland, CA (US)

(72) Inventors: Jonathan Brigham Hopkins, Los Angeles, CA (US); Erwin A.B. Mulder, Nieuwegein (NL); Ryan Hansen Lee, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 566 days.

(21) Appl. No.: 18/356,351

(22) Filed: Jul. 21, 2023

(65) Prior Publication Data

US 2024/0028882 A1 Jan. 25, 2024

Related U.S. Application Data

(60) Provisional application No. 63/369,065, filed on Jul. 21, 2022.

(51) Int. Cl.
*G06N 3/063* (2023.01)
*G06N 3/04* (2023.01)

(52) U.S. Cl.
CPC ............... *G06N 3/063* (2013.01); *G06N 3/04* (2013.01)

(58) Field of Classification Search
CPC ............ G06N 3/04; G06N 3/06; G06N 3/063; G06N 3/08
See application file for complete search history.

(56) References Cited

U.S. PATENT DOCUMENTS 10,065,322 B2 9/2018 Hopkins
2024/0010329 A1* 1/2024 Griffin ...................... B64F 5/60

OTHER PUBLICATIONS

LeCun, Yann, et al., "Deep learning", Nature, vol. 521, 2015, pp. 436-444.
Tait, Alexander N., et al., "Neuromorphic photonic networks using silicon photonic weight banks", Scientific Reports, vol. 7, Issue 7430, 2017, pp. 1-10.
Gao, Hongbo, et al., "Object classification using CNN-based fusion of vision and LIDAR in autonomous vehicle environment" IEEE Transactions on Industrial Informatics, vol. 14, No. 9, Sep. 2018, pp. 4224-4231.

(Continued)

*Primary Examiner* — William Spieler
(74) *Attorney, Agent, or Firm* — O'BANION & RITCHEY LLP; John P. O'Banion

(57) ABSTRACT

A beam for use in a lattice of beams of a mechanical neural-network (MNN) which can form a metamaterial configured to learn a set of properties by exposure to continuous external loads. Each beam of the lattice is configured to change its stiffness in response to external load input. A lattice of the MNNs is configured to learn by tuning the stiffness of its constituent beams in the MNN. The lattice can be either two or three dimensional, and configured to occupy volumes of arbitrary shape. The MNN has multiple layers of nodes, wherein each said node is analogous to the neurons within an artificial neural network.

24 Claims, 37 Drawing Sheets

(56) References Cited

OTHER PUBLICATIONS

McCulloch, Warren S., et al., "A logical calculus of the ideas immanent in nervous activity", Bulletin of Mathematical Biophysics, vol. 5, 1943, pp. 115-133.
Rosenblatt, Frank, "The perceptron: A probabilistic model for information storage and organization in the brain" Psychological Review, vol. 65, No. 6, 1958, pp. 386-408.
Abiodun, Oludare Isaac, et al., "Comprehensive review of artificial neural network applications to pattern recognition", IEEE Access 7, 2019, pp. 158820-158846.
Hornik, Kur, et al., "Multilayer feedforward networks are universal approximators". Neural Networks, vol. 2, Issue 5, 1989, pp. 359-366.
Prezioso, M et al., "Training and operation of an integrated neuromorphic network based on metal-oxide memristors", Nature, vol. 521, May 7, 2015, pp. 61-64.
Zhang, Hai-Tian, et al., "Reconfigurable perovskite nickelate electronics for artificial intelligence", Science, vol. 375, Feb. 4, 2022, pp. 533-539.
Lee, S et al., "SiO2 fin-based flash synaptic cells in AND array architecture for binary neural networks", IEEE Electronic Device Letter, vol. 43, pp. 142-145, 2022.
Han, Runze, et al., "A novel convolution computing paradigm based on NOR flash array with high computing speed and energy efficiency", IEEE Transactions on Circuits and Systems-I, Regular Papers, vol. 66, May 2019, pp. 1692-1703.
Shen, Yichen, et al., "Deep learning with coherent nanophotonic circuits", Nature Photonics, vol. 11, Jun. 12, 2017, pp. 441-446.
Zhang, Haichun, et al., "An optical neural chip for implementing complex-valued neural network", Nature Communications, vol. 12, Article No. 457, 2021, pp. 1-11.
Lin, Xing, et al., "All-optical machine learning using diffractive deep neural networks", Science, vol. 361, No. 6406, 2018, pp. 1004-1008.
Wu, Zhicheng, et al., "Neuromorphic metasurface", Photonics Research, vol. 8, Issue 1, 2020, pp. 46-50.
Furuhata, Genki et al., "Physical deep learning based on optimal control of dynamical systems", Phys. Rev. Appl. 15, Apr. 2, 2021, pp. 1-11.
Fuchslin, Rudolf M., et al., "Morphological computation and morphological control: Steps toward a formal theory and applications", Artificial Life, vol. 19, 2013, pp. 9-34.
Brown Eric, et al., "Universal robotic gripper based on the jamming of granular material", PNAS, vol. 107, Nov. 2, 2010, pp. 18809-18814.
Maass, Wolfgang, et al., "Real-time computing without stable states: A new framework for neural computation based on perturbations", Neural Computation, vol. 14, 2002, pp. 2531-2560.
Hauser Helmut, et al., "Towards a theoretical foundation for morphological computation with compliant bodies", Biological Cybernetics, vol. 105, 2011, pp. 355-370.
Coulombe, Jean C., et al., "Computing with networks of nonlinear mechanical oscillators", PLoS One, vol. 12, issue 6, Jun. 2, 2017, e0178663.
Caluwaerts, Ken K. et al., "Locomotion without a brain: Physical reservoir computing in tensegrity structures", Artificial Life, vol. 19, Issue No. 1, 2013, pp. 35-66.
Caluwaerts, Ken K., et al., "SunSpiral, Design and control of compliant tensegrity robots through simulation and hardware validation", Journal of Royal Society Interface, vol. 11, 2014, pp. 1-13.
H. Hauser, A. J. Ijspeert, R. M. Füchslin, R. Pfeifer, W. Maass, The role of feedback in morphological computation with compliant bodies. Biol Cybern. 106, 595-613 (2012).
Nakajima, Kohei, et al., "Information processing via physical soft body", Scientific Reports, vol. 5, Article 10487, May 27, 2015, pp. 1-11.
Hermans, Michiel et al., "Trainable hardware for dynamical computing using error backpropagation through physical media", Nature Communications, vol. 6, pp. 1-8, Mar. 24, 2015.
Wright Logan G., et al., "Deep physical neural networks trained with backpropagation", Nature, vol. 601, Jan. 26, 2022, pp. 549-555.
Schaedler, Tobias A. et al., "Architected cellular materials", Annual Review Material Research, vol. 46, 2016, pp. 187-210.
Zangeneh-Nejad, Farzad, "Analogue computing with metamaterials", Nat. Rev. Mater. 6, 2021, pp. 207-225.
Zuo, S., "Acoustic analog computing system based on labyrinthine metasurfaces", Scientific Reports, vol. 8, Jul. 4, 2018, pp. 1-8.
Hughes, Tyler W., "Wave physics as an analog recurrent neural network", Science Advances, vol. 5, 2019, pp. 1-6.
Poon, Ryan, et al., "Phase-changing metamaterial capable of variable stiffness and shape morphing", Advanced Engineering Materials, vol. 21, Issue 12, Sep. 11, 2019.
Kuppens, P. R., et al., "Monolithic binary stiffness building blocks for mechanical digital machines", ScienceDirect, Extreme Mechanics Letters, vol. 42, 2021, pp. 1-9.
Wei, Kexiang et al., "Vibration characteristics of electrorheological elastomer sandwich beams", Smart Materials and Structures, vol. 20, No. 5, Apr. 2011, pp.
Blanc, Loic, et al., "Flexible medical devices: Review of controllable stiffness solutions", Actuators, vol. 6, Issue 23, 2017, pp. 1-31.
Whitley, Darrell, "An overview of evolutionary algorithms: Practical issues and common pitfalls", Information and Software Technology, vol. 43, 2001, pp. 817-831.
Dolan, Elizabeth D., et al., "On the local convergence of pattern search", SIAM J. Optim, vol. 14, No. 2, 2003, pp. 567-583.

* cited by examiner

710

1010

MECHANICAL NEURAL NETWORKS: ARCHITECTED MATERIALS THAT LEARN BEHAVIORS

CROSS-REFERENCE TO RELATED APPLICATIONS

This application claims priority to, and the benefit of, U.S. provisional patent application Ser. No. 63/369,065 filed on Jul. 21, 2022, incorporated herein by reference in its entirety.

STATEMENT REGARDING FEDERALLY SPONSORED RESEARCH OR DEVELOPMENT

This invention was made with government support under Grant Numbers FA9550-18-1-0459 and FA9550-22-1-0008, awarded by the U.S. Air Force, Office of Scientific Research. The government has certain rights in the invention.

INCORPORATION-BY-REFERENCE OF COMPUTER PROGRAM APPENDIX

Appendix A referenced herein is a computer program listing in a text file entitled "UC-2022-317-2-LA-US-computer_program_appendix_A.txt" created on Jul. 21, 2023 and having a 20 kb file size. The computer program code, which exceeds 300 lines, is submitted as a computer program listing appendix through EFS-Web and is incorporated herein by reference in its entirety.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to mechanical neural networks, and more particularly to a lattice of tunable beams that learn desired behaviors and controlling factors which impact mechanical learning.

2. Background Discussion

Currently a large class of systems rely on the use of discrete actuators receiving input from a remote computer using rules-based programming. Aside from some living tissue, few materials can autonomously learn to exhibit desired behaviors as a consequence of prolonged exposure to unanticipated ambient loading conditions.

Accordingly, a need exists for systems and mechanisms for autonomic learning based on load conditions. The present disclosure fulfills that need and provides additional benefits over existing systems.

BRIEF SUMMARY

The present disclosure introduces a class of architected materials, called mechanical neural networks (MNNs), that achieve this learning capability by tuning the stiffness of their constituent beams similar to how Artificial Neural Networks (ANNs) tune their weights. An example lattice was fabricated to demonstrate its ability to learn multiple mechanical behaviors simultaneously, and a study was conducted to determine the effect of lattice size, packing configuration, algorithm type, behavior number, and linear-versus-nonlinear stiffness tunability on MNN learning as proposed. Thus, this disclosure lays the foundation for Artificially-Intelligent (AI) materials.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only.

DETAILED DESCRIPTION

1. Introduction

Scientists have been inspired by the interconnected network of neurons that constitute biological brains and which enable complex learning with unmatched speed and energy efficiency. Consequently, many have sought to leverage a variety of interconnected electronic networks to mimic natural learning for numerous artificial-intelligence (AI) applications.

Some of the first networks developed for AI purposes were purely mathematical in form, and are referred to generally as Artificial Neural Networks (ANNs).

Figure 1:
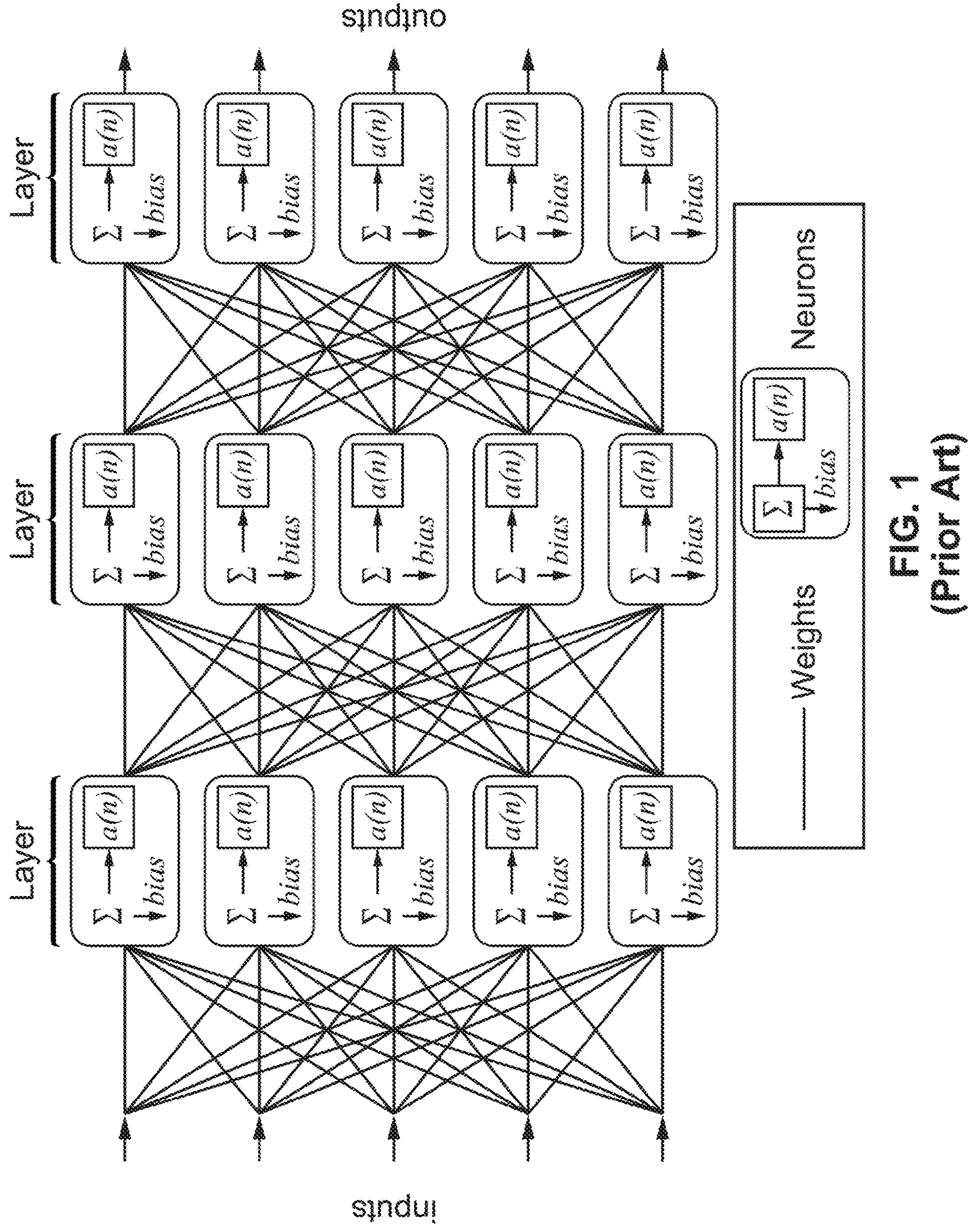
FIG. 1 is an Artificial Neural Network (ANN) for mapping numerical inputs to outputs by tuning scalar weights within layers of neurons consisting of activation functions.

FIG. 1 depicts a diagram of an Artificial Neural Network (ANN) with a mathematical mapping of numerical inputs to outputs by tuning scalar weights within layers of neurons consisting of activation functions. The mathematical formulation underlying ANNs is diagramed here using interconnected lines, that represent scalar values, called weights, which are multiplied by input numbers that are fed into multiple layers of activation functions, called neurons, which ultimately produce output values. If the ANN is provided with a set of known input and output values, the network can be trained by tuning its weights, so that it accurately predicts previously unknown output values that result for any desired input values. The true AI potential of ANNs has been proven by demonstrating that with a sufficiently large number of neurons and layers, ANNs can learn to model almost anything by accurately mapping any number of inputs to any number of outputs. Tuning the weights of large ANNs, however, proved to consume unreasonable amounts of computational time and energy using traditional digital computers.

Thus, further inspired by the physical nature of biological brains, scientists began developing physical networks to more rapidly tune weights (i.e., learn) with higher efficiencies due to their analogue nature. Most of these physical networks can be classified as electrical or optical networks. Although some physical neural networks utilize the vibrations of mechanical structures to improve the speed and efficiency of learning, none yet exist that are purely mechanical. Roboticists have learned to leverage the dynamics of mechanical bodies as a computational resource for enabling mathematical ANNs to be more efficiently trained by restricting only the weights of the final layer to be tuned. This approach, called morphological computation, is a mechanical version of the concept of reservoir computing, where the reservoir used to simplify the mathematical computation is the structure of the robot itself. Networks of springs and point masses, tensioned cables and rigid bodies, as well as soft bodies have been employed to demonstrate this approach. What appears the most mechanical instantiation of a neural network to date consists of a vibrating plate that is excited by acoustic waves as inputs and outputs. Instead of tuning the mechanical properties of the plate itself (i.e., its stiffness, damping, or mass properties) to tune the network's weights, masking signals of interfering acoustic waves were electrically generated to train the network. This concept was recently extended by another researcher using multiple layers of vibrating plates to achieve a deep physical neural network.

2. Disclosed Solution

Figure 2:
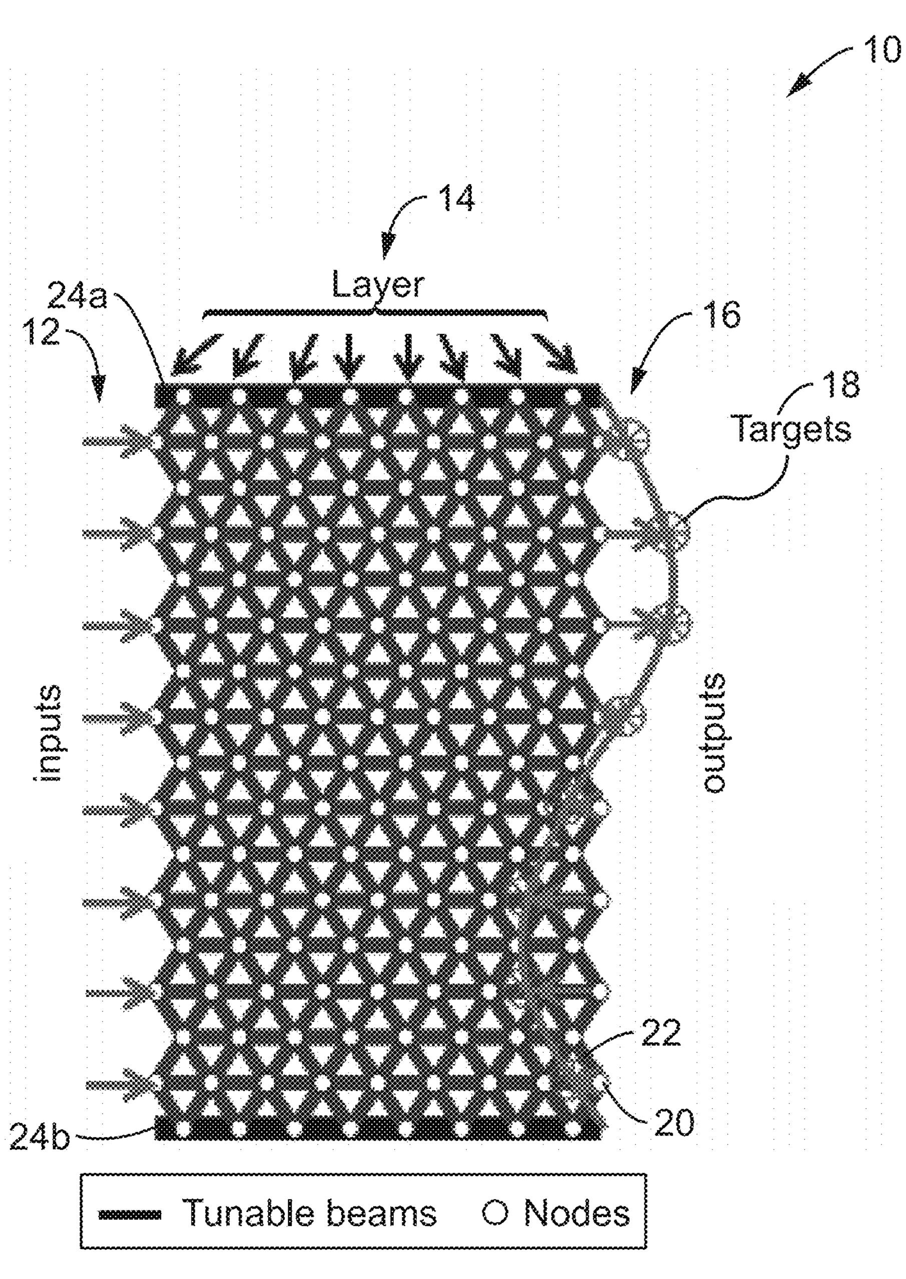
FIG. 2 is a schematic of a Mechanical Neural Network (MNN), according to at least one embodiment of the present disclosure.

FIG. 2 illustrates an example embodiment 10 of a different physical network, called a Mechanical Neural Network (MNN). MNNs are lattices having layers 14 of interconnected tunable beams 22 that join at nodes 20, which are driven by force or displacement inputs 12 and which generate outputs 16 of the nodes to targets 18. In the figure it is seen that certain nodes are anchored at fixed areas, referred to herein as grounds (not to be confused with electrical grounding), exemplified with ground bars 24*a*, 24*b*.

MNNs are mechanical analogues to ANNs in that they map force and displacement inputs and outputs using tunable beams, which are analogous to weights, and physical nodes, which are analogous to neurons. The stiffness values of the interconnected beams are tuned as network weights to train the lattice, such that it can learn desired mechanical behaviors (e.g., shape morphing, acoustic wave propagation, and mechanical computation) and bulk properties (e.g., Poisson's ratio, modulus, and density).

Thus, the present disclosure introduces the first architected materials (a.k.a., mechanical metamaterials) that can learn as a consequence of prolonged exposure to unanticipated ambient loading conditions. Although others have proposed acoustic metamaterials that can perform specific mechanical computations these materials are not neural networks and thus cannot learn. One researcher proposed an acoustic metamaterial that was to behave as a trained neural network, but the fabricated version of the proposed design is unable to learn new behaviors as training is performed during the design process by adjusting the mass within a vibrating plate using simulation.

Unlike these metamaterial concepts, the MNN concept introduced herein is not constrained to two-dimensional (2D) surfaces only, but can be made into three-dimensional (3D) lattices, which occupy volumes of arbitrary shape and accommodate desired fixturing requirements for practical material applications. Additionally, since MNNs inherently possess numerous layers of nodes, which are analogous to the neurons within ANNs, MNNs behave as deep neural networks that can learn many complex behaviors simultaneously. If the MNN lattice is damaged, or cut to occupy an alternate volume, or fixtured differently, it can relearn previously mastered behaviors and acquire new behaviors as needed in response to exposure to changing ambient conditions.

Figure 3:
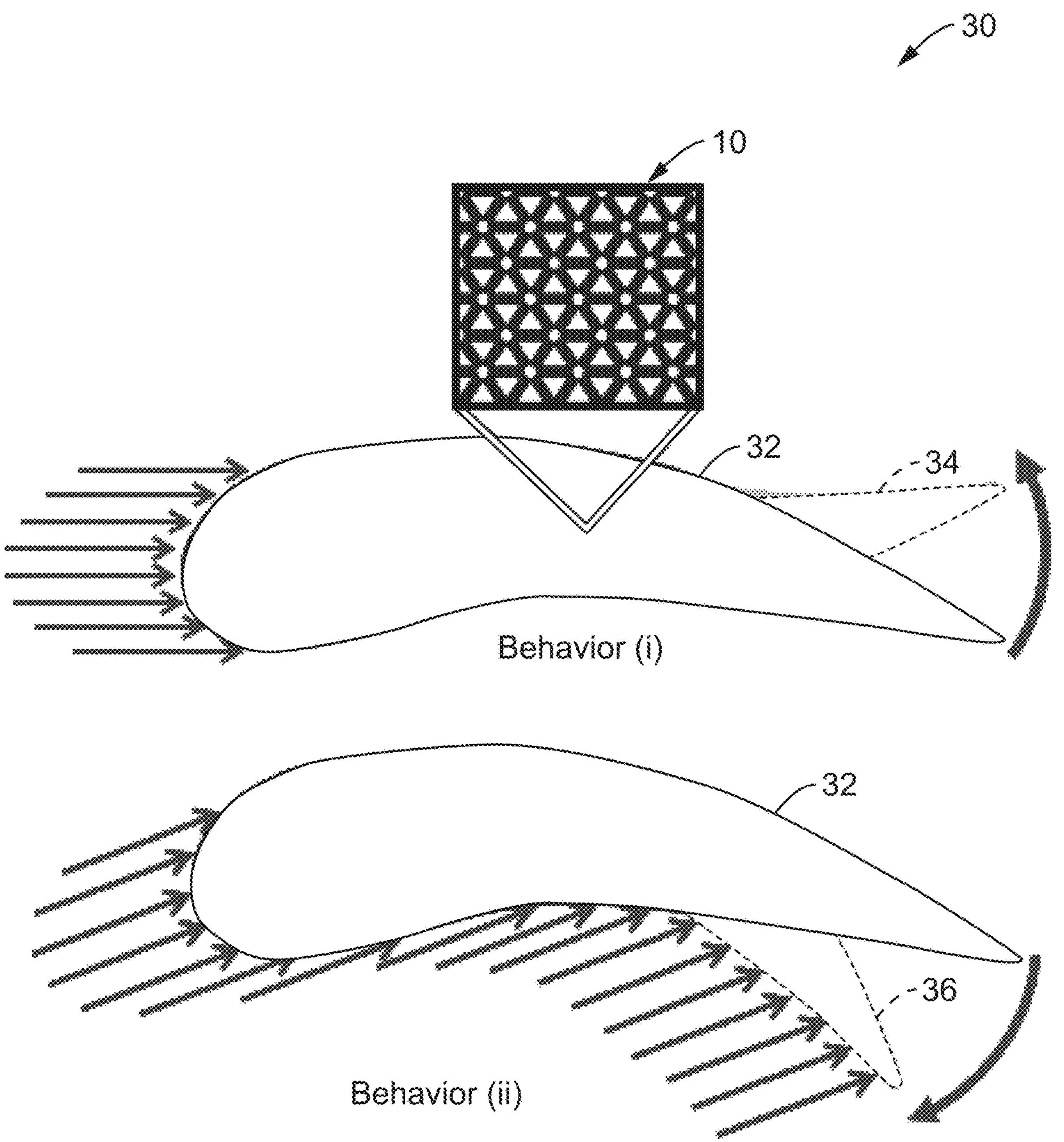
FIG. 3 is a block diagram of MNN lattice use within an aircraft wing application, according to at least one embodiment of the present disclosure.

FIG. 3 illustrates an example application 30 of MNN 10 to an aircraft wing which learns to morph its airfoil shape 32, such as the trailing edge seen moving from its nominal position to position 34 (decreased camber), or to position 36 (increased camber), as well as intermediate positions, as desired in response to certain wind-loading scenarios, such that the aircraft achieves greater efficiency and maneuverability as it accrues flight experience. In addition to introducing the concept, this present disclosure demonstrates the ability of a MNN to learn two different shape-morphing behaviors using two different algorithms. The figure shows two different positions as Behavior (i) and Behavior (ii). Moreover, experimental and simulated studies have been performed to determine the effect of lattice size, packing configuration, algorithm type, behavior number, and linear-versus-nonlinear stiffness tunability on MNN learning.

It should be appreciated, that the disclosed technology can be utilized in a wide range of mechanical and electromechanical systems, such as the wing example, antenna arrays, reflectors (light/radio wave), radar, building supports that learn to keep buildings stable in the event of earthquakes, armor that learns to redirect shock waves away from sensitive areas, material that learns to thermally expand to take on a desired shape when it is subjected to changing temperature, materials that learn to tune their natural frequencies, or materials that learn to focus stress waves like reconfigurable acoustic lenses.

3. MNN Learning Process

Figure 4:
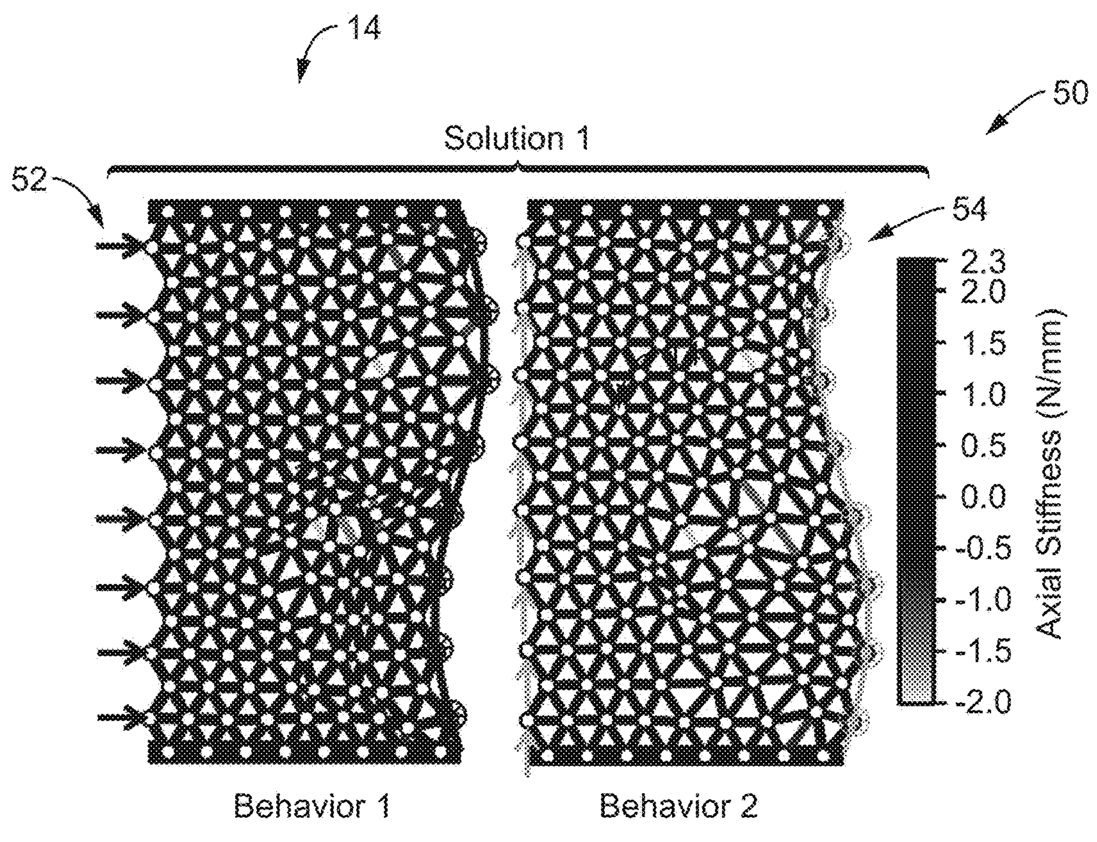
FIG. 4 and FIG. 5 are schematics of shape-morphing behaviors that can be learned by MNN lattices, according to at least one embodiment of the present disclosure.
Figure 5:
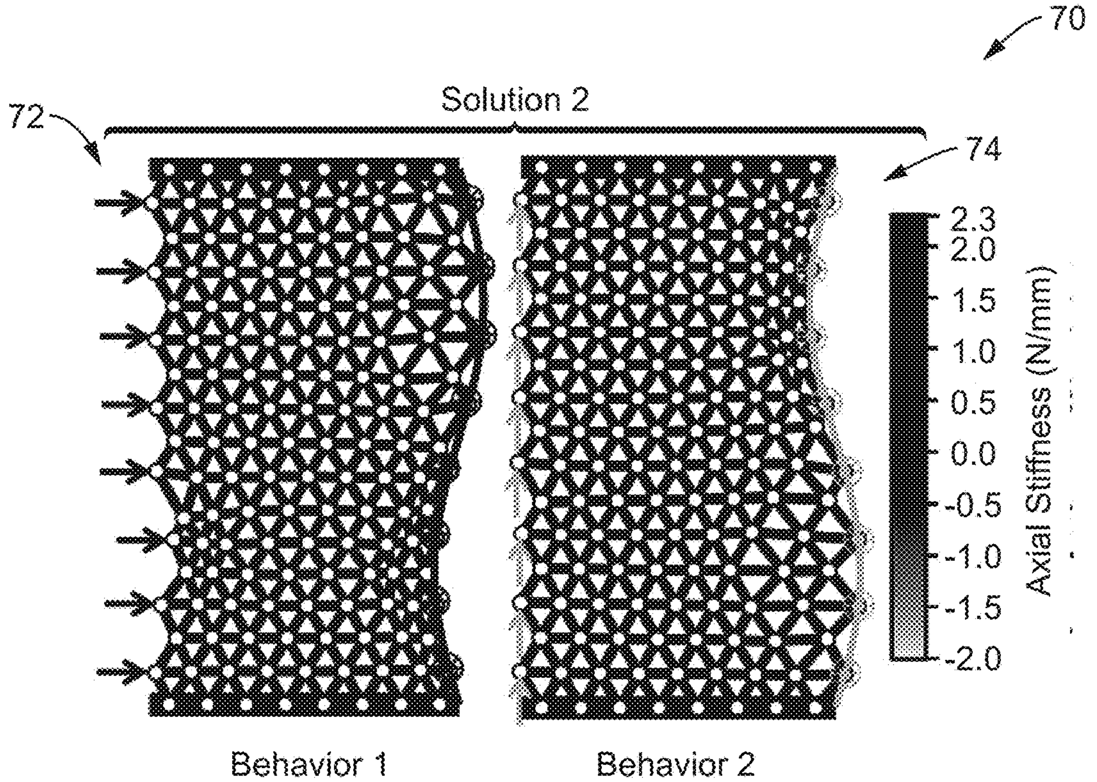

FIG. 4 and FIG. 5 illustrate examples 50, 70 of shape-morphing behaviors that can be learned by MNN lattices of tunable beams. Two different combinations of beam stiffness values (i.e., solutions) are shown in these figures which achieve the same two shape-morphing behaviors.

MNNs mechanically learn behaviors analogously to how ANNs mathematically map numerical inputs to outputs. To understand the specifics of how MNNs learn, consider the 8 layer-deep 2D MNN lattice of tunable beams packed in a triangular configuration with 8 input and output nodes as shown in FIG. 2. It is assumed in this example, that when the input nodes are loaded by equal horizontal forces, shown as arrows from the left in FIG. 2, it is desired that the output nodes respond by moving to target displacements along the contour of the sinusoidal curve shown. To learn this behavior in the midst of unexpected and changing loading scenarios, each tunable beam in the lattice would be prescribed with a random stiffness value. Sensors (e.g., strain gauges on each tunable beam) would then determine the displacement of each node in the lattice for each loading scenario. Since the beam stiffness values and the node displacements are known (i.e., prescribed and measured respectively), the MNN can determine when the lattice has been loaded with the scenario of the desired behavior (i.e., the horizontal forces shown in FIG. 2). Anytime the desired loading scenario occurs, the lattice sensors operate to measure the resulting displacements of the output nodes on the lattice's right side and the Mean Squared Error (MSE) of these displacements would be determined by subtracting them from the target displacements and averaging the resulting differences squared. The tunable beams would then change their stiffness values according to an optimization process, such that when the process of loading, measuring, and determining MSE is repeated, the MSE continues to be minimized until a working combination of beam stiffness values is identified.

One possible combination of beam stiffness values are seen in FIG. 4 which achieve the desired behavior (Behavior 1) 52. Different shades are used to denote different axial stiffness values for the beams interconnecting the nodes.

Suppose it is then desired that the MNN learn another behavior (Behavior 2) 54, in addition to retaining the first behavior 52. Specifically, suppose it is desired that the lattice's output nodes displace to an inverted sinusoidal contour 54, shown as a curve, in response to its input nodes being loaded by equal vertical input forces, instead. To learn the new behavior while maintaining the ability to simultaneously achieve the first behavior, the lattice of tunable beams would begin with the combination of stiffness values that were found to successfully achieve the first behavior. Then those stiffness values would be adjusted according to the same optimization process to find a new combination of stiffness values that achieve both behaviors simultaneously.

This optimization would be achieved by measuring the displacements of the output nodes in response to loading the material's input nodes with alternating horizontal and vertical forces. A single MSE would be determined that simultaneously considers the results of both loading scenarios. That cumulative MSE would then be minimized so that a desired combination of beam stiffness values would be identified that successfully produced both the new and original behavior. It should be noted that all the tunable beams are shown shaded with the same shades between the two corresponding lattice images of FIG. 4 since a single combination of stiffness values was identified that could successfully enable the MNN to achieve both behaviors.

Since MNNs typically possess multiple layers, they can learn the same set of desired behaviors using many different combinations of beam stiffness values.

In FIG. 5 a Solution 2, Behavior 1 72 is shown which exhibits the same desired behaviors as Solution 1 of FIG. 4, yet it accomplishes this solution with an entirely different combination of beam stiffness values. This is carried out as well in Behavior 2 74 showing different stiffness values than that of Behavior 2 54 of FIG. 4. The fact that many different combinations of beam stiffness values can achieve the same behaviors enables MNNs to learn numerous new behaviors. Moreover, MNNs do not require being configured, fixtured, or loaded as shown in the example of FIG. 2 to learn. Any combination of nodes within a MNN can be fixed, loaded as an input, and sensed as an output to learn almost any mechanical behaviors desired.

4. Tunable Beams

Figure 6:
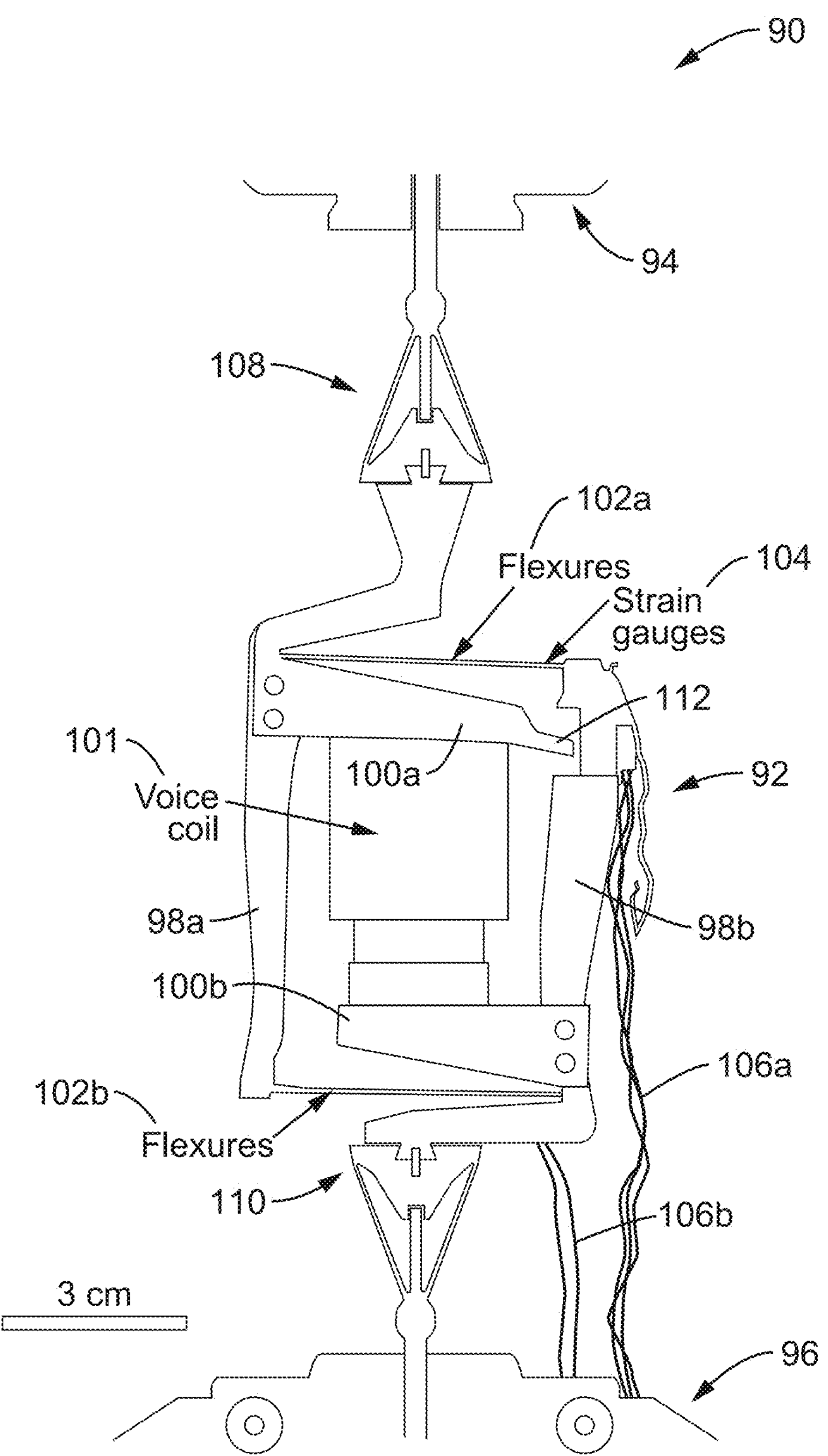
FIG. 6 is a schematic of a tunable beam that uses closed-loop control to achieve variable axial stiffnesses, according to at least one embodiment of the present disclosure.
Figure 7:
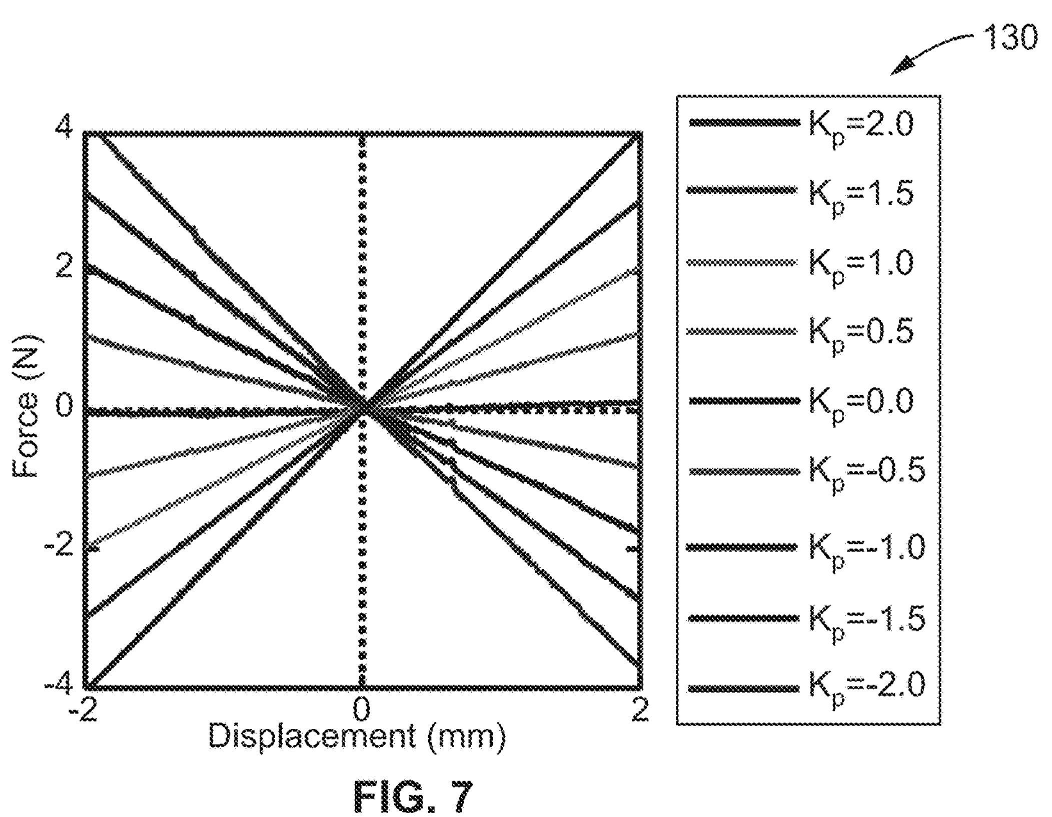
FIG. 7 and FIG. 8 are plots of force and stiffness for the tunable beam of FIG. 6, as obtained for an embodiment of the present disclosure.
Figure 8:
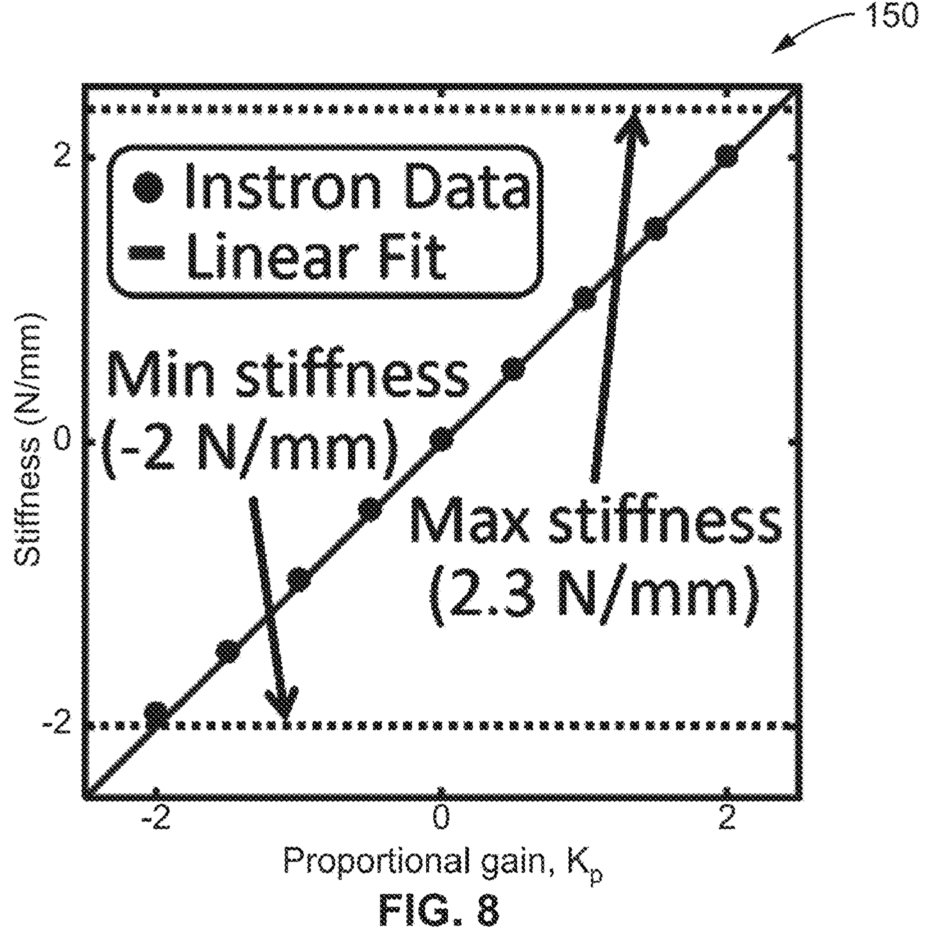

FIG. 6 through FIG. 8 illustrate an example embodiment 90, 130, 150 of a tunable beam that uses closed-loop control to achieve variable axial stiffnesses, and associated plots.

In FIG. 6 a voice coil and strain gauge are used as the actuators and sensor to control axial stiffness of the tunable beam. The beam 92 is shown coupled to fixtures 94 and 96 in this example. A body is formed 98*a*, 98*b*, with structures 100*a*, 100*b* for retaining an actuator 101, exemplified as a voice coil. Flexure bearing 102*a*, 102*b* are configured to allow movement in the desired axis. There are strain gauges 104 to detect position, and wiring 106*a* to connect to the strain gauge, and 106*b* to connect to the voice coil. There are also arrangements of flexures at the input/outputs 108, 110. The beam is also configured with a hard stop 112 (shown with arm travel limited within a notch in the body section) to limit travel.

In FIG. 7 is shown a plot 130 of data collected from an Instron test system as it stretches and compresses the tunable beam while it is actively controlled to achieve linear force-displacement responses using different proportional gain values, Kp.

In FIG. 8 is shown a plot 150 demonstrating how well the controller's prescribed proportional gain corresponds with the beam's resulting axial stiffness. These aspects are described in the follow section in further detail.

There are many ways the stiffness of a beam can be tuned to enable MNN learning. Principles of jamming, phase changing, static balancing, and electrorheology among other approaches can be employed. Approaches that enable beams to continue exhibiting their prescribed stiffness without external influence (e.g., electrical power, magnetic fields, or temperature) are preferable for MNN applications, since such networks physically store a kind of mechanical 'muscle memory' in their architecture for manifesting the desired behaviors previously learned.

Figure 17:
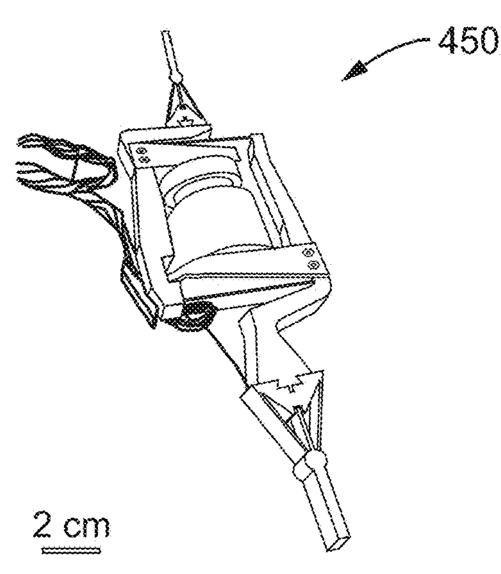
FIG. 17 and FIG. 18 are perspective and plan views of a tunable beam for an MNN, according to at least one embodiment of the present disclosure.
Figure 18:
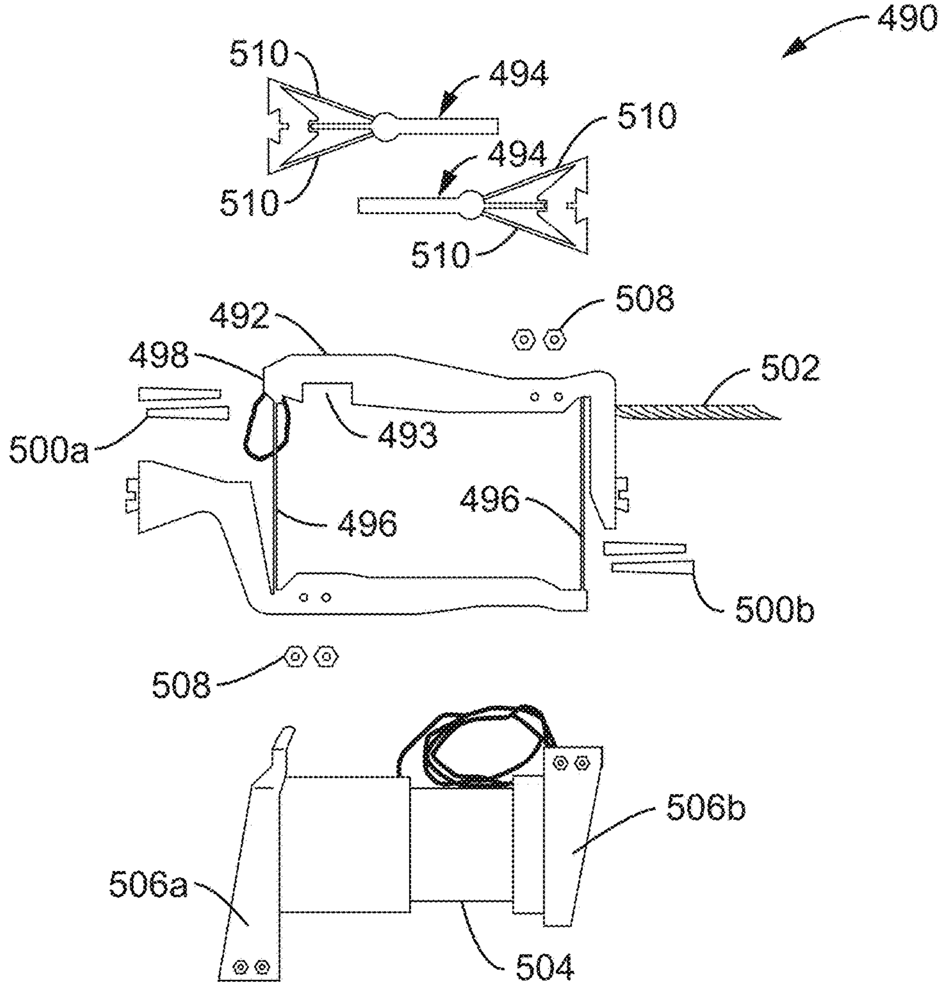
Figure 19:
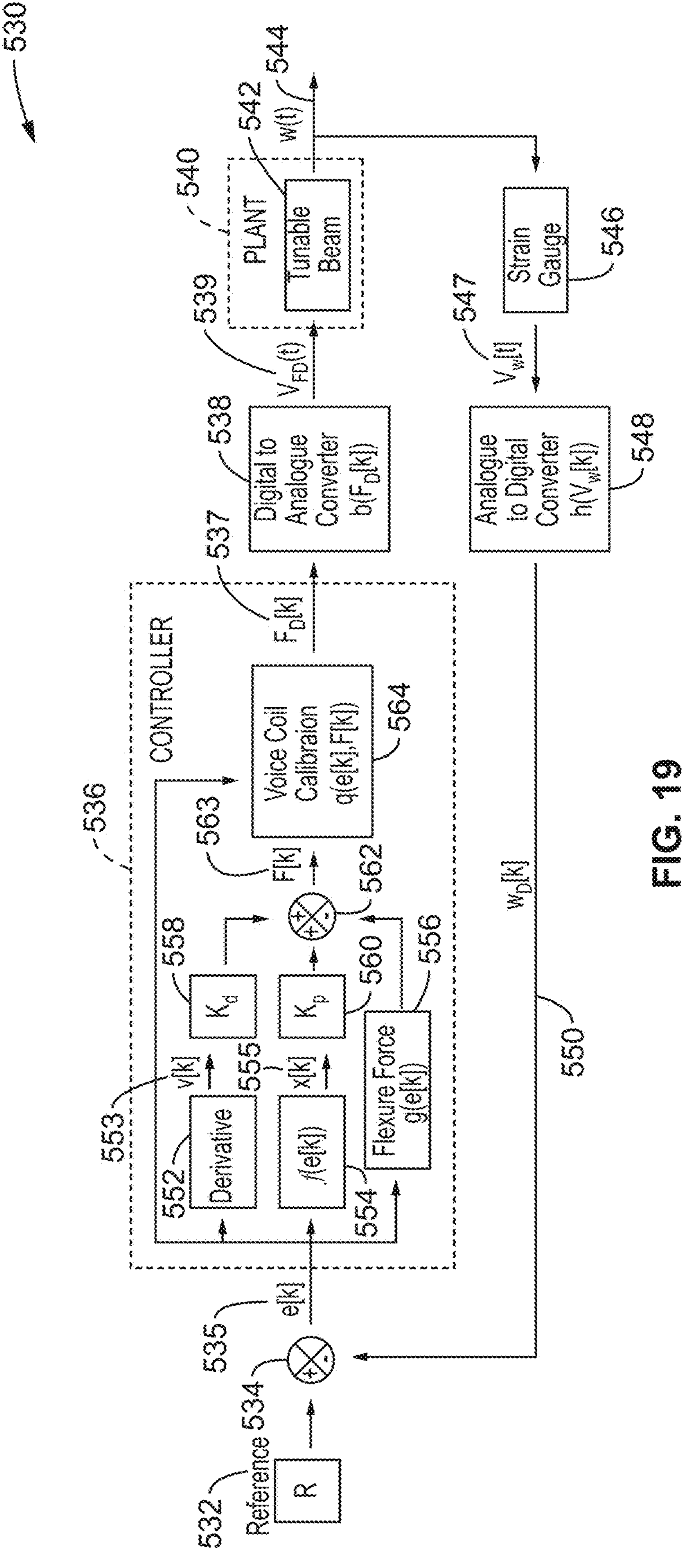
FIG. 19 is a block diagram of a tunable beam proportional-derivative (PD) control system (circuit) to achieve prescribed axial force-displacement responses for the beams of FIG. 17 and FIG. 18, utilized according to at least one embodiment of the present disclosure.
Figure 20:
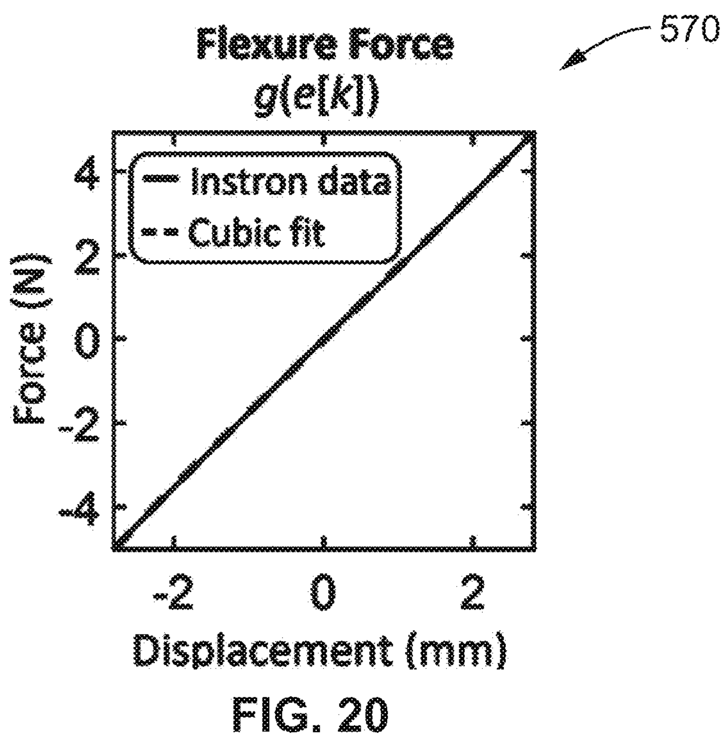
FIG. 20 through FIG. 23 are calibration plots utilized in conjunction with FIG. 19, according to at least one embodiment of the present disclosure.
Figure 21:
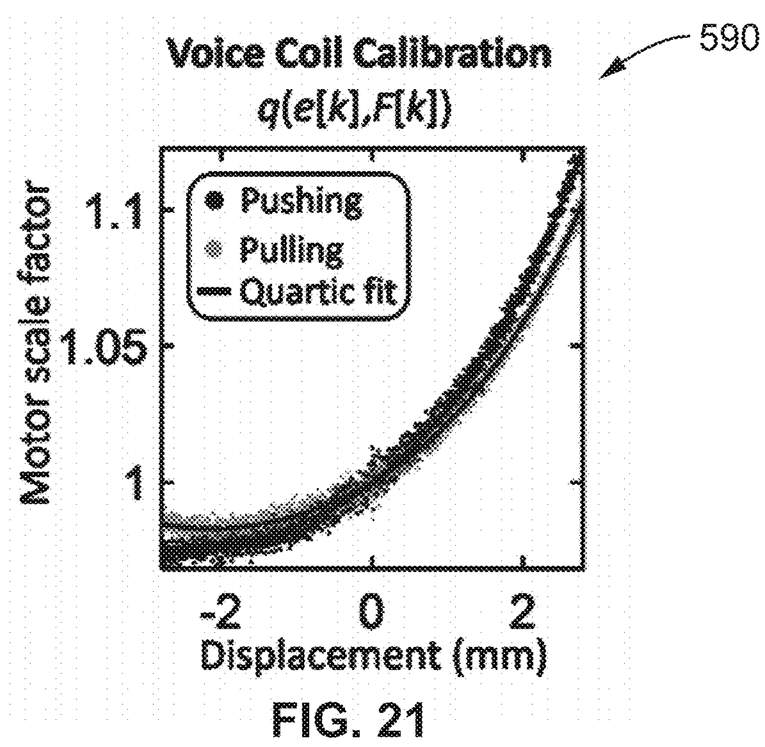

The beams used to demonstrate the concept of MNNs in this present disclosure were shown in FIG. 6, however, were designed to achieve tunable stiffness through using closed-loop active control. This approach was chosen so that any desired linear or nonlinear force-displacement responses (including responses with negative stiffness) can be prescribed to each beam to enable a broader study of MNN learning. These actively controlled beams use an actuator (e.g., voice coils) and position/force (e.g., strain gauges) to actuate and sense the deformations of flexures, which guide the extensions and contractions of the beams along their axes. Additional renderings of such beams are shown in FIG. 17 and their associated parts seen in FIG. 18 are provided with a discussion about the beam's fabrication and function. FIG. 19 describes each beam's closed-loop controller with examples of four calibration plots (FIG. 20 to FIG. 23) that need to be generated by an Instron testing machine to control each beam's axial stiffness. The controller was designed so that when it was set to achieve a linear force-displacement response, the axial stiffness of the tunable beam (i.e., the slope of its response) would be the controller's proportional gain, Kp. FIG. 20 provides the force-displacement responses of the tunable beam in the maximum and minimum stiffness values that the beam can be controlled to achieve without becoming unstable or exceeding the actuator's force capabilities was measured to be 2.3 N/mm and −2 N/mm respectively as shown in FIG. 21.

5. MNN Embodiments 5.1. Introduction.

Figure 9:
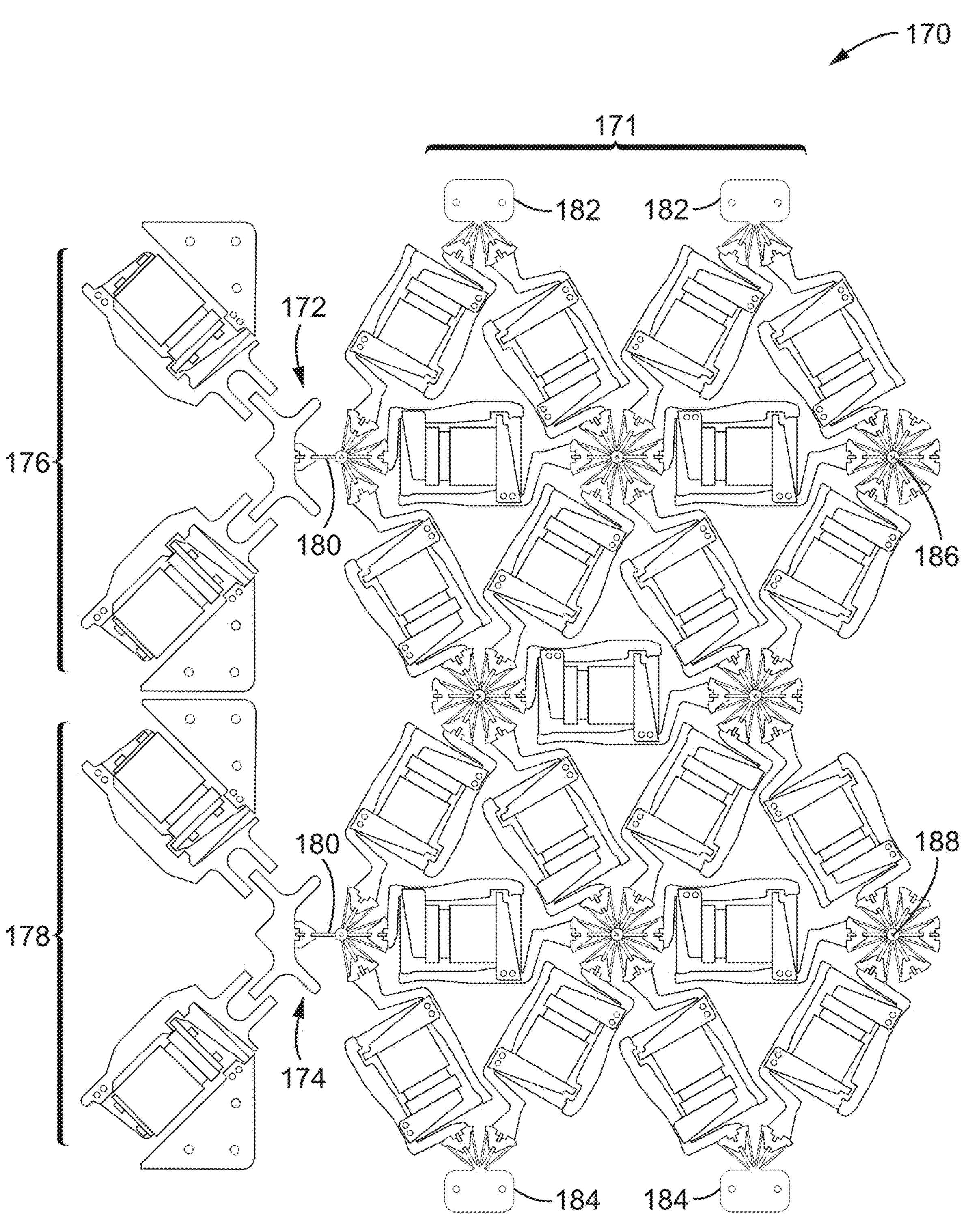
FIGS. 9 and 10 are schematics of a MNN lattice using the beam of FIG. 6, according to at least one embodiment of the present disclosure.
Figure 10:
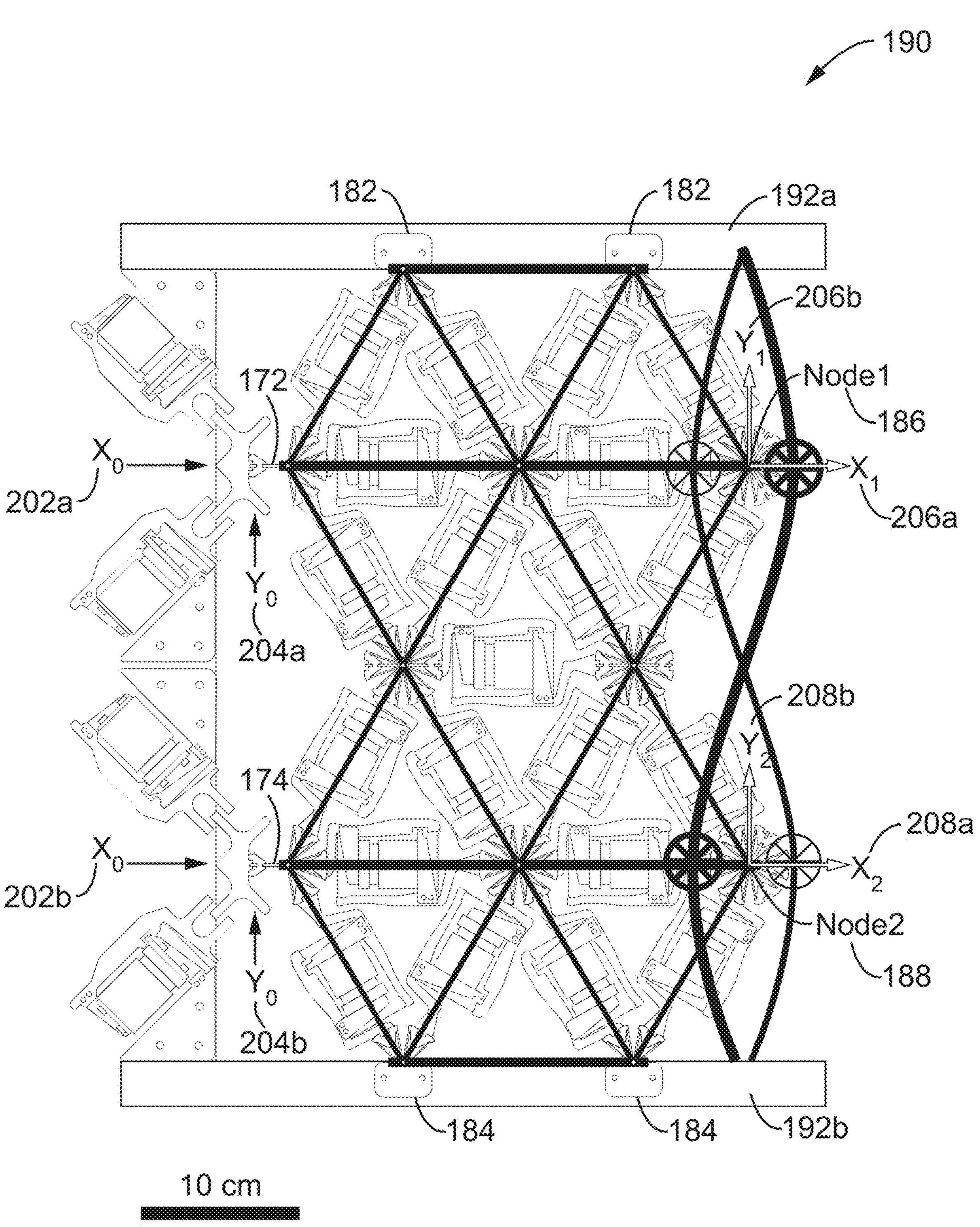

FIG. 9 and FIG. 10 illustrate an example embodiment 170, 190 of a mechanical neural network (MNN) showing tunable beams, as seen in FIG. 6, within a lattice of beams 171 to experimentally demonstrate and study MNN learning. The beams are constrained by grounds 182, 184 at the top and bottom as seen in the figure. Four additional actuators, as seen in FIG. 9 in two pairs 176, 178, were used with decoupling flexures 180 to load the MNN's two input nodes 172, 174 with desired in-plane forces, seen in FIG. 10 as $X_0$ 202*a*, 202*b*, and $Y_0$ 204*a*, 204*b*, which also depict directly measuring the displacements of the two output nodes 186, 188 in directions $X_1$ 206*a*, $Y_1$ 206*b*, for Node 1 186; and $X_2$ 208*a*, $Y_2$ 208*b* for Node 2 188.

The MNN of FIG. 9 is exemplified to comprise 21 tunable beams 171, which were joined together at nodes. In this example, each node comprises blade flexures, which permit rotational deformations at each node's center and thereby allow the MNN's lattice to freely deform as it is loaded. The MNN's two input nodes 172, 174 are each loaded by a pair of voice coil actuators 176, 178, that collectively allow their corresponding input node to be loaded with a force that points in any direction within the lattice's plane. These actuators are fixtured within decoupling flexures 180 that enable each input node to displace appreciable amounts without imparting transverse jamming loads on the actuators themselves. Hard stops are provided to prevent any flexure within the lattice from yielding as they deform. Two pairs of grounded nodes 182, 184 are fixtured to a frame (shown as element 192*a*, 192*b* in FIG. 10) along the top and bottom of the two-layer deep MNN. For the sake of testing displacement sensors (e.g., two cameras) are mounted on the same frame to directly measure the displacement of the two output nodes by tracking pins inserted at their center so as to determine the response of the system during this testing.

In FIG. 10 is shown the state of the desired in-plane forces at the input side on nodes 172, 174, showing displacements $X_0$ 202*a*, 202*b*, and $Y_0$ 204*a*, 204*b*, as well as showing output displacements at Node 1 186 and Node 2 188 of $X_1$ 206*a*, $Y_1$ 206*b*, and $X_2$ 208*a*, $Y_2$ 208*b*.

Figure 26:
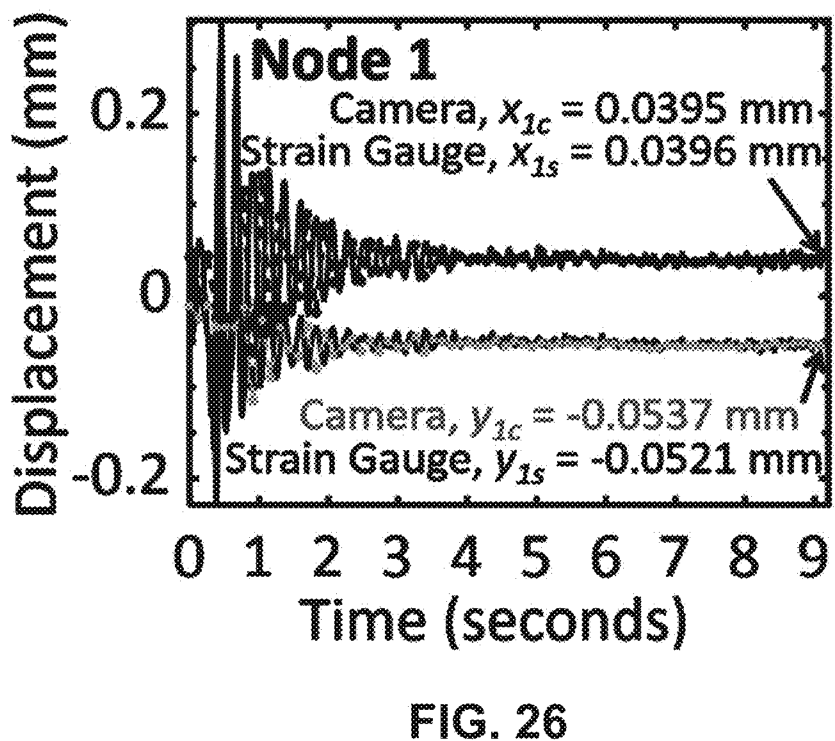
FIG. 26 and FIG. 27 are plots of camera-based validation of the strain-gauge approach for sensing output nodes of an MNN, as obtained for an embodiment of the present disclosure.
Figure 27:
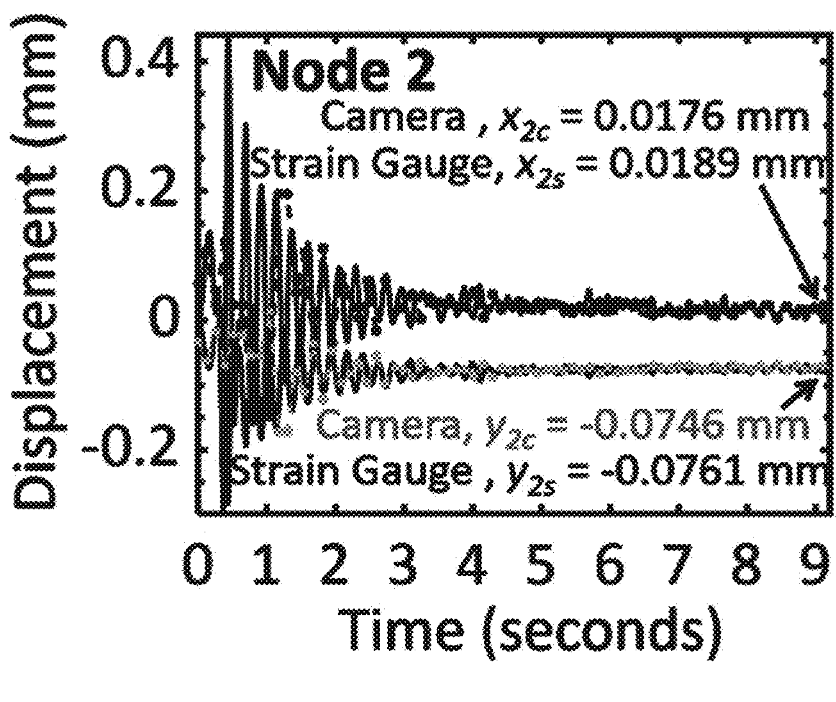

Creating MNNs that require external sensors (e.g., cameras) to directly measure the displacements of their output nodes cannot learn without being placed in a testing rig, which is not practical for most applications that require in-field learning. Thus, it's important that the same sensors (e.g., strain gauges) that measure and help control the extension and contraction of their corresponding beams be also used to measure the output-node displacements indirectly to demonstrate practical MNN learning. Cameras mounted to a frame of the MNN were used to validate this indirect approach (i.e., the strain-gauge approach) for measuring output-node displacements. The results of this validation are seen in FIG. 26 and FIG. 27.

Figure 11:
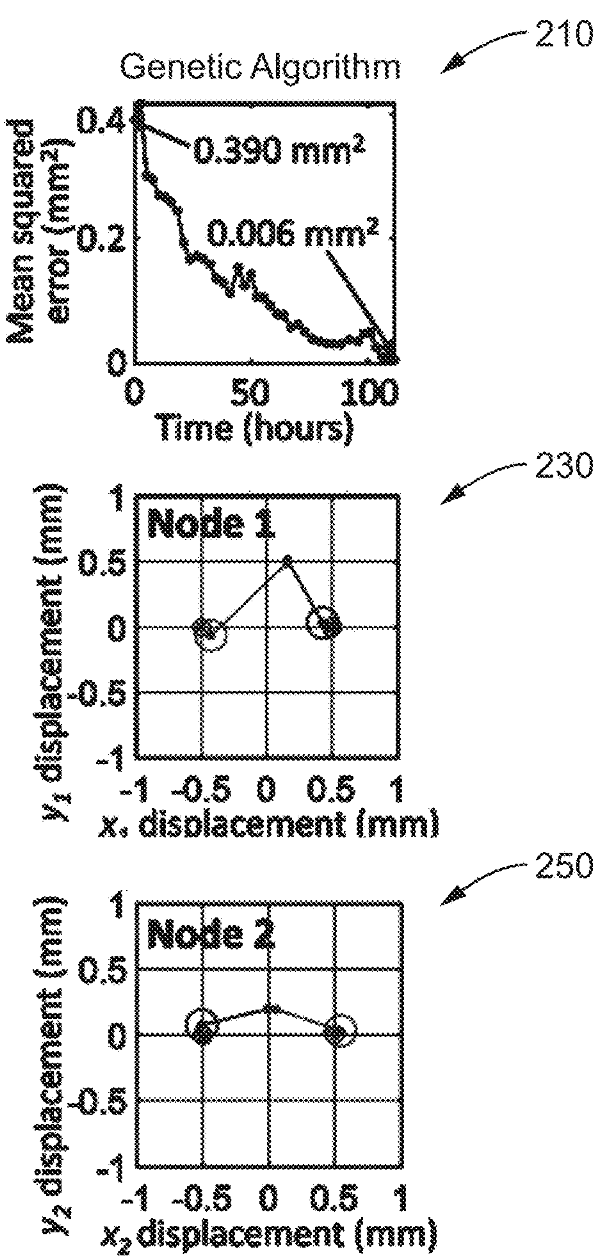
FIG. 11 and FIG. 12 are plots of results for two learned behaviors for the MNN of FIG. 10, according to at least one embodiment of the present disclosure.
Figure 11:
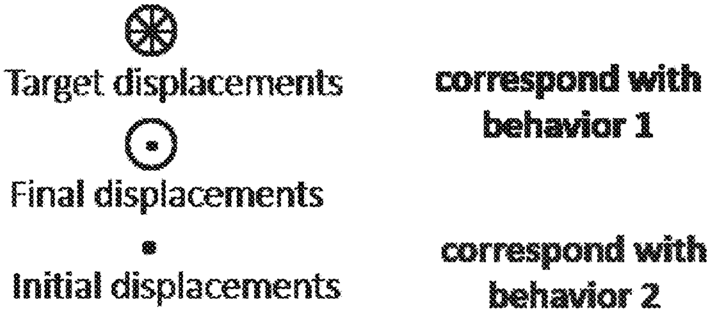
Figure 12:
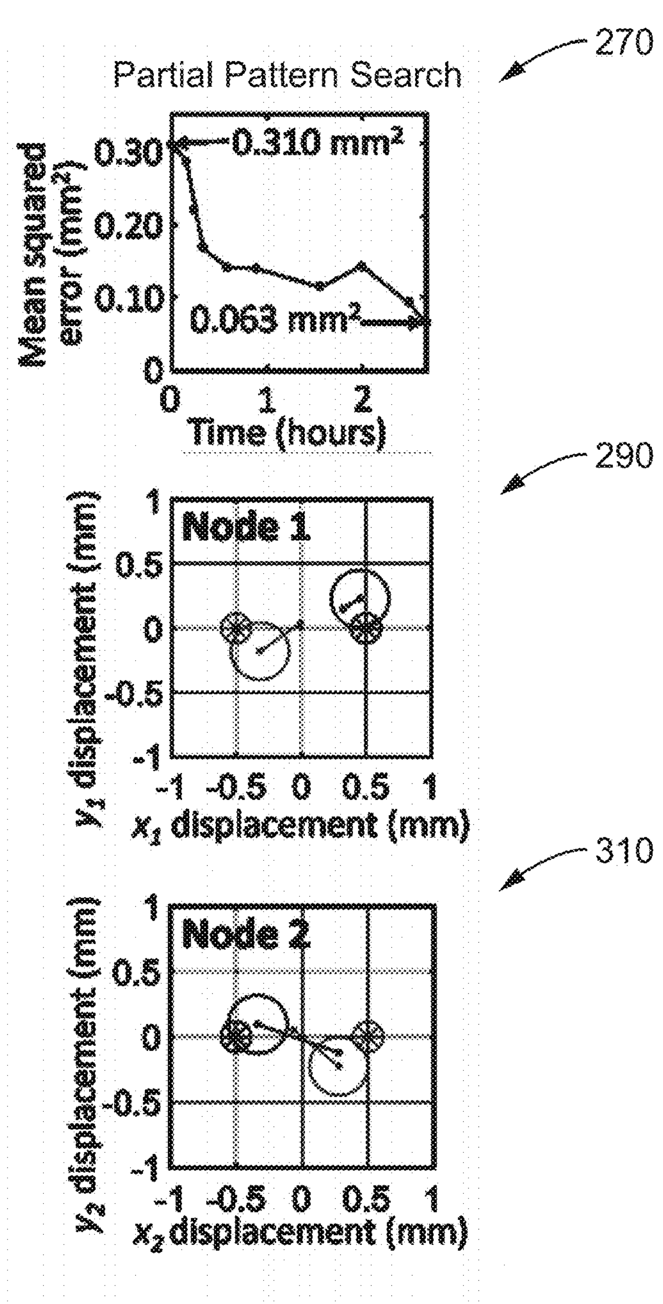
Figure 12:
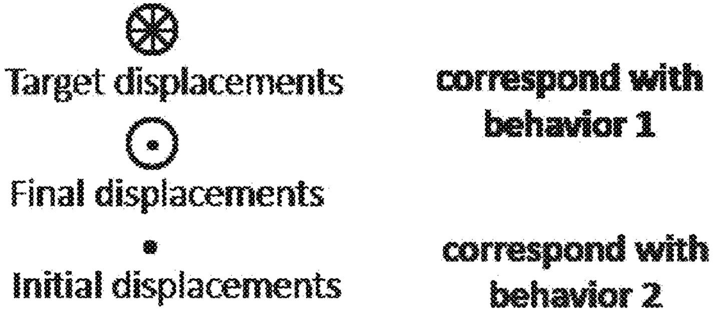

FIG. 11 and FIG. 12 illustrate examples 210, 230, 250, 270, 290 and 310, depict plots of experimental study results. In these figures, two different behaviors are shown that the mechanical neural network (MNN) attempted to learn using two different optimization algorithms. The results are seen in FIG. 11 of the genetic algorithm (GA) and in FIG. 12 of partial pattern search (PPS) showing mean squared error (MSE) over time and the initial and final displacements of the output nodes (i.e., Nodes 1 and 2) relative to their target displacements.

Thus, FIG. 11 and FIG. 12 illustrate example results for the concept of MNNs as architected materials that learn behaviors, which was introduced and experimentally demonstrated using two optimization algorithms—Genetic Algorithm (GA) and Partial Pattern Search (PPS). Although GA proved to be more than 41 times slower than PPS (i.e., GA required 111.13 hours whereas PPS required 2.68 hours), the MNN of FIG. 9 learned its behaviors 10.5 times more accurately using the GA (i.e., GA achieved a MSE of 0.006 $mm^2$ whereas PPS achieved 0.063 $mm^2$).

An experimental study was also conducted to compare the learning capabilities of MNNs consisting of tunable beams that are controlled to exhibit linear versus nonlinear stiffness.

Figure 13:
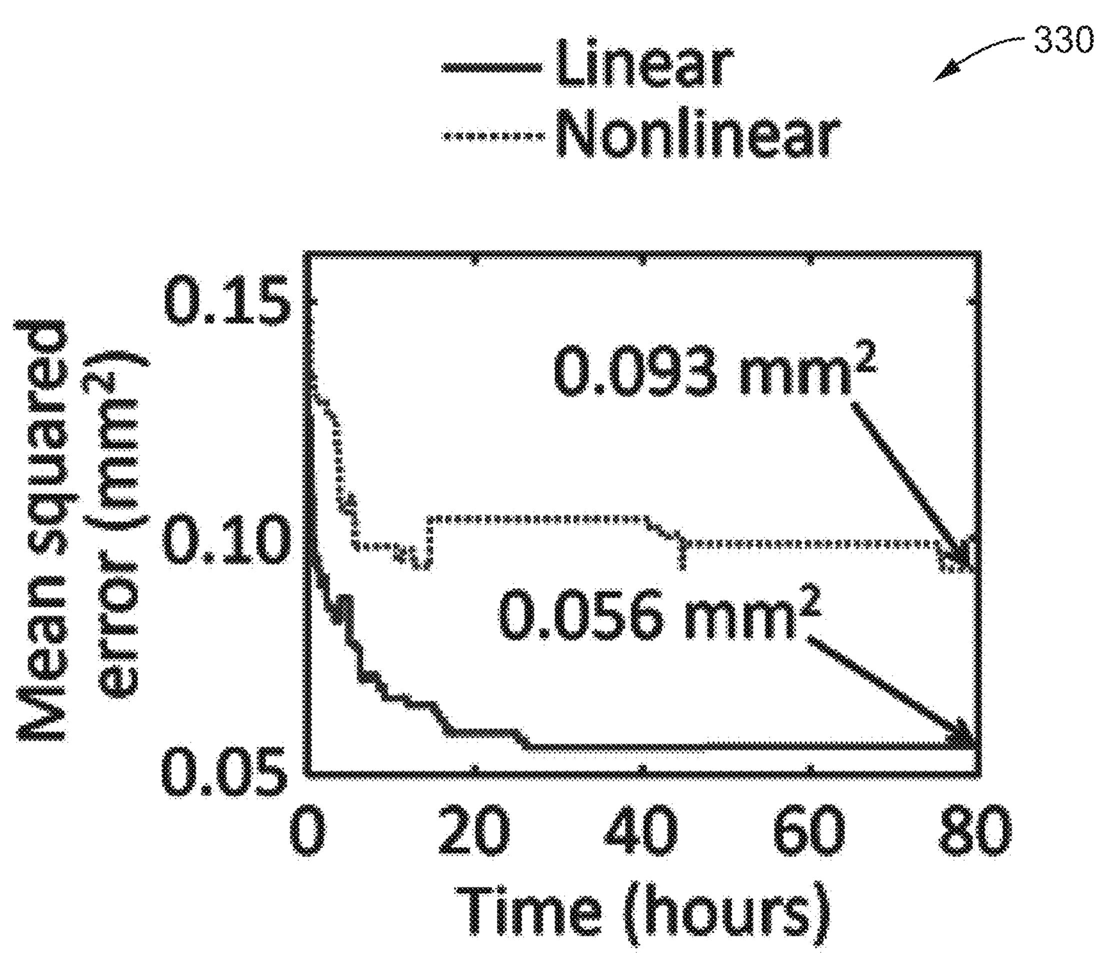
FIG. 13 is a plot of Means Squared Error (MSE) for an MNN over time as its tunable beams are controlled to exhibit tunable linear and nonlinear force-displacement responses, according to at least one embodiment of the present disclosure.

FIG. 13 illustrates an example 330 of Means Squared Error (MSE) for the MNN plotted over time as its beams are controlled to exhibit tunable linear and nonlinear force-displacement responses. The figure shows that MNNs with linear-stiffness beams learn with greater accuracy than MNNs having nonlinear-stiffness beams (i.e., the lowest linear and nonlinear MSE was mm 2 and 0.093 $mm^2$ respectively). A computational tool was also created to simulate the effect of lattice size, number of behaviors, and packing configuration on MNN learning.

The MNN of FIG. 9 was used in conjunction with this strain-gauge approach to demonstrate that a triangular lattice of 21 tunable beams (shown as lines in FIG. 10) can simultaneously learn two different sinusoidal shape-morphing behaviors (Behavior 1 and Behavior 2) using two different optimization algorithms: genetic algorithm (GA), and partial pattern search (PPS). The MSE of each algorithm is plotted in FIG. 13 over time as the MNN learns the two desired behaviors simultaneously, and the initial and final displacements of Node 1 and Node 2, relative to the desired target displacements, are also provided for each behavior.

The MNN of FIG. 10 was also used to compare learning with tunable beams that exhibit linear (e.g., FIG. 7) versus nonlinear force-displacement responses. Specifically, tangent functions (e.g., the responses shown in FIG. 28 for different Kp values) were used for the nonlinear scenario.

5.2. Simulation Study

A computational tool, informed by the measured and modeled characteristics of the tunable beam of FIG. 6, was created and used to simulate MNN learning scenarios.

Three studies were conducted using the tool. The first study simulated how well MNNs can simultaneously learn different random behaviors for different numbers of layers. The second study simulated how lattice size (i.e., layer and output-node number) affects the simultaneous learning of two behaviors. The third study compared how MNNs of different packing configurations (i.e., triangular versus square) simultaneously learn different numbers of random behaviors for different numbers of layers.

Figure 14:
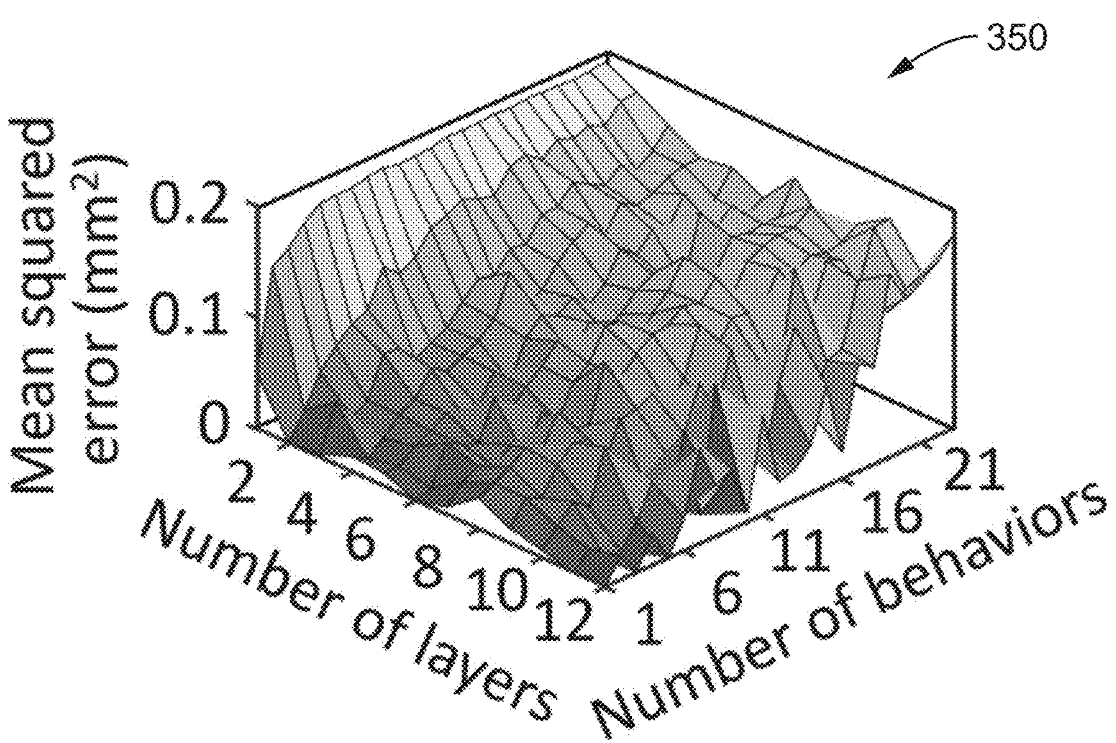
FIG. 14 through FIG. 16 are plots of results for lowest Mean Squared Error (MSE) for different numbers of layers learning different numbers of random behaviors, according to at least one embodiment of the present disclosure.
Figure 15:
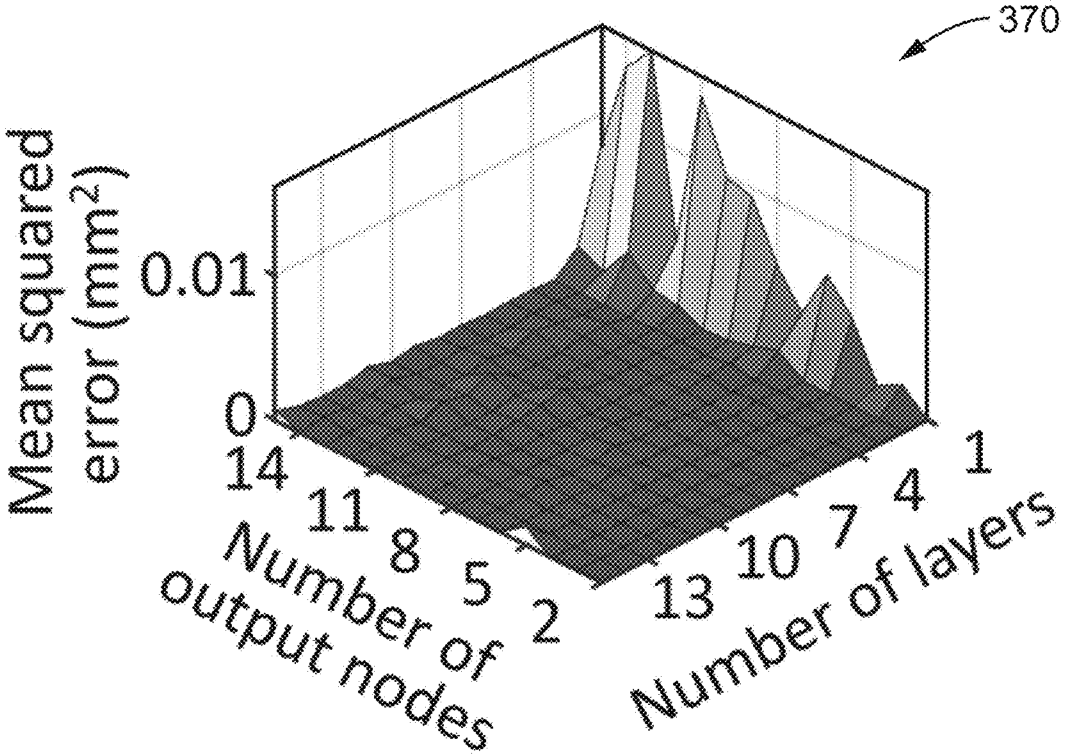
Figure 16:
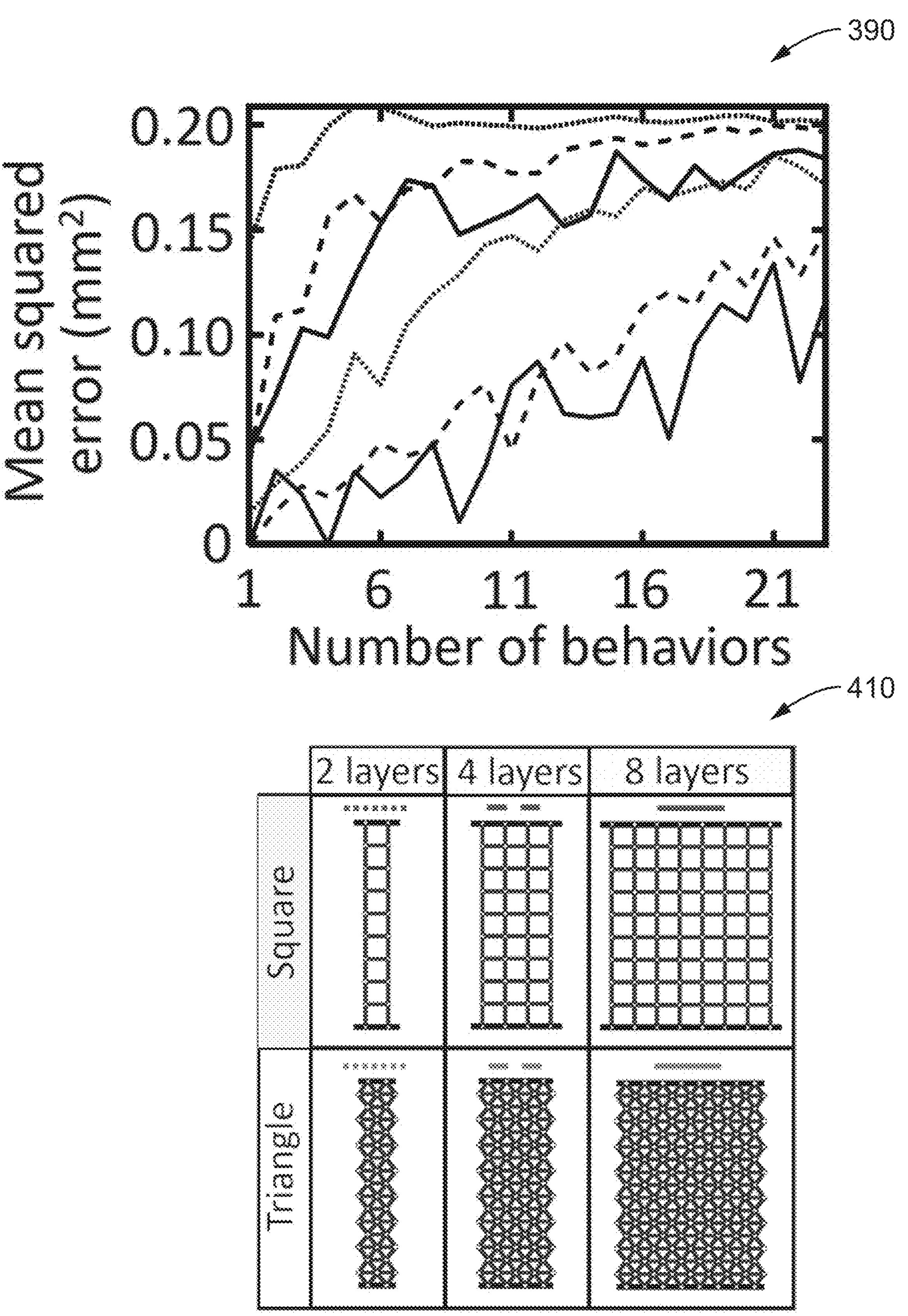

FIG. 14 through FIG. 16 illustrate examples 350, 370, 390, and 410 of simulation study results. A plot of lowest mean squared error (MSE) achieved using mechanical neural networks (MNNs) with different numbers of layers learning different numbers of random behaviors are seen in FIG. 14. A plot of MNNs having different numbers of layers and having different numbers of output nodes which learn the same two behaviors is seen in FIG. 15. A plot of MNNs of different configurations (i.e., triangular and square) learn different numbers of random behaviors as seen at the top of FIG. 16, with the bottom of that figure detailing the specific layers of the square and triangle patterns tested.

Accordingly, FIG. 14 and FIG. 16 demonstrate that the more layers a MNN possesses and the fewer random behaviors it is tasked to simultaneously learn, the more accurately it can learn (i.e., the lower its final MSE can become).

In FIG. 15 are shown results 370 that demonstrate that as long as a MNN is 3 or more layers deep, it possesses enough tunable beams to accurately learn two shape-morphing behaviors regardless of the number of layers and output nodes. It should be noted that although a MNN with fewer output nodes has fewer tunable beams with which to learn, it also has fewer force-input and displacement-output requirements for the beams to satisfy during learning. Thus, the number of output nodes is largely irrelevant. The plot of FIG. 16 demonstrates that triangular lattices can learn more accurately than square lattices because triangular lattices comprise more tunable beams than are found in square lattices given the same number of layers and output nodes. Moreover, the beams of triangular lattices can more effectively propagate displacements in all directions rather than predominantly along orthogonal directions as in square lattices.

5.3. MNN Materials and Methods 5.3.1. Tunable Beam Fabrication and Function

FIG. 17 and FIG. 18 illustrate an example embodiment 450, 490 of a tunable beam used within the mechanical-neural-network (MNN) studied in this present disclosure. The tunable beam is shown assembled in FIG. 17 and in a disassembled form in FIG. 18 showing its constituent elements (parts). In the disassembled form of FIG. 18 is seen the body 492 with hard stop 493, modular end nodes 494 for each end of the tunable beam, and which also have hard stops to limit travel. The figure also illustrates flexure bearings 496, two strain gauges 498 (e.g., HBM strain gauge (1-LM13-1.5/350GE) sensors) which are mounted on opposing sides near the base of one of the flexure bearings to enhance sensor sensitivity utilizing a Wheatstone circuit in a half-bridge configuration. The figure also depicts wedges 500*a*, 500*b*, and wiring 502 for the main body. In the lower portion of the figure is seen an actuator, exemplified as voice coil 504 (e.g., Moticont linear voice coil motor (LCVM-032-025-02)) disposed between first and second brackets 506*a*, 506*b*.

By way of example and not limitation, the body portions and remaining parts in this example were either cut using wire electrical discharge machining (EDM) from 6061-T6 aluminum, or in the case of the brackets, were machined from the same material.

The two parallel blade flexures behave as linear bearings in that they guide a translational motion along the beam's axis while constraining all other directions. As the flexure bearings deform over their full range, however, they manifest a slight arching parasitic motion, which was considered and compensation for in the selection and mounting of the voice coil actuator. Care was taken to ensure that the coil portion of the actuator could never make contact with or rub against the outer magnet portion of the actuator, toward eliminating noise, friction, and hysteresis which would otherwise arise. In this example, the brackets were just mounted to the body of the beam using bolts and nuts 508*a*,

508*b*, The housing contains a hard stop 493 that was cut into the body to prevent the flexure bearings from yielding by preventing them from deforming beyond a maximum deflection, such as ±2.5 mm in this example, in either direction.

The body of the beam can attach to the modular node parts, for example using slide-on dove-tail joints, which are then locked in place by opposing wedges 500*a*, 500*b* that are pressed together. The resulting joint effectively fuses the beam's body to the modular-node parts, thus preventing slip-induced friction and hysteresis while also allowing the body to be disassembled and reassembled quickly for debugging or calibration purposes. The utility of this feature is more clearly recognized in the context of the full MNN lattice. Each modular-node part 494 uses two angled blade flexures 510 to permit rotational deformations about the axis where the planes of the blade flexures intersect (i.e., at the center of the small cylinder shown) while constraining deformations in all other directions. This attachment has a hard stop which operates as the long beams that extend from the center of the node collide with the end that attaches to each beam when they rotate to stop the rotation, so it doesn't go too far and yield the thin blade flexures. Thus, the use of hard stops in these node sections prevent excessive rotational deformations. It should be noted that although the tunable beams used to demonstrate the concept of MNNs in this present disclosure were designed such that only their axial stiffness could be changed, beams that can have their stiffness independently tuned along multiple directions (e.g., axial, transverse, and bending) should enhance MNN learning further.

5.3.2. Tunable Beam Closed-Loop Controller

Figure 22:
Figure 22:
Figure 22:
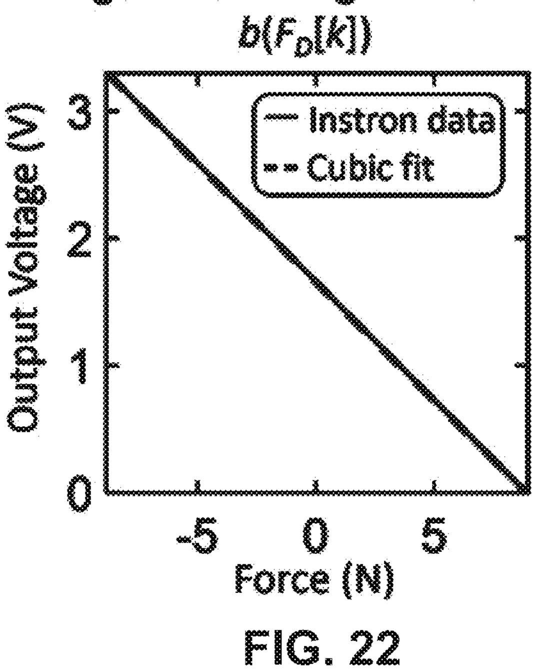
Figure 23:
Figure 23:
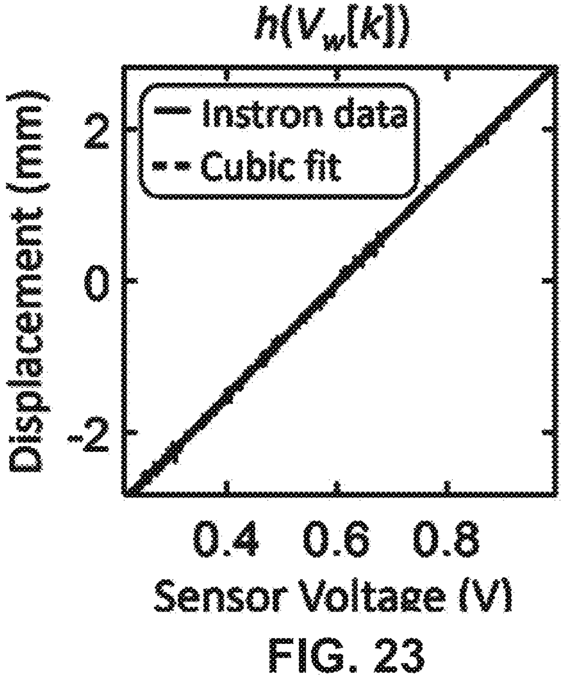

FIG. 19 through FIG. 23 illustrates an example embodiment 530 of tunable beams in a closed loop with example results 570, 590, 610 and 630. A closed-loop control diagram is shown in FIG. 19 as described below, and four measured calibration plots are shown with FIG. 20 depicting flexure force, FIG. 21 depicting voice coil calibration, FIG. 22 showing digital-to-analog converter output, and FIG. 23 showing analog-to-digital converter output.

The closed-loop control diagram of FIG. 19 details how each beam within the MNN of this operates using proportional-derivative (PD) control to achieve tunable axial stiffness. The digital displacement signal, e[k] 535, is the difference 534 between a reference offset value, R 532, and the digital displacement feedback signal, $w_D$[k] 550, with e[k] 535 received into controller 536.

The derivative 552 of e[k] is a velocity signal, v[k] 553, which is multiplied by the controller's derivative gain, $K_d$ 558, which behaves as a damping coefficient. For the purposes of this present disclosure, $K_d$ was set to a value of 650. The function, f(e[k]) 554, can be set to determine the profile of force-displacement response for the tunable beam. It should be noted that if f(e[k]) is set equal to e[k], the beam's force-displacement response will be linear, but if it is set equal to tan(e[k]), it will be a nonlinear tangent function. The output of f(e[k]), labeled x[k] 555 is multiplied by the controller's proportional gain, $K_p$ 560. A summation 562 is shown of outputs from $K_d$ 558 and $K_p$ 560 and a subtraction 562 of flexure force g(e[k]) 556 to arrive at the force, F[k] 563 which is received at the voice coil calibration function 564, which outputs a signal for driving the actuator.

The proportional gain $K_p$ is set to equal the instantaneous axial stiffness of the beam (i.e., the stiffness of the beam before it is deformed). It should be noted that the $K_p$ values corresponding to each tunable beam within a MNN lattice are the variables that are adjusted during the learning process described in the main text. Four calibration plots must be generated for each tunable beam in the lattice so that analytical functions can be fit to the measured data collected from an Instron testing machine and used within the control diagram.

An example of the first calibration plot 570 is provided in FIG. 20. This plot, called flexure force g(e[k]), relates the extension or contraction of the tunable beam along its axis to the force required to deform the beam without control (i.e., the force-displacement response of the passive flexure bearings. The force, F[k] 563, as seen in FIG. 19 is a summation 562 of outputs from $K_d$ 558 and $K_p$ 560 and subtraction 562 of flexure force g(e[k]) 556; and represents the required voice-coil output force to control the beam's axial stiffness as desired. Both F[k] 563 and e[k] 535 are fed into the second calibration plot 590 of FIG. 21, for the actuator, which is referred to herein as a voice coil calibration q(e[k], F[k]) 564 as seen in FIG. 19, to generate a force, $F_D$[k] 537, which corrects for the nonlinearity of the actuator (voice coil) by multiplying F[k] with a motor scale factor. The sign of F[k] determines whether the pushing or pulling analytical fit function is used.

Referring back to FIG. 19, outside of controller 536 is seen the Digital-to-Analog Converter (DAC) b($F_D$[k]) 538, which is represented in the third calibration plot 610 of FIG. 22, which converts $F_D$[k] into a voltage $V_{FD}$(t), which is fed to the actuator (voice coil actuator) within the system's plant 540 (i.e., the tunable beam 542). The tunable beam responds by displacing an amount, w(t) 544, which causes the strain gauge sensors 546 to produce a voltage, $V_w$(t) 547, which is then converted into $w_D$[k] 550 by Analog-to-Digital Converter (ADC) h($V_w$[k]) 548 as represented by the fourth calibration plot 630 of FIG. 23.

It should be noted that if the sensor (e.g., strain gauge) provides a digital output, then ADC 548 is not required. Similarly, if the actuator can receive digital inputs (e.g., such as an actuator having two or more discrete positions, or one with embedded DAC), then physical DAC 538 is not required, although the use of the associated calibrations may still increase operational accuracy.

5.3.3. MNN Features, Fabrication, and Control Electronics

In addition to the tunable beam parts discussed previously, the MNN of FIG. 9 and FIG. 10 consists of other parts, which were also cut from 6061-T6 aluminum using wire EDM (i.e., the nodes, grounded nodes, and decoupling flexures labeled). The four input actuators fixtured within the decoupling flexures are Moticont® linear voice coil motors (LVCM-038-038-02) and the two cameras (i.e., Adafruit® 636 Digital Microscopes) were mounted to an T-slot aluminum frame using parts additively fabricated from Acrylonitrile Butadiene Styrene (ABS) with a Stratasys® UPrint SE Plus three-dimensional (3D) printer. Wooden boards were used to support the electronics underneath the MNN.

Within the control electronics for the MMN circuit, which is current-controlled, a digital-to-analog converter (DAC) (e.g., Microchip Technology® MCP4725) produces a voltage proportional to the desired actuator current, which is supplied to the non-inverting input of an operational amplifier (op-amp) (e.g., Texas Instruments® OPA549). The op-amp operates in an arrangement similar to a voltage follower and its output current passes through both the actuator and a shunt resistor (e.g., Vishay RN55C3500BB14) before reaching ground. The voltage drop across the shunt resistor is amplified by an instrumentation amplifier (e.g., Analog Devices® AD8226A), which acts as a current-sense amplifier. The output of the current sense amplifier is configured to match the range of the DAC output, which is provided to the inverting input of the operational amplifier for closed-loop control. To measure the displacement of the tunable beams, the circuit board has another instrumentation amplifier, which acts as a strain gauge amplifier. By way of example a microcontroller (e.g., Espressif® ESP32) is used to set the DAC input voltage, read the strain gauge voltage, and shut down the OPA549. Stable supply voltages for the analog components are created using a voltage regulator (e.g., Texas Instruments® LM317) for the +12 supply and another voltage regulator (e.g., ON Semiconductor® MC79M12) for the −12V supply; while still another voltage regulator (e.g., LM317) is used for the strain gauge supply.

5.3.4. MNN Calibration

Since each tunable beam must be assembled within the MNN lattice of FIG. 9 and FIG. 10 and the four calibration plots of FIG. 20 through FIG. 23 were generated using a testing machine (e.g., an Instron® testing machine), the MNN's two output nodes tend to displace arbitrary amounts every time different combinations of axial stiffness values are simply assigned to the tunable beams. Ideally, the output nodes of the MNN should only displace in response to its input nodes being loaded during learning, and not simply in response to new stiffness combinations being assigned to the tunable beams.

The unwanted output-node displacements resulting from the assignment of axial stiffness values occur because each tunable beam is slightly stretched or compressed when it is assembled within the lattice to a different length than how it was when it was calibrated in the Instron. Thus, in the present disclosure, the reference offset value R as labeled in FIG. 19 is adjusted for each tunable beam to reduce unwanted displacements, which, if severe enough, could adversely affect learning. MNN calibration is the process of adjusting this offset value for each beam in a lattice so that the MNN can successfully learn.

Figure 24:
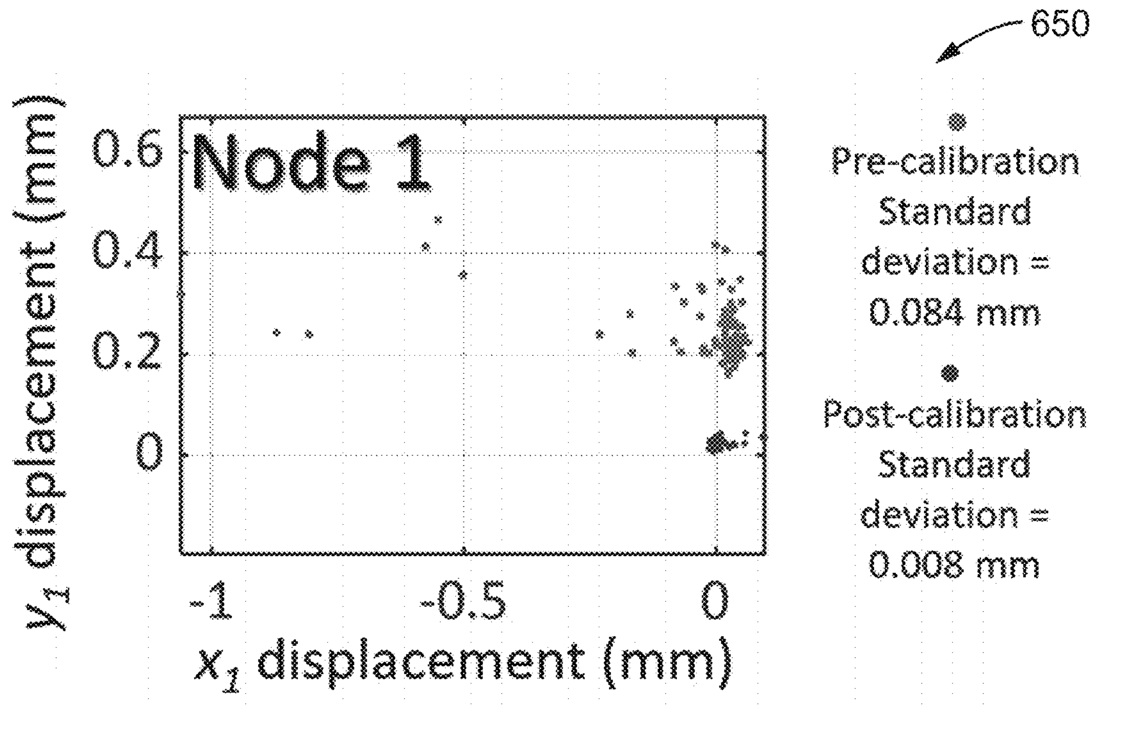
FIG. 24 and FIG. 25 are plots of pre-calibration and post-calibration unwanted displacements, as obtained for an embodiment of the present disclosure.
Figure 25:
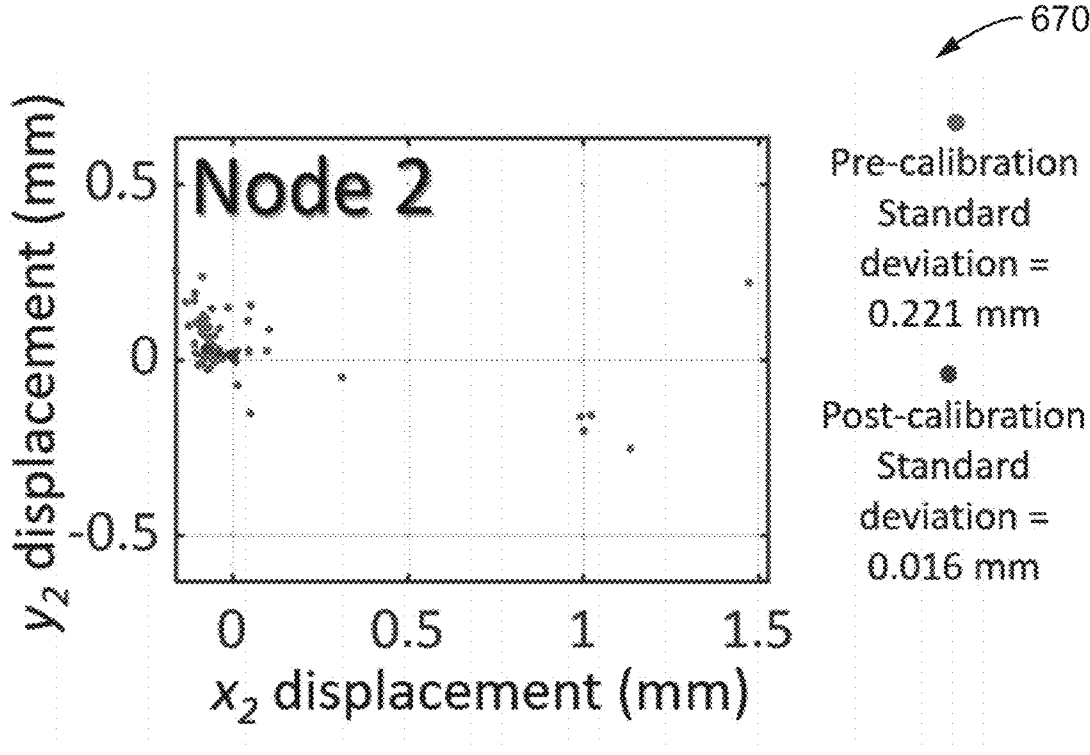

FIG. 24 and FIG. 25 illustrates example results 650, 670 of pre-calibration and post-calibration comparisons of unwanted output-node displacements at Node 1 in FIG. 24, and at Node 2 in FIG. 25, for the Mechanical Neural Network (MNN) as resulting from assigned combinations of axial stiffness values. Eighty random, but different, combinations of axial stiffness values were assigned to the 21 tunable beams within the MNN of FIG. 9 and FIG. 10 and the resulting displacements of the output nodes (i.e., Node 1 and Node 2) are shown plotted in these figures as gray dots, and after as black dots calibrating each individual beam. Standard deviations of these unwanted displacements are also provided.

It should be noted that the standard deviation (i.e., the spread) of the displacements improved by at least an order of magnitude after the reference offset values were calibrated. For example, the standard deviation of displacements for Node 1 dropped from 0.084 mm to 0.008 mm and the standard deviation of displacements for Node 2 dropped from 0.221 mm to mm). Moreover, It should be noted that the post-calibration black dots cluster much more successfully around the plot origins compared with the pre-calibration gray dots (i.e., the average post-calibration $x_1$ displacement and $y_1$ displacement of Node 1 are 0.0047 mm and 0.0228 mm respectively, and the average post-calibration $x_2$ displacement and $y_2$ displacement of Node 2 were mm and 0.0145 mm respectively, whereas the average pre-calibration $x_1$ displacement and $y_1$ displacement of Node 1 are −0.0456 mm and 0.2483 mm respectively, and the average pre-calibration $x_2$ displacement and $y_2$ displacement of Node 2 are 0.0414 mm and 0.0408 mm respectively. This observation indicates that, on average, the output nodes of a properly calibrated MNN don't displace significantly from their resting positions regardless of what combinations of axial stiffnesses values are assigned to the lattice's tunable beams.

5.3.5. Validation of Strain-Gauge Approach Using Cameras

Cameras were used to validate the strain-gauge approach. The cameras were used to validate the approach of indirectly measuring MNN output-node displacements by calculating them from the collective strain-gauge measurements of each tunable beam in the lattice as they simultaneously deform when the MNN input nodes are loaded. A pair of forces with randomly generated x-axis and y-axis components between ±1 N were applied to the two input nodes of the MNN of FIG. 9 and FIG. 10 after a random combination of axial stiffness values were assigned to the tunable beams.

FIG. 26 and FIG. 27 illustrate results 690, 710 showing camera-based validation of the strain-gauge approach for sensing the output nodes of the mechanical neural network (MNN). The x- and y-component displacements of the MNN's two output nodes, Node 1 in FIG. 26, and Node 2 in FIG. 27, plotted over time as measured directly by the cameras and indirectly by the strain gauges on the tunable beams in response to a random pair of step forces imparted on each of the MNN's two input nodes.

The resulting $x_1$-axis and $y_1$-axis displacements of the upper output node, labeled Node 1 in FIG. 24, are plotted over time in FIG. 26 as they are measured using both the camera and the strain-gauge approach. The resulting $x_2$- and $y_2$-axis displacements of the lower output node, labeled Node 2 in FIG. 25, are also plotted over time in FIG. 27 as they are measured using both the camera and the strain-gauge approach. It should be noted that since the input forces are step functions, both output nodes vibrate until they settle on a steady-state value. The steady-state displacements of Node 1 in FIG. 26 measured by the camera along the $x_1$- and $y_1$-axis of FIG. 24 are $x_{1c}$ and $y_{1c}$ respectively, while the steady-state displacements measured by the strain-gauge approach are $x_{1s}$ and $y_{1s}$ respectively. The steady-state displacements of Node 2 in FIG. 27 measured by the camera along the $x_2$- and $y_2$-axis of FIG. 25 are $x_{2c}$ and $y_{2c}$ respectively, while the displacements measured by the strain-gauge approach along the $x_2$- and $y_2$-axis are $x_{2s}$ and yes respectively.

A similar procedure was conducted 25 times using 25 different input force loads with randomly generated x-axis and y-axis components between ±1 N and 25 random but different combinations of axial stiffness values assigned to the tunable beams within the MNN. The resulting output-node steady-state displacements were measured and used to calculate 25 different scalar difference values, E, according to $$E = \sum_{i=1}^{2} \sqrt{(x_{is} - x_{ic})^2 + (y_{is} - y_{ic})^2}. \tag{1}$$

The average and standard deviation of all 25 scalar difference values, E, corresponding to each of the 25 MNN loading tests were calculated to be mm and 0.003 mm respectively. These small values validate the strain-gauge approach because they demonstrate that the differences between the strain-gauge approach and the direct-measurement approach of the cameras are insignificant. Moreover, It should be noted how closely the strain-gauge data of FIG. 26 and FIG. 27 matches the results of the camera data. The cameras don't appear to track the initial vibrations of the output nodes well because they only collected 7.5 frames per second at their required resolution. Thus, if the cameras themselves were used to train the MNN, the controller would need to wait upwards of 20 seconds per loading scenario, so that the resulting dynamic vibrations would fully settle out to accurately record the final locations of the output nodes. Thus, the strain-gauge approach is not only sufficiently accurate but is also significantly faster. It enables MNNs to learn dynamic behaviors (e.g., wave propagation control) and predict the location where vibrating nodes will settle beforehand to dramatically reduce learning time. The strain-gauge approach was consequently applied to all experimental learning studies conducted for the present disclosure.

5.3.6. Behaviors Learned while Comparing Optimizations

Referring back to FIG. 10, a first behavior (Behavior 1) is manifest when the two input nodes 172, 174 are both pushed in the $X_0$ direction 202*a*, 202*b* to the right with equal magnitude, to which the lattice MNN responds by moving its output nodes Node 1 186 and Node 2 188 in the learned behavior in displacing in the $X_1$ direction with 206*a* moving to the right and 206*b* moving to the left, each by 0.5 mm in their respectively direction, while there should be no movement in the Y direction for the output nodes.

A second behavior (Behavior 2) is manifest when the two input nodes 172, 174, are both sheared in the $Y_0$ direction upwards 204*a*, 204*b* with equal magnitude. In response to its learned behavior Node 1 and Node 2 displace in the opposite directions as were seen in Behavior 1; specifically, with $X_1$ 206*a* moving to the left, and 206*b* moving to the right, each by 0.5 mm; again, there should be no movement in the Y direction for the output nodes.

It is very important to keep in mind that the above learned behaviors are given by way of example, and not by way of limitation. More specifically, it will be noted that a lattice, such as shown and described, can be taught to generate any desired relationships of output node actions in response to any given set of input node conditions.

As the MNN attempted to exhibit these two desired behaviors according to the learning process detailed in the main text, the axial stiffness values of each beam were allowed to be tuned between the maximum and minimum values of 2.3 N/mm and −2 N/mm respectively according to the limits measured in FIG. 8.

5.3.7. Optimization Algorithm Details

Optimization algorithms determine how combinations of stiffness values should be assigned to the tunable beams within a MNN for each loading scenario during the learning process detailed in the main text. By way of example, the present disclosure employed two optimization algorithms to train the MNN of FIG. 10 such that it learned the two shape-morphing behaviors detailed previously. The two optimization algorithms used were a Genetic Algorithm (GA) and Partial Pattern Search (PPS).

The GA used for an embodiment of the present disclosure attempts 1,000 combinations of axial stiffness values per generation. The most promising combinations (i.e., those that were measured having the lowest Mean Squared Error (MSE)) from each generation are then crossed according to MATLAB's 'cga' function to generate a new generation of 1,000 new combinations of axial stiffness values. The best combination of axial stiffness values (i.e., the one that is measured having the lowest MSE) from each generation is plotted and corresponds with each dot in the upper-most plot of FIG. 11. The algorithm continues until new generations fail to produce combinations of axial stiffness values with lower MSEs at which point the algorithm terminates. It should be noted that the upper-most plot of FIG. 11 resulted from 40 generations. Although the GA used for this present disclosure requires significant time and computational power to complete, the algorithm is very thorough and thus produces accurate results.

The PPS algorithm used for an embodiment of the present disclosure begins with all the tunable beams starting with the same stiffness value (i.e., 1.15 N/mm). Then the following is performed by way of example and not limitation. A tunable beam is randomly selected, and its currently assigned stiffness value is added to and subtracted from a stiffness increment, which begins at 2.15 N/mm. If the two resulting combinations of stiffness values don't reduce the measured MSE, a different beam is randomly selected, and the same process is repeated. If all the beams in the MNN are subjected to this process and the MSE never reduced for any of them, the current stiffness increment is multiplied by a reduction factor of 0.9 and the entire process repeats with the new, now smaller, stiffness increment.

If adding or subtracting the stiffness increment to the current stiffness value assigned to any beam ever exceeds or falls below the stiffness limit achievable by the beam (i.e., 2.3 N/mm and −2 N/mm respectively according to FIG. 8), the beam is assigned the stiffness limit that was surpassed. When a combination of stiffness values is identified that produces a measured reduction in the MNN's MSE, the entire process begins again until the current stiffness increment is reduced below a specified threshold (i.e., 0.5 N/mm). It should be noted from the plot 270 of FIG. 12 that each black dot corresponds to an event where the MNN's MSE was measured as being reduced, which for the specific learning example of FIG. 12 occurred 10 times until the algorithm terminated. Although PPS produces results that are not as accurate as the GA used for the present disclosure, it requires significantly less time and computational power.

It should be noted that despite the fact that both algorithms are designed to identify combinations of stiffness values that produce progressively lower MSEs, the MSEs corresponding to some of the black dots in the upper-most plots of FIG. 11 and FIG. 12 increase in value compared to prior dots. These temporary increases in plotted MSE values are a result of system noise in the MNN (e.g., sensor noise). Finally, it should be noted that before Node 1 and Node 2 are ever displaced during learning using either algorithm, both output nodes begin at the origin of the middle and lower-most plots of FIG. 11 and FIG. 12.

5.3.8. Linear Versus Nonlinear Learning Study

Figure 28:
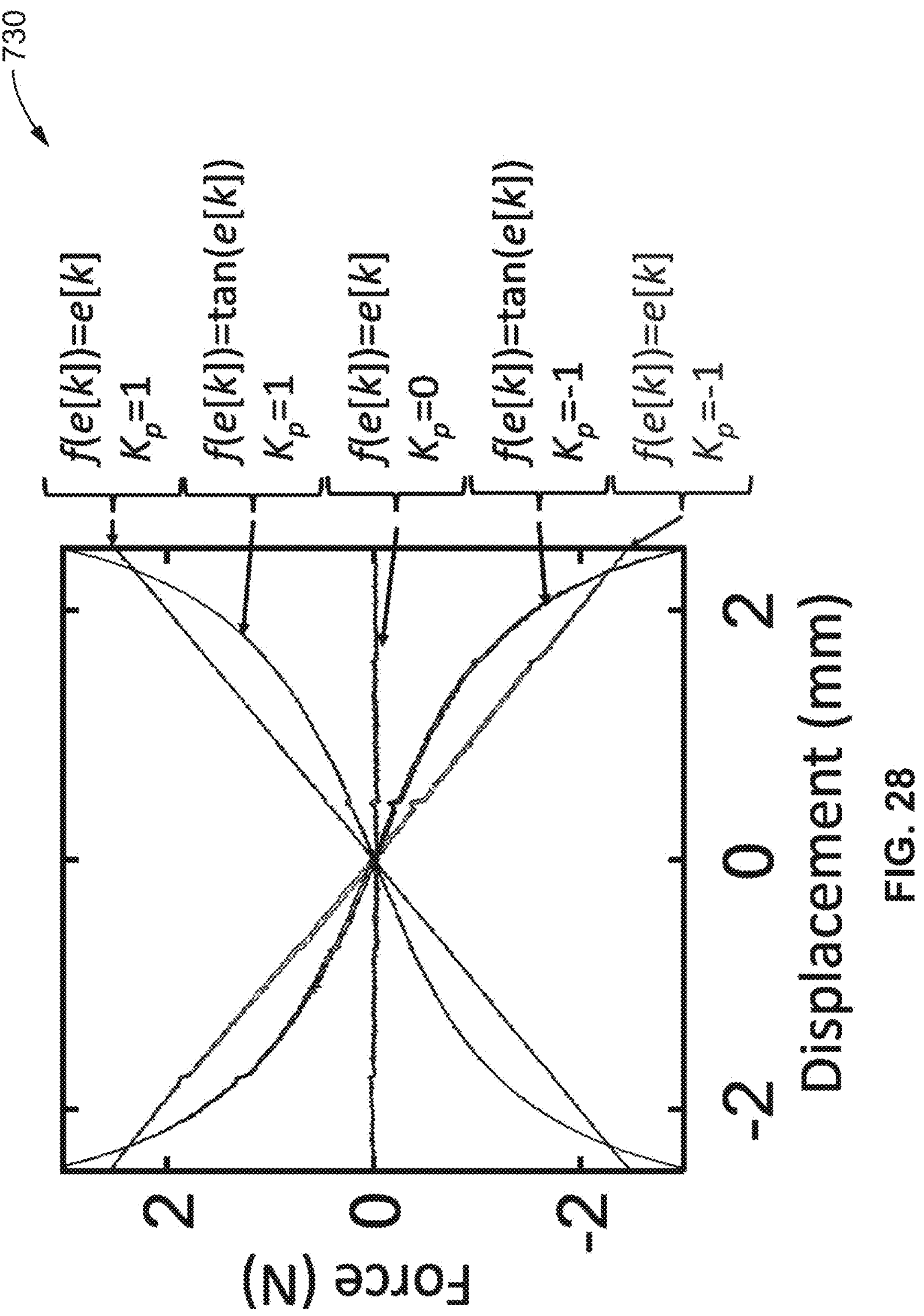
FIG. 28 is a plot showing the effect of proportional gain, Kp, and f(e[k]) on tunable beam stiffness for the control system of FIG. 19, obtained for an embodiment of the present disclosure.

FIG. 28 illustrates example results 730 showing the effect of proportional gain, $K_p$, and f(e[k]) on tunable beam stiffness 542 as seen in FIG. 19. Example force-displacement responses were achieved through the use of closed-loop control of the tunable beam in FIG. 17 as measured by an Instron testing machine along the beam's axis for different values of $K_p$ (i.e., 1, 0, and −1) and for different functions, f(e[k]) (i.e., e[k] and tan(e[k])). These functions were used to compare the effect of linear versus nonlinear beam stiffness on the process of mechanical-neural-network (MNN) learning.

The MNN lattice of FIG. 9 and FIG. 10 were used in a test setup to experimentally compare MNN learning using tunable beams that exhibit linear force-displacement responses versus nonlinear force-displacement responses (e.g., FIG. 28). The MNN's tunable beams were initially set to only exhibit linear force-displacement responses with stiffness values that could vary between 2.3 N/mm and −2 N/mm according to the limits measured in FIG. 8. Two random but different shape-morphing behaviors were generated for the MNN to learn. Each behavior was generated by selecting forces with randomly generated x- and y-axis components between ±2 N, which cause the MNN's output nodes to move by selected displacements with randomly generated x- and y-axis components between ±0.5 mm when the selected forces load the input nodes. The MNN then used the PPS algorithm discussed previously to learn the generated pair of random behaviors simultaneously.

The MSE of this learning process over time was recorded similar to the example plots shown in FIG. 11 and FIG. 12. Five additional random but unique pairs of behaviors were then generated and learned independently by the MNN. The six total resulting MSE-versus-time plots were averaged to produce the single solid-line plot 330 of FIG. 13 (i.e., the plot corresponding to the linear scenario). The same six pairs of generated behaviors were then learned by the same MNN, but its tunable beams were set to only exhibit tangent force-displacement responses (i.e., a nonlinear response) with instantaneous stiffness values that could vary between 2.3 N/mm and −2 N/mm according to the limits measured in FIG. 8. It should be noted that although 2.3 N/mm was found to be the largest axial stiffness value achievable by the tunable beams of this study, that finding is conservative and is only true for instantaneous stiffness values (i.e., beam stiffness values prior to deformation). When the beam is deformed an appreciable amount, it can be stably controlled with larger stiffness values to accommodate the rising tangent function profile. The six resulting MSE-versus-time plots were averaged to produce the single dotted-line plot 330 of FIG. 13 (i.e., the plot corresponding to the nonlinear scenario).

It should be noted also that sometimes when negative stiffness values are assigned to a tunable beam within the MNN lattice of FIG. 9 and FIG. 10, the beam deforms until its hard stops 493 in FIG. 17 and FIG. 18, are engaged. When this occurs, the beam's force-displacement response discontinuously changes from its assigned linear or tangent profile in a way that is not prescribed by closed-loop control.

5.3.9. Previous MNN Attempts and Issues Found

Prior to the successful demonstration of the MNN of FIG. 10 through FIG. 13, different beam designs (FIG. 29 and FIG. 30) were fabricated and integrated within other MNNs (FIG. 31), which were not completely successful in learning desired behaviors, as they were lacking in regard to minimal hysteresis (FIG. 32 and FIG. 33), and use of quality sensors and flexures.

Figure 29:
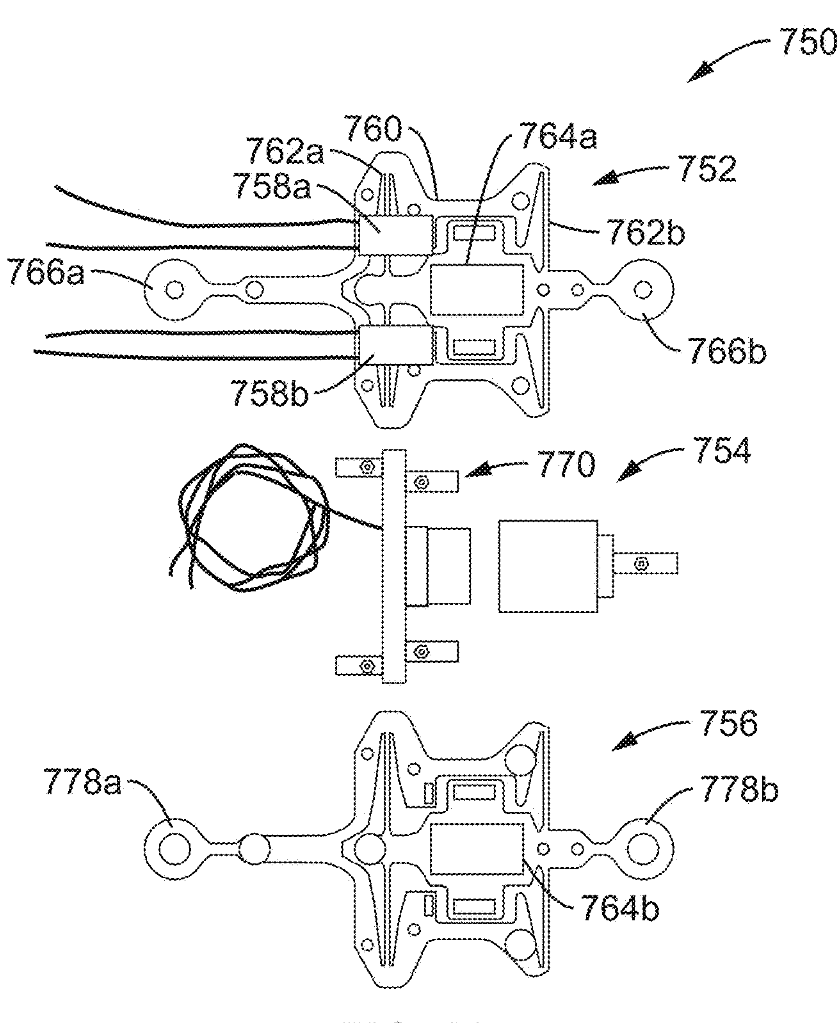
FIG. 29 and FIG. 30 are part outlines and assembled tunable beam of a tested MNN, according to at least one embodiment of the present disclosure.
Figure 30:
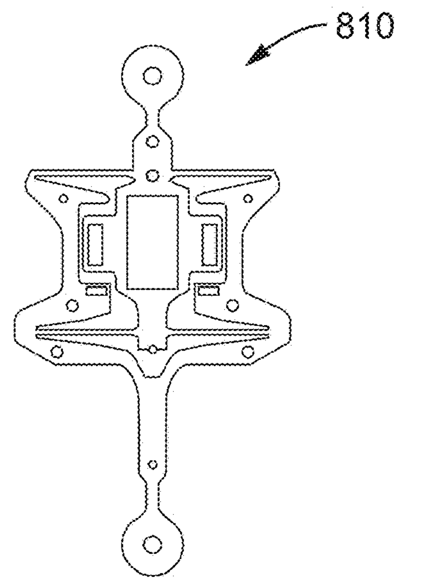

FIG. 29 and FIG. 30 illustrate an example embodiment 750, 810 of a tunable beam design used within a tested mechanical-neural-network (MNN) that showed promise but failed to properly learn the behaviors. The beam is shown in FIG. 29 with its parts labeled, with an assembled top view shown in FIG. 30. The MNNs used for the tunable beam design is also shown in FIG. 31 within its lattice, as described later.

In FIG. 29, there are four main sections shown. A first body portion 752 with its frame 760, and a second body portion 756, into which a voice coil actuator 754 comprising a coil portion 770 and magnet portion 752 are retained (sandwiched). Each of the body sections are configured with a central portion 764*a*, 764*b* for retaining the actuator in an arrangement floating on flexure bearings 762*a*, 762*b* to allow for single axis motion in response to operation of the actuator. Position sensors 758*a*, 758*b*, exemplified as hall effect sensors, are coupled to the body for measuring actuated motion. The inputs 766*a*, 778*a* are configured to be coupled together, such as coupled together using standoffs. The outputs 766*b*, 778*b* can also be coupled together in the same manner. The end portions of the inputs and output are configured to provide a desire degree of rotational compliance, such as using a rotational hinge, depicted here as a narrowed portion of the plastic material.

Identifying the reasons why this system failed to properly learn is important for understanding how to improve MNN designs to successfully learn. The beam was assembled by bolts using two layers of laser-cut polytetrafluoroethylene (PTFE) sheets in FIG. 29, which were separated by aluminum standoffs. Flexure bearings, which guided the axial displacements of the beam, were cut within these sheets. Two stacks of small cylindrical magnets were embedded in the upper sheet and were used so that movement sensors (e.g., two Allegro MicroSystems® Hall effect sensors (A1324LUA-T)) could accurately measure the beam's axial displacements. An actuator, exemplified as a linear voice coil (e.g., BEI Kimco® linear voice coil (LA08-10-000A)) was utilized to actuate the beam's axial displacements and was mounted to a laser-cut support, which was fixtured by 3D printed parts between the two PTFE sheets.

Figure 31:
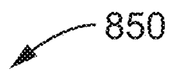
FIG. 31 is a schematic of an MNN beam lattice from the beam shown in FIG. 30, according to at least one embodiment of the present disclosure.
Figure 31:
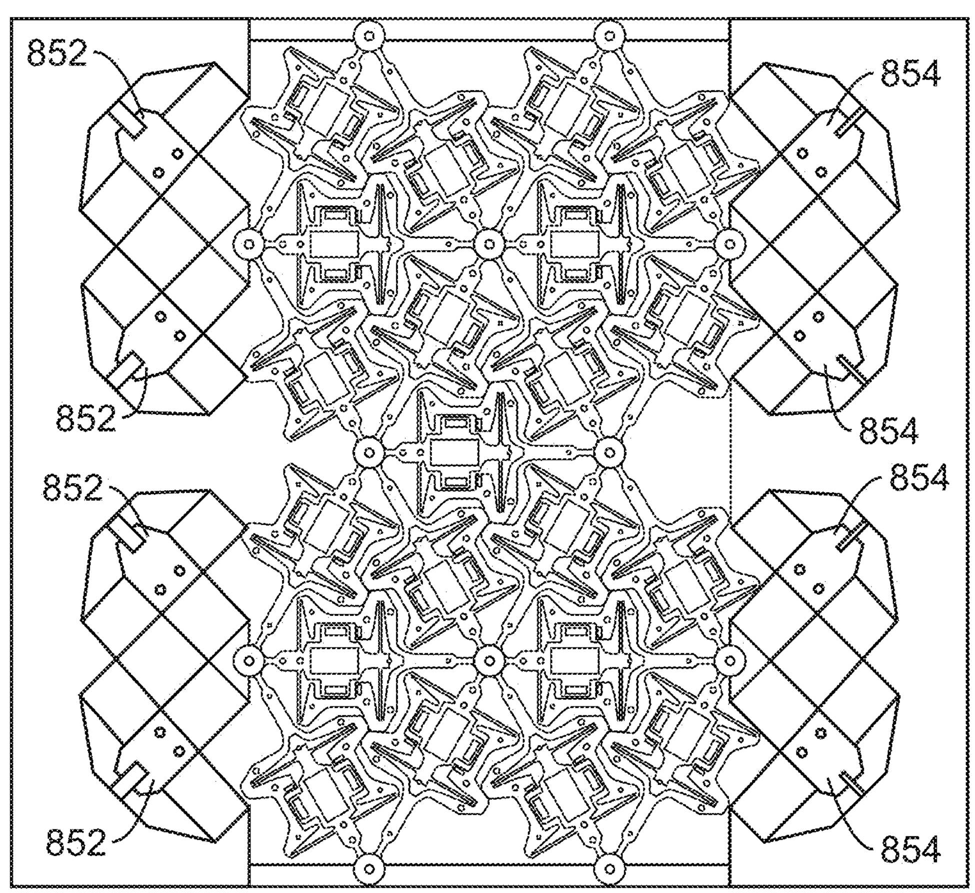

FIG. 31 illustrates an example embodiment 850 of the entire MNN beam lattice, which was assembled using similar parts to those shown in FIG. 29 and FIG. 30 which required only two large laser-cut sheets of PTFE for all the beams combined. Decoupling flexures, attached to both the input and output nodes, were also included within the two PTFE sheets. The input nodes were driven by four additional actuators (i.e., voice-coil actuators) 852 and the output motion was sensed by four additional movement sensors, 854, here using Hall effect sensors.

The MNN was mounted on a box and was controlled by custom-designed control circuitry using multiple microcontrollers (e.g., five Arduino® Megas). When the MNN failed to learn, a wooden frame was built around it so that Nylon thread could be used to prevent the MNN from sagging the small amount that it previously has experienced. A typical MSE-versus-generations plot produced by the MNN when the genetic algorithm (GA) was applied to the learning process, and although learning appeared to be occurring for certain periods of time, the MSE would occasionally jump to higher values and would never settle to a value small enough for the MNN to successfully learn any shape-morphing behaviors. This occurred because the system's loading response would change with unacceptably poor repeatability so that the optimization algorithm's decisions were misinformed by outdated response data.

There are multiple reasons for the unacceptably poor repeatability of the MNNs seen in FIG. 29 through FIG. 31. Due to the fact that they were made predominantly from PTFE, the MNNs experienced stress relaxation and creep as a consequence of the changing voice-coil actuator loads and gravity. Moreover, since their flexure bearings were made of PTFE, each tunable beam within the MNNs exhibited unacceptable hysteresis as they deformed due to internal friction caused by polymer chains slipping within the PTFE flexures. The gaps between the voice-coil actuators' magnets and coils were also not sufficiently large and thus the magnets and coils would collide and rub past each other during learning, which would generate friction and noise that also contributed to the MNNs' poor repeatability.

It is also possible that some of their many bolts would loosen over time due to the vibrations induced by the step forces imparted by the input actuators during learning, which would produce additional friction. Moreover, the Hall effect sensors produced significantly more signal noise than the strain gauge sensors of the MNN in FIG. 10. In addition, despite there being two Hall effect sensors per beam, they experienced unwanted cross-talk from the magnetic fields induced by the voice-coil actuators instead of exclusively experiencing the intended changing magnetic fields of their cylindrical magnet stacks. Furthermore, the symmetric flexure bearings and rotational hinges of the beam design of FIG. 29 and FIG. 30 in conjunction with the decoupling flexures of the input-node actuators and output-node sensors produced a two-layer flexure system that is highly over-constrained. Over-constrained systems can exhibit nonlinearity, bifurcation, and stress buildup, which negatively impacts precision and repeatability.

The MNN of FIG. 10 was designed to overcome the failings of the MNN designs of FIG. 29 through FIG. 31 so that MNN learning could be successfully demonstrated. Since the flexures in FIG. 10 were made of aluminum, they did not experience appreciable stress relaxation, creep, sagging, or hysteresis. It is expected, however, that the basic planform and structures of FIG. 29 through FIG. 31 could also be made to learn successfully by remediating the shortcomings discussed above.

Figure 32:
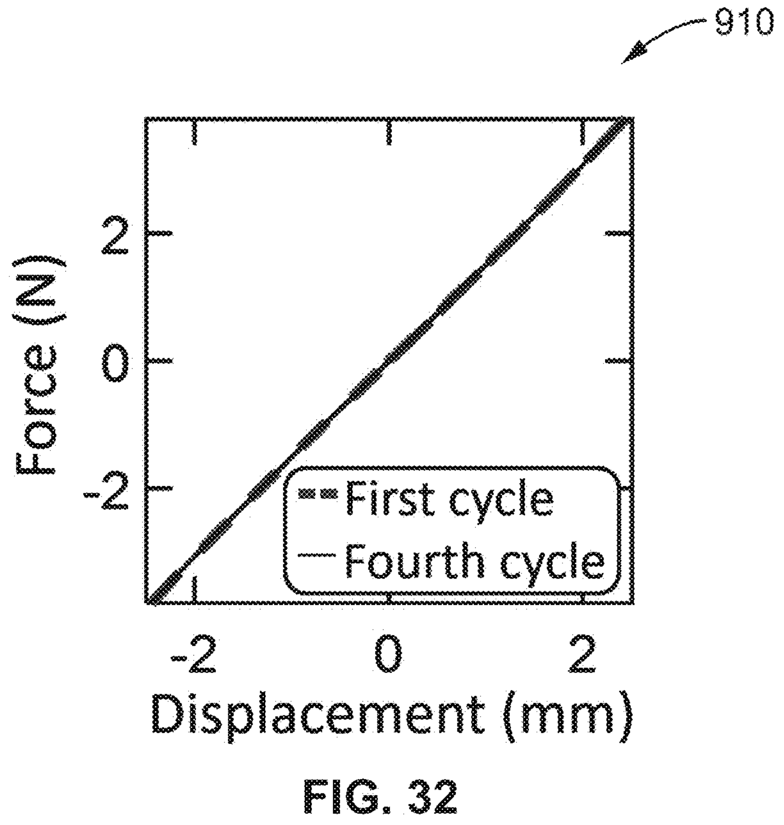
FIG. 32 and FIG. 33 are plots of hysteresis measurements for the beam of FIG. 17, obtained for an embodiment of the present disclosure.
Figure 33:
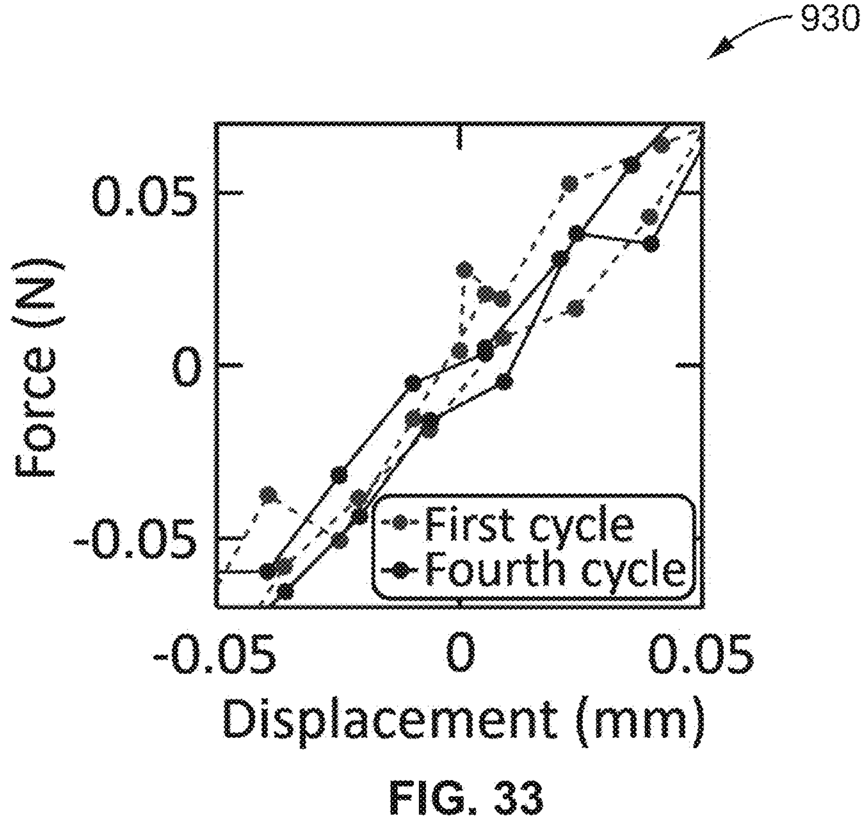

FIG. 32 and FIG. 33 illustrate results 910, 930 showing minimal hysteresis measured in the flexure bearings of the tunable beam design of FIG. 17 and FIG. 18. First and fourth loading cycle were measured by an Instron® testing machine. FIG. 33 is an expanded portion of FIG. 32 depicting a smaller displacement range.

The plot of FIG. 32 shows the first and fourth cycle axial force-displacement response of the tunable beam of FIG. 17 and FIG. 18. It should be noted that hysteresis is barely apparent even when the plot is shown zoomed in over the much smaller range of deformation of FIG. 33. The force-displacement responses plotted in FIG. 7 included two cycles of loading for each $K_p$ value to demonstrate that hysteresis remains minimal in the beam design of FIG. 6 even when closed-loop control is applied. The gaps between the voice-coil actuators' magnets and coils in the MNN of FIG. 10 were selected to provide sufficient clearance so no bodies would collide or rub within the range set by the tunable beam's hard stops. Wedges 500*a*, 500*b* as seen in FIG. 18 were used to join each beam together within the MNN of FIG. 10 using press-fit principles to prevent slip while allowing the beams to be removed and reattached on demand. This modularity was necessary so that each beam could be individually calibrated, which was not possible to achieve for the tunable beams permanently joined within the MNNs of FIG. 31.

The flexure bearings and strain gauge sensors within the MNN of FIG. were also chosen since they are significantly more linear than the flexure bearings and Hall effect sensors within the MNNs of FIG. 29 through FIG. 31. This improved linearity made controlling the axial stiffness of the beams within the MNN of FIG. 10 significantly easier. The output-node decoupling flexures of the MNNs in FIG. 29 through FIG. 31 were removed from the MNN design of FIG. 9 and FIG. 10 entirely, and the input-node decoupling flexures of FIG. 9 were adapted to include rotational blade flexures so that their input nodes would not be constrained to prevent rotation. Although still technically over-constrained, the flexures within the design of FIG. 9 and FIG. 10 constrain their MNN with significantly less over-constraint than the flexures within the designs of FIG. 29 through FIG. 31. Moreover, It should be noted that the electronics used to control the MNN of FIG. 9 and FIG. 10 was upgraded to use current control as opposed to the voltage control for the MNNs of FIG. 29 through FIG. 31. This upgrade allows the MNN of FIG. 9 and FIG. 10 to achieve greater force stability when learning dynamic behaviors while increasing the range of axial stiffness over which its constituent beams can be controlled.

5.3.10. Computational Tool Assumptions

The computational tool, used to perform the simulation study of the present disclosure, assumes that its simulated beams exhibit the same characteristics as the physical beam of FIG. 6 so that the study's results accurately predict the capabilities of a MNN similar to the design of FIG. 10 having many more of its tunable beams. Specifically, the tool assumes that its simulated beams are the same length as the physical beam of FIG. 6 (i.e., 6 inches from node to node). The tool mimics the physical hard stops of the beam by preventing its simulated beams from being able to extend or contract beyond ±2.5 mm in either direction. It assumes that the in-plane passive stiffness values of each beam along nonaxial directions are also the same as the physical beam fabricated in FIG. 6. These values were calculated using Finite Element Analysis (FEA).

Figures 34, 35, 36:
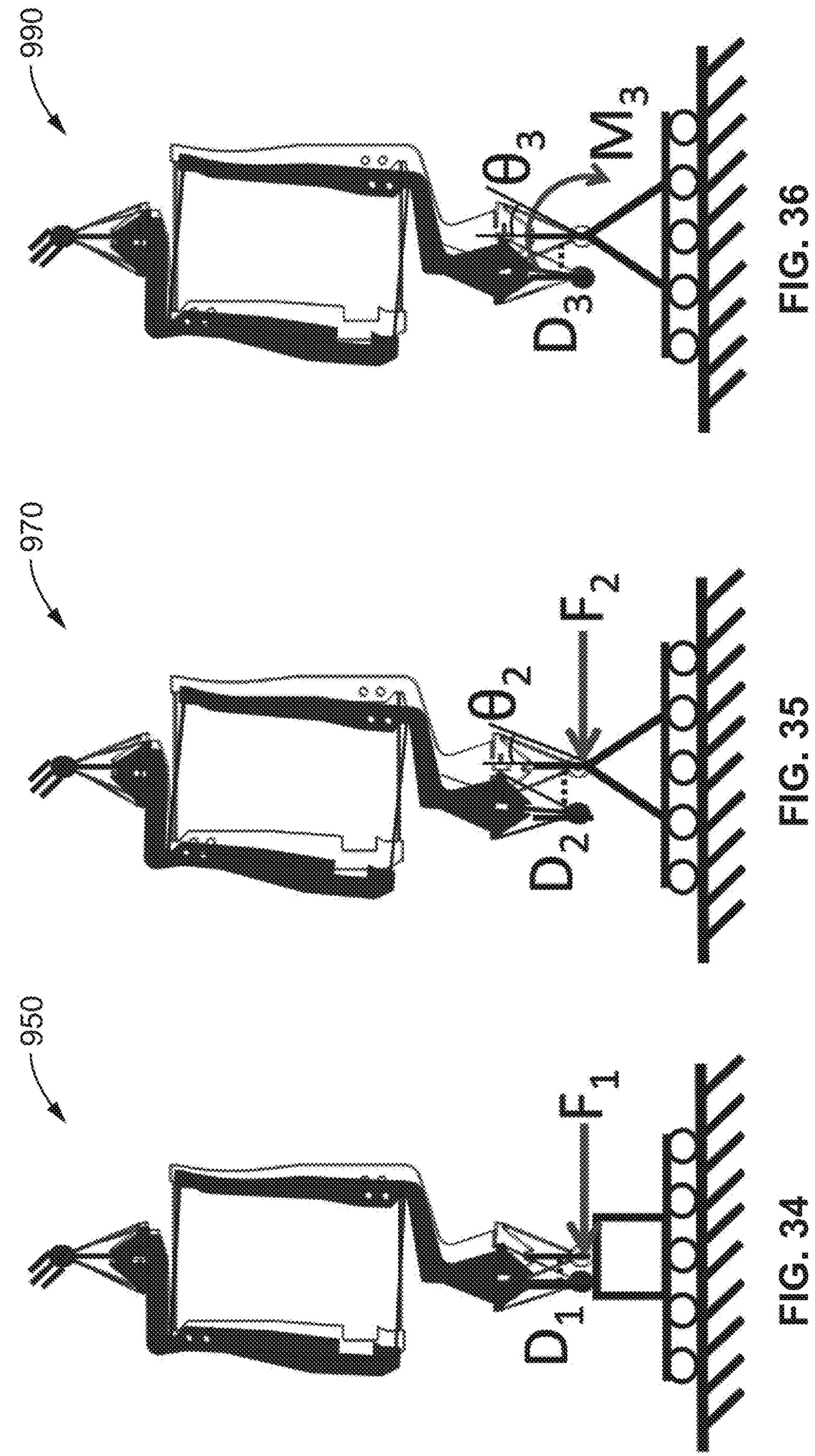
FIG. 34 through FIG. 36 are diagrams of finite element analysis (FEA) performed to determine passive stiffness values of the tunable beam, according to at least one embodiment of the present disclosure.

FIG. 34 through FIG. 36 illustrate an example an embodiment 950, 970 and 990 of finite element analysis (FEA) used to determine passive stiffness values of the tunable beam in FIG. 17 and FIG. 18 along its nonaxial directions. In FIG. 34 is seen a fixed sliding with force loading, in FIG. 35 is seen a pinned sliding with force loading, and in FIG. 36 is shown a pinned sliding with moment loading scenario used to calculate the passive stiffness values of the beam along nonaxial directions. These values were used to inform the computational tool that generated the simulation studies of this present disclosure.

Computer-aided-design (CAD) models of the body of each beam were fixtured and loaded according to the conditions specified in FIG. 34 through FIG. 36, using 6061-T6 aluminum properties to calculate three passive stiffness values required for the computational tool. The first stiffness value, $K_1$, was calculated from the displacement, $D_1$, resulting from a shearing force, $F_1$, imparted on the beam with one end fixed and the other end fixed to a sliding prism joint in FIG. 34 according to $K_1=F_1/D_1$, which was found to be N/mm. The second stiffness value, $K_2$, was calculated from the displacement, $D_2$, and the bending angle, $\theta_2$, resulting from a shearing force, $F_2$, imparted on the beam with one end fixed and the other end pinned with a revolute joint to a sliding prism joint in FIG. 35 according to $K_2=(F_2-D_2K_1)/\theta_2$, which was found to be 2.11 N/rad. The third stiffness value, $K_3$, was calculated from the displacement, $D_3$, and the bending angle, $\theta_3$, resulting from a moment, $M_3$, imparted on the beam with one end fixed and the other end pinned with a revolute joint to a sliding prism joint in FIG. 36 according to $K_3=(M_3-D_3K_2)/\theta_3$, which was found to be 25,300 Nmm/rad.

The tool also assumes that these passive stiffness values remain constant over large deformations to avoid the computational cost of nonlinear considerations. It also assumes that axial stiffness values can be assigned to the beams with linear force-displacement responses between any prescribed maximum and minimum value (including negative stiffness values) to mimic the actively controlled beams of FIG. 6. The tool assumes that all lattice nodes along the top and bottom of every simulated MNN are fixed to grounded rigid bodies, such as seen in FIG. 2, and that all the simulated MNNs are two-dimensional (i.e., their tunable beams are all constrained to lie on a common plane). The tool simulates MNN learning by using the approach described in the main text, but rather than using a GA or PPS to assign combinations of axial stiffness values to its tunable beams during learning, the computational tool uses a MATLAB optimization algorithm, called 'fmincon.' The 'fmincon' algorithm is a powerful gradient-based approach that leverages derivatives to rapidly minimize a desired value (e.g., MSE), and thus, the algorithm can be applied to simulated MNNs, which are modeled using stiffness equations, but should not be applied to physical MNNs, which possess no equations to accurately differentiate and are subject to noise.

The computational tool also assumes that the principle of force scaling is applied when simulating MNN learning so that the best version of any behavior (i.e., the one that achieves the lowest MSE) can be identified regardless of how many layers (e.g., FIG. 2) constitute the MNN. The shape-morphing behaviors discussed in this present disclosure are characterized by forces, which are applied to input nodes that map to desired output node displacements with specified directions and magnitudes. Although the directions and relative magnitudes of the input forces are also important in achieving a desired behavior, MNNs with different numbers of layers would need their input force vectors to be multiplied by an optimal scaling factor to allow the MNN to best achieve the behavior with the smallest possible MSE for fair comparison. MNNs with fewer layers are inherently more compliant than MNNs with many layers and thus fewer-layer MNNs would require smaller force-magnitude scaling factors so that their input forces don't deform the entire MNN far beyond the desired output node displacements of the intended behavior.

Moreover, MNNs with many layers would require larger force-magnitude scaling factors than MNNs with fewer layers because the input forces of deep-layer MNNs must be sufficiently large to transmit through the many layers to displace the output nodes at all let alone with the displacements necessary to achieve the intended behavior. Since the computational tool assumes stiffness linearity as discussed previously, the optimal force-magnitude scale factor can be directly solved analytically for any desired input-force-to-output-displacement behavior applied to any simulated MNN lattice assigned any combination of beam stiffness values. Thus, as the computational tool simulates MNN learning, optimal scale factors are calculated and multiplied by the desired behavior's input forces every time a new combination of axial stiffness values is assigned to the tunable beams of the MNN to achieve the lowest MSE for any scenario.

It should be noted that although the principle of force scaling could be applied to physical MNNs to achieve reduced MSEs, force scaling was not applied to the experimental study of FIG. 10 since that study did not compare MNNs of different sizes (i.e., different numbers of layers or input and output nodes). Moreover, reasonable input-force magnitudes were selected that could achieve the output-displacement magnitudes of the desired behaviors being learned and the same force magnitudes were applied across comparative studies. If the principle of force scaling were ever applied to physical MNNs, a force-magnitude scale factor would need to be multiplied by the input actuators' signals and swept over a range of values until an optimal value is identified that achieves the lowest MSE for any scenario. Such a sweep would be important since calculating the optimal scale factor directly is difficult for physical scenarios. Thus, applying force scaling to physical MNNs would require substantially more time to learn behaviors.

5.3.11. Computational Tool Verification

The computational tool used to generate the simulation study of the present disclosure was verified using FEA. The passive nonaxial stiffness values (i.e., $K_1$, $K_2$, and $K_3$, defined previously) of every tunable beam used within the computational tool's simulation studies were informed through FEA performed on the tunable beam design of FIG. 17 and FIG. 18 without its voice-coil actuator or brackets as seen in FIG. 34 through FIG. 36 as discussed previously. The passive axial stiffness value of the same beam design (i.e., its axial stiffness without active control) was also calculated using FEA for 6061-T6 aluminum properties and was found to be 1.81 N/mm. This value was also used to inform the computational tool's tunable beams for the purposes of the tool's verification.

Figure 37:
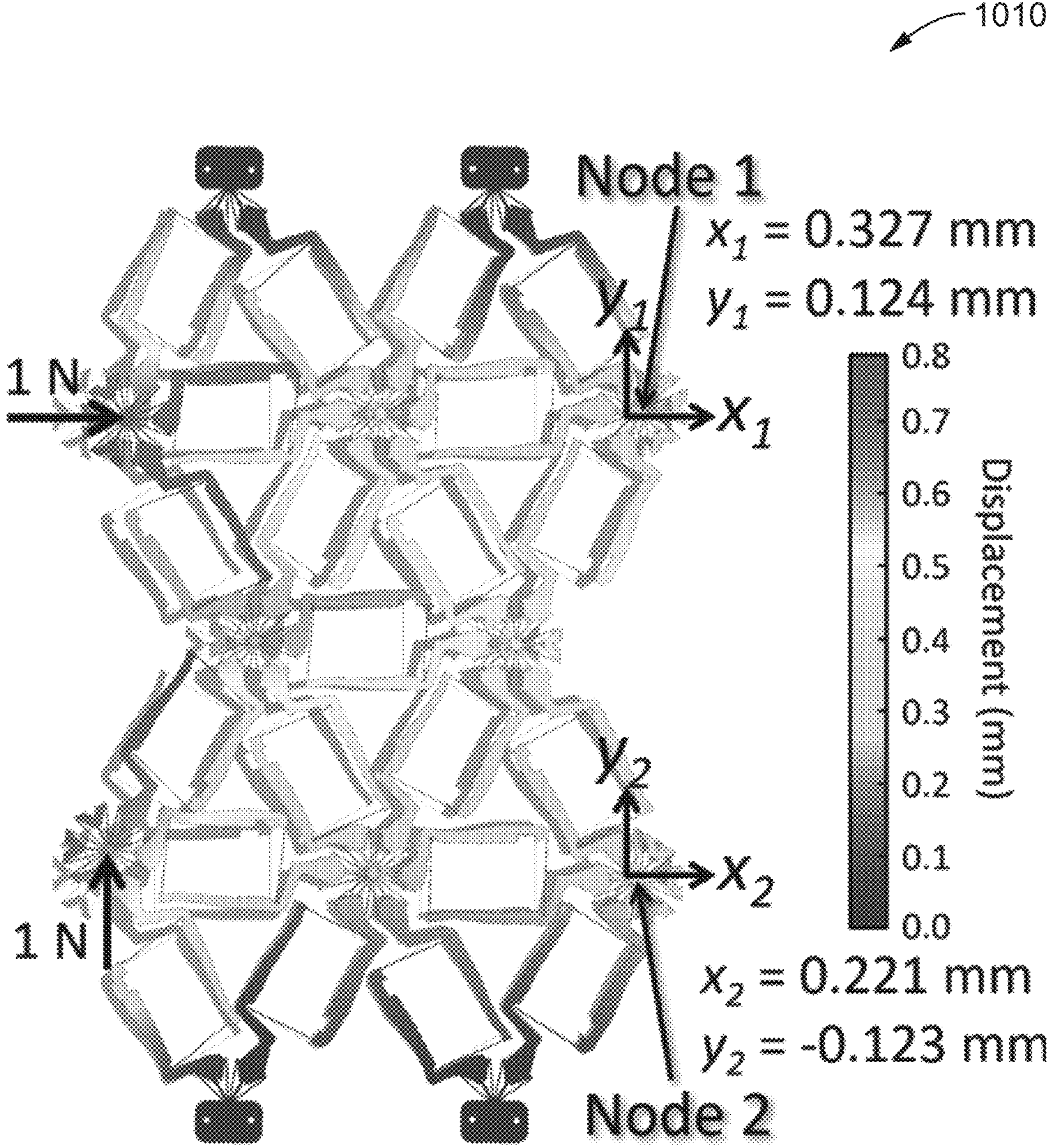
FIG. 37 is a diagram of tunable beam lattice loading for use in Finite Element Analysis (FEA) according to at least one embodiment of the present disclosure.
Figure 38:
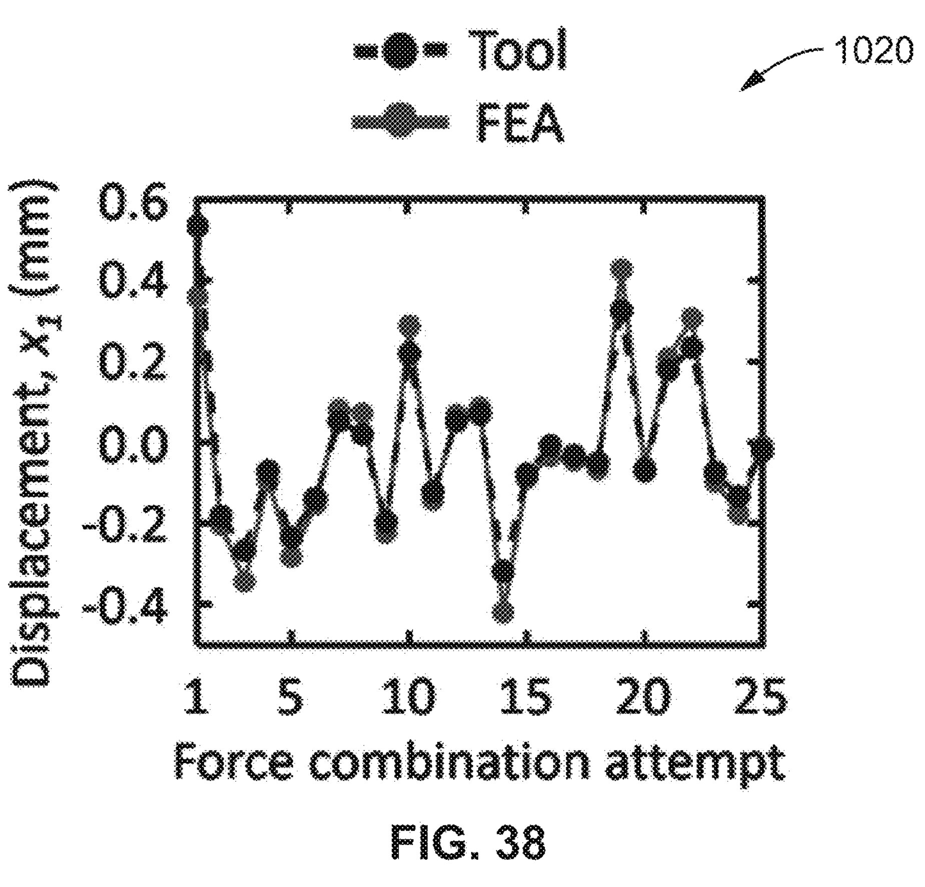
FIG. 38 through FIG. 41 are plots of x and y displacements comparing tool measurements and FEA analysis, utilized according to at least one embodiment of the present disclosure.
Figure 39:
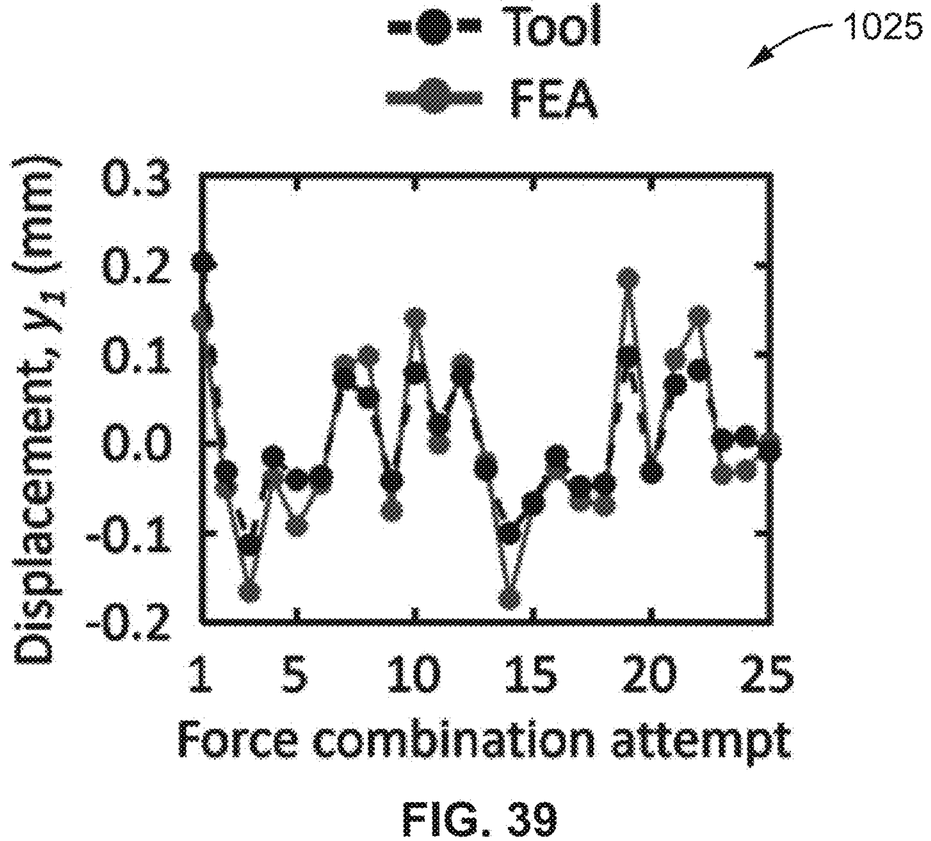
Figure 40:
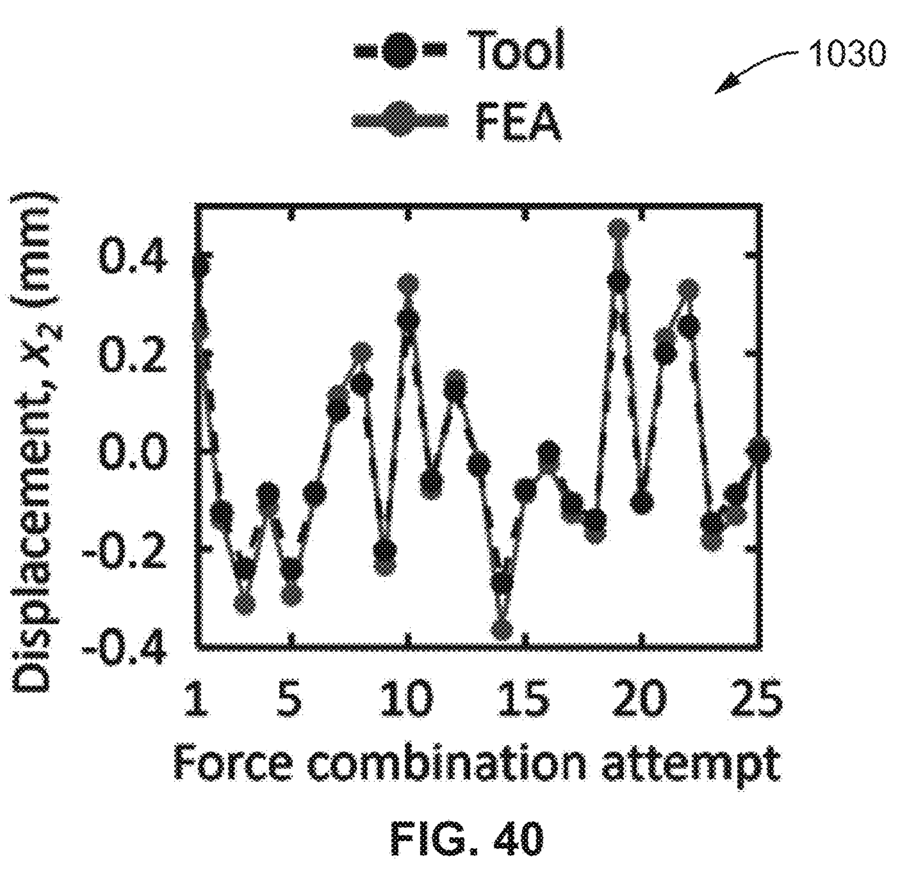
Figure 41:
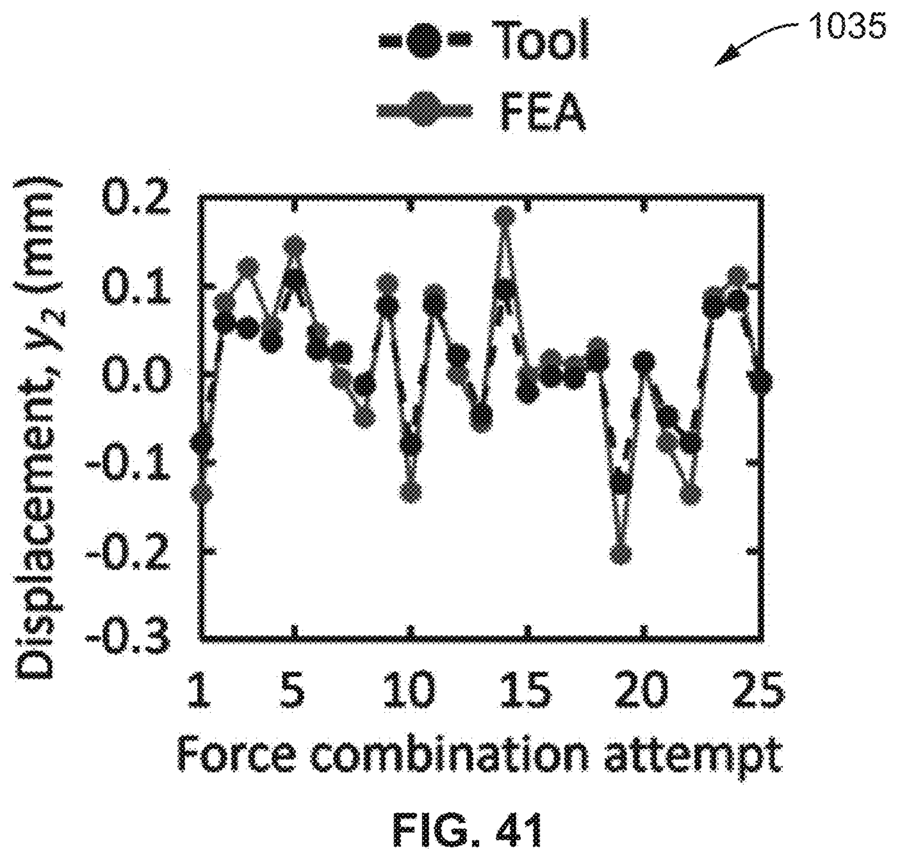

FIG. 37 through FIG. 41 illustrates an examples 1010, 1020, 1025, 1030, and 1035, of computational tool verification using Finite Element Analysis (FEA). In FIG. 37 is seen FEA results of a 21-beam lattice being loaded with a force combination attempt that involved loading the lattice's top input node with a horizontal force of 1 N and loading its bottom input node with a vertical force of 1 N. In FIG. 38 is shown a plot of 1's x-component displacements. In FIG. 39 is shown a plot of Node 1's y-component displacements. In FIG. 40 is shown a plot of Node 2's x-component displacements. In FIG. 41 is shown a plot of Node 2's y-component displacements that result from 25 random but different force combination attempts calculated using FEA and using the computational tool for comparison.

A CAD model of the 21-beam MNN lattice of FIG. 10 without its voice coil actuators or brackets was shown in FIG. 37. FEA was performed on this model using linear deformations and linear material properties of the material used, which by way of example and not limitation was 6061-T6 aluminum, to computationally compare various loading conditions with the same loading conditions applied to the same 21-beam lattice simulated by the computational tool.

Twenty-five different force combination attempts, each with x- and y-components that were selected randomly between ±1 N, were applied to the two input nodes and the resulting displacements of the two output nodes (i.e., Node 1 and Node 2) were calculated and plotted in FIG. 38 through FIG. 41 using both FEA and the computational tool of this present disclosure. It should be noted that $x_1$ and $y_1$ are the displacements of Node 1 as measured relative to the origin of $x_1$ and $y_1$, labeled in FIG. 37, which is located where Node 1 is prior to lattice deformation. Additionally, It should be noted that $x_2$ and $y_2$ are the displacements of Node 2 as measured relative to the origin of $x_2$ and $y_2$, labeled in FIG. 37, which is located where Node 2 is prior to lattice deformation.

The first force combination attempt shown in the plots of FIG. 38 through FIG. 41 correspond to the FEA results shown for FIG. FIG. 37. The fact that the results of the 25 different force combination attempts generated by both the computational tool and FEA correspond well verifies the computational tool's ability to accurately predict the response of general lattice configurations and sizes when subjected to general loading scenarios.

5.3.12. Generation of Example of FIG. 4 and FIG. 5

The computational tool generated the learning results of the MNN lattice shown in FIG. 4 and FIG. 5. The amplitudes of both behaviors' sinusoidal contours on which their target displacements lie were set to 2 mm. With a final scaled force magnitude of 0.5 N applied to every input force of both behaviors, Solution 1 (FIG. 4) and Solution 2 (FIG. 5) achieved both behaviors with a MSE of 0.0047 mm 2 and 0.0008 $mm^2$ respectively. It should be noted that the nodal displacements of both solutions are all shown with an exaggeration factor of 25 to visually enhance the lattice's behavior.

5.3.13. First Simulation Study

The MNNs of the first simulation study of FIG. 14 were all configured as triangular lattices (e.g., FIG. 2) with 8 input and 8 output nodes. Their tunable beams were assigned axial stiffness values between 4 N/mm and −2 N/mm. Learning was simulated using different numbers of layers and different numbers of random behaviors. Random behaviors were generated by selecting input-node forces and output-node displacements with randomly generated x- and y-axis components between ±1 N and ±0.5 mm respectively. To ensure that each new behavior generated was sufficiently different from all previously generated behaviors, a MSE was calculated for each previous behavior by averaging the difference between the previous and new behavior's input forces squared. As long as the MSEs that were calculated from each of the previously generated behaviors all exceeded 0.3 N2, the new behavior was deemed sufficiently different. Once sufficiently different behaviors were generated, three additional unique sets of different behaviors were generated for each scenario.

The simulated MNN then attempted to simultaneously learn each unique set of behaviors four times and the final MSE (i.e., the last MSE that the optimization algorithm achieved by comparing the output-node displacements with the target displacements as described in the main text) of the attempt that yielded the lowest value was averaged with the lowest final MSEs generated by learning the other unique sets of behaviors. The resulting MSE average was plotted for different numbers of layers and behaviors in FIG. 14.

5.3.14. Second Simulation Study

The MNNs of the second simulation study of FIG. 15 were all configured as triangular lattices (e.g., FIG. 2) with tunable beams that were assigned axial stiffness values between 4 N/mm and −2 N/mm. Learning was simulated using different numbers of layers and different numbers of output nodes (It should be noted in these examples that the number of output nodes is equal to the number input nodes; which is by way of example and not limitation). Regardless of the scenario, each MNN attempted to learn the same two behaviors shown in FIG. 4 and FIG. 5, except that the amplitudes of both behaviors' sinusoidal contours on which their target displacements lie, were set to 2.5 mm and the shearing input-node forces of the second behavior pushed downward instead of upward with a magnitude of 1 N. Each scenario was attempted 15 times and the MSE of the simulation that produced the lowest final value was plotted in FIG. 15.

5.3.15. Third Simulation Study

The MNNs of the third simulation study of FIG. 16 had 8 input and 8 output nodes. Their tunable beams were assigned axial stiffness values between 4 N/mm and −2 N/mm. Learning was simulated using both triangular and square lattices shown at the bottom of FIG. 16, that learn different numbers of random behaviors with two, four, and eight layers. Random behaviors were generated the same way they were in the first simulated study. Once sufficiently different behaviors were generated, three additional unique sets of different behaviors were generated for each scenario. The simulated MNN then attempted to simultaneously learn each unique set of behaviors four times and the final MSE of the attempt that yielded the lowest value was averaged with the lowest final MSEs generated by learning the other unique sets of behaviors. The resulting MSE average was plotted at the top of FIG. 16 for the different triangular and square lattice scenarios. Dotted lines correspond to two layers, dashed lines correspond to four layers, and solid lines correspond to eight layers.

5.4. Example Software Embodiment

Appendix A contains an example of computer program instructions for implementing MNNs according to an embodiment of the technology of this disclosure. In this example, the control code comprises MATLAB instructions that were tested on a personal computer (Xeon E5-1607 v2). It will be appreciated that the instructions can be ported to other languages and executed on other processors as desired for implementing the MNNs.

6. Additional Embodiments to be Tested

Future studies will be conducted to determine how well MNNs learn dynamic behaviors such as stress-wave propagation in contrast to the steady-state shape-morphing behaviors studied in this present disclosure. Other future studies will examine how MNN learning is affected by (i) beams that can independently tune their stiffness along multiple directions, (ii) beams that can only change their stiffness in discrete ways (e.g., beams that achieve binary stiffness), and (iii) different arrangements of tunable beams configured beyond triangular or square planar tessellations (e.g., FIG. 16) including randomly packed (irregular lattices) configurations or 3D arrangements that occupy desired volumes for practical material applications.

Figure 42:
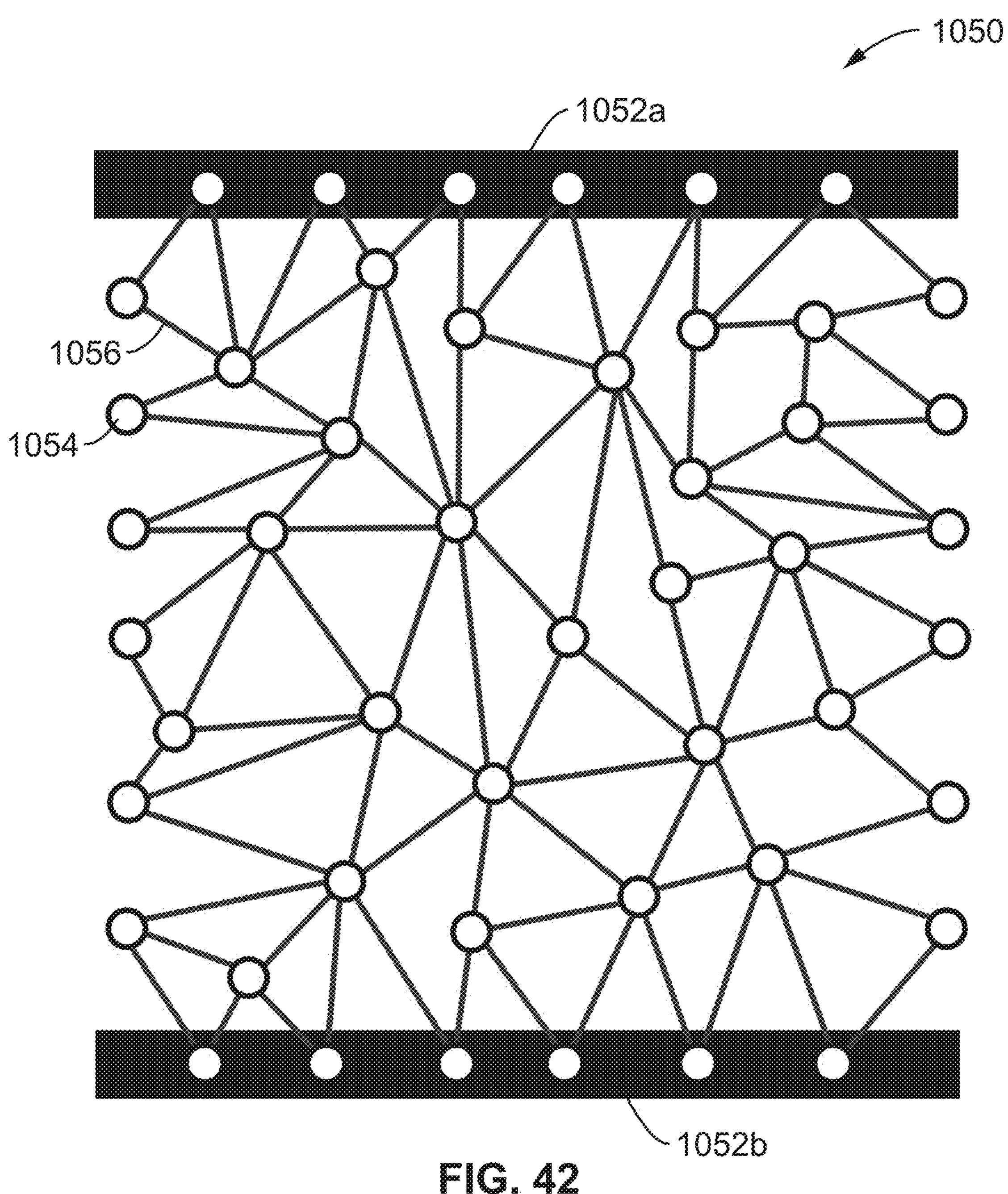
FIG. 42 is a schematic of an MNN beam lattice having a random arrangement of tunable beams, according to at least one embodiment of the present disclosure.

FIG. 42 illustrates an example embodiment 1050 of a mechanical neural network (MNN) with a random (e.g., irregular) arrangement of tunable beams, such as exemplified here between two ground rails 1052*a*, 1052*b*. The present disclosure anticipates that MNN lattices having a random distribution can be fabricated and utilized; while the effects of which require additional study on MMN learning. Moreover, MNNs consisting of beams that exhibit different nonlinear stiffness profiles beyond tangent functions, or that use different algorithms beyond GA, PPS, and fmincon to learn their desired behaviors should also be investigated. Lastly, studying the effect of tunable beam size on MNN learning (particularly on the micro-scale) is also important for enabling practical architected materials that learn desired behaviors.

7. Stiffness Beam MNN 7.1. Stiffness Beam Lattice

The disclosed MNN embodiment learns by tuning the axial stiffness values of its interconnected beams, which propagate mechanical stress waves through various layers of nodes, to fit input loads to desired output displacements.

Figure 43:
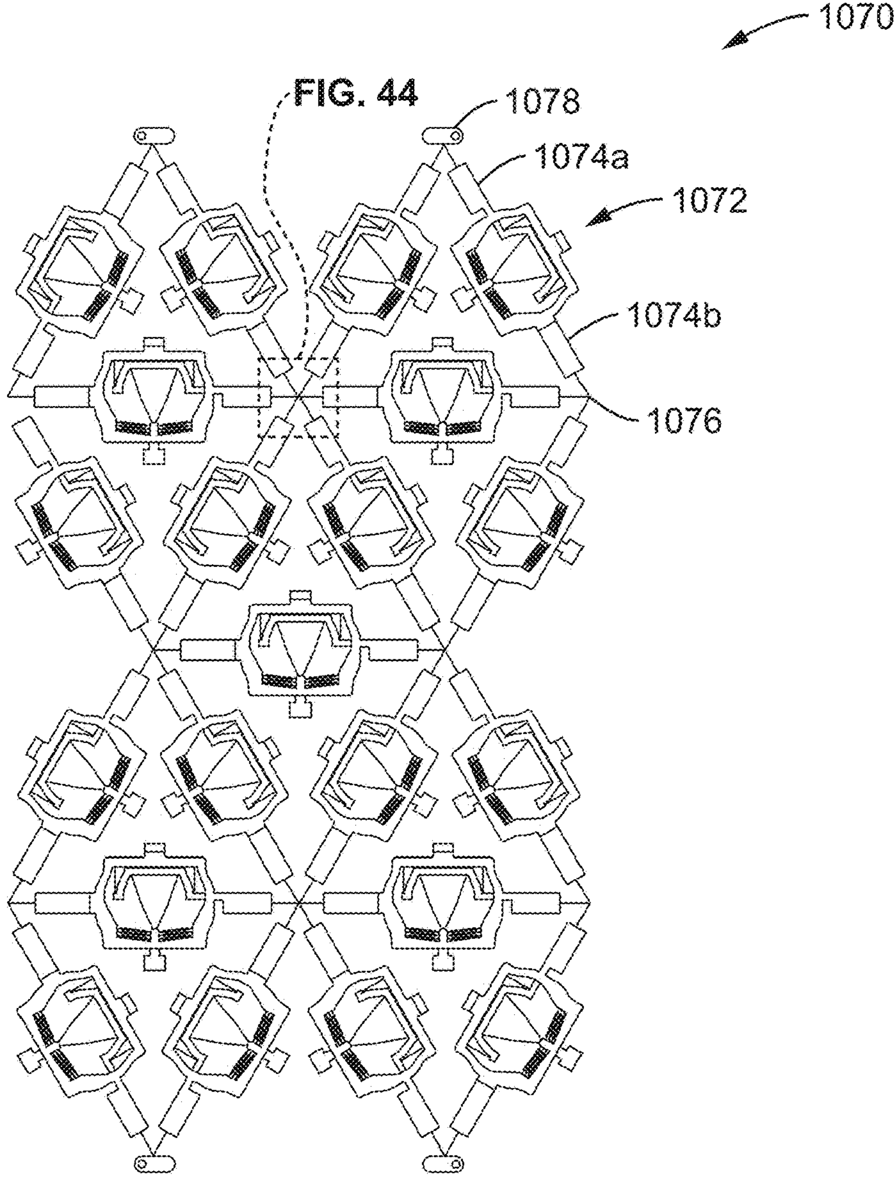
FIG. 43 and FIG. 44 are schematics of an MNN lattice comprising binary-stiffness beams, according to at least one embodiment of the present disclosure.
Figure 44:
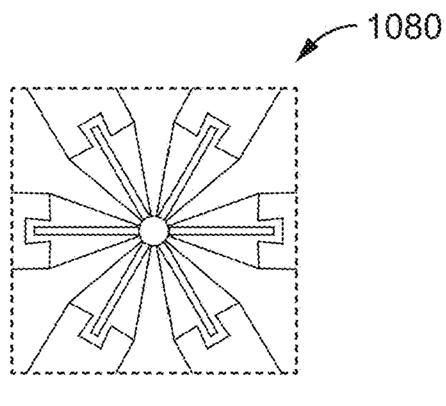

FIG. 43 and FIG. 44 illustrate an example embodiment 1070 of an MNN which learns behaviors using binary-stiffness beams 1072 of FIG. 43 capable of changing their stiffness between a first and second end 1074*a*, 1074*b* of the beam in response to its learning. In the embodiment shown, each beam is configured for switching between two different states of axial stiffness; although it should be appreciated that this can be extended to any number of finite states, or to a range of stiffness values depending on the specific configuration adopted.

In the lattice depicted, the beams are interconnected with rotary flexures 1076, one of which 1080 is shown in FIG. 44, to accommodate deformations. In addition, some of the beams can be connected to a fixed region(s) 1078, referred to herein as a ground. This example of FIG. 43 illustrates a 21-beam triangular lattice design, which was used to experimentally demonstrate operation. It should be appreciated that lattices, of two or three dimensions, of any desired number of tunable beams, and in various geometric configurations can be readily implemented in the same manner as described throughout the present disclosure.

The advantage of this binary stiffness approach is that it greatly simplifies the learning process and dramatically increases learning speed. Instead of requiring a fast high-resolution actuator to accurately prescribe each beam's axial stiffness through use of active closed-loop control (e.g., the design shown in FIG. 9, the binary-stiffness approach would only require crude actuators that can push and pull with forces that can exceed the threshold necessary to trigger the bistable switch of the beam. In addition, since the two states of stiffness are passively achieved by the beam's flexure topology, no closed-loop control is necessary to achieve and maintain the desired axial stiffness values. Thus, the circuitry necessary for MNN learning is greatly reduced and simplified. For example, the DAC and ADC are no longer necessary and other simplifications can be made. Moreover, since the beams can only achieve two states of stiffness instead of an infinite number of values between an upper and lower limit, the optimization algorithm for selecting the best combination of axial beam stiffness values for achieving a desired set of behaviors is significantly simplified and can thus be achieved with orders of magnitude greater speed. Finally, unlike the actively controlled modular beams of FIG. 9 that need to be individually calibrated and assembled within their lattice, the binary-stiffness beams of FIG. 43 can be fabricated within a single monolithic lattice that requires no calibration. Thus, fabricating large binary-stiffness lattices that consist of many beams at multiple scales (including on a micro-scale) becomes simplified and more practical.

Although MNN designs that achieve a continuous range of stiffness between an upper and lower limit (e.g., FIG. 9) can typically learn more behaviors and provide higher accuracy than binary-stiffness MNN designs (e.g., FIG. 43) consisting of the same number of beams, binary-stiffness MNNs provide a more practical solution for learning behaviors faster insofar as such designs can learn enough behaviors with sufficient accuracy. In the present disclosure, the learning accuracy and speed of binary-stiffness MNNs are characterized for MNN lattices of different sizes and for different numbers of behaviors learned. The effect of their beam's low-stiffness value and the difference between their high and low-stiffness values on the overall learning capabilities of such MNNs are also quantified.

7.2. Stiffness Beam Method 7.2.1. Binary Stiffness Beam Design

The binary beams utilized in this embodiments of FIG. 43 are described in the following paper: "Kuppens, P. R., Bessa, M. A., Herder, J. L., Hopkins, J. B., 2021, "Monolithic Binary Stiffness Building Blocks for Mechanical Digital Machines," Extreme Mechanics Letters, 42: 101120". The design therein uses principles of constraint manipulation and stiffness cancelation to achieve two dramatically different states of stiffness.

7.2.3. Learning Approach

The computational tool simulates MNN learning according to the approach introduced and demonstrated previously but with an adapted optimization algorithm suited to MNN lattices consisting of binary-stiffness beams.

Figures 45, 46, 47, 48:
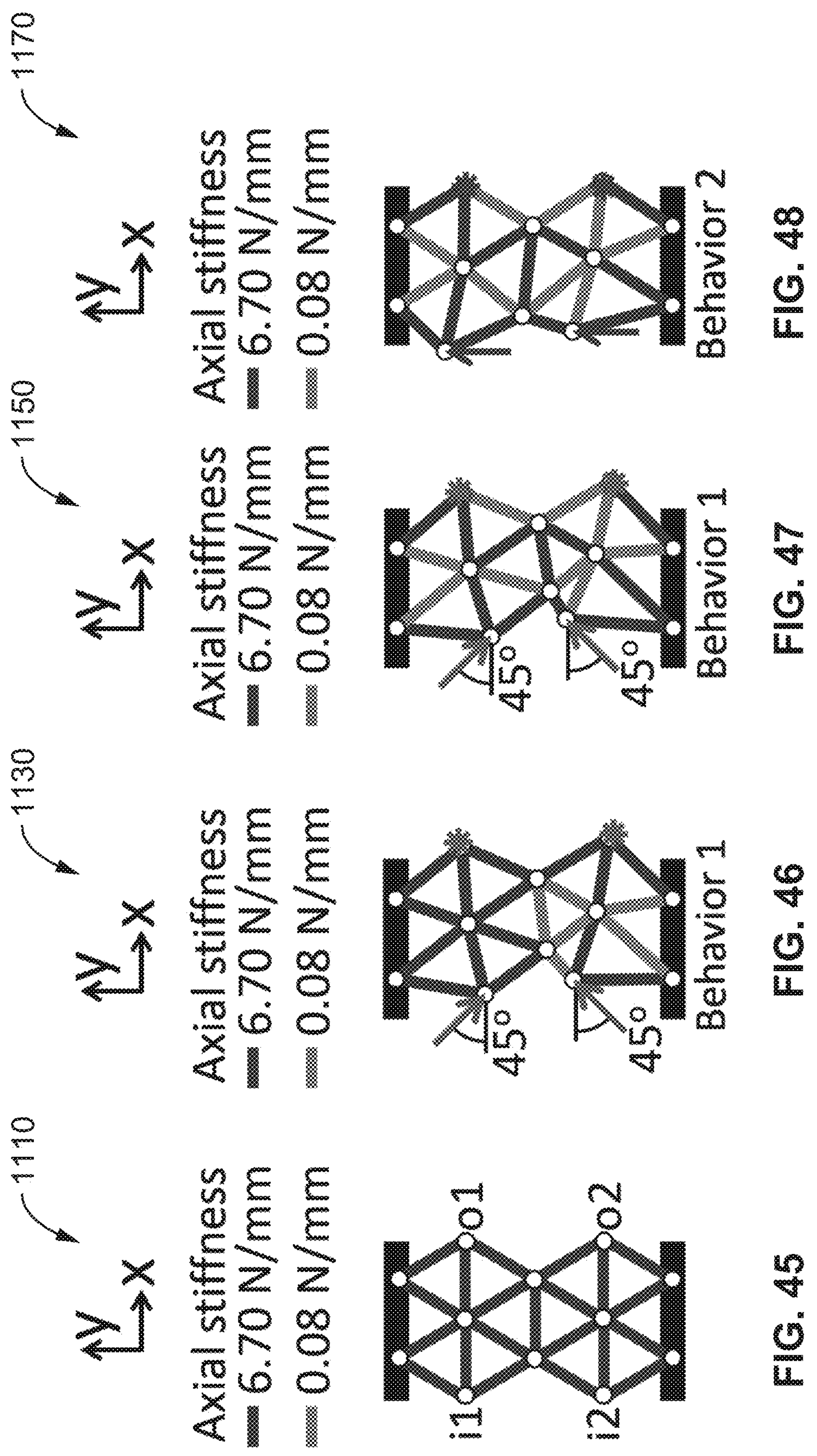
FIG. 45 through FIG. 48 are diagrams of axial stiffness for undeformed 2-layer-deep lattices of binary-stiffness beams, as utilized for an embodiment of the present disclosure.

FIG. 45 through FIG. 48 illustrate an undeformed 2-layer-deep lattice made of binary-stiffness beams with behaviors 1110, 1130, 1150 and 1170. In FIG. 45 is shown a lattice similar to the beam lattice of FIG. 9 with 2 inputs (i.e., i1 and i2) and 2 outputs (i.e., o1 and o2) nodes. In FIG. 46 the lattice can learn a single behavior. In FIG. 47 the initial behavior has a different combination of axial stiffness values than in FIG. 46, and then can move to another simultaneously Behavior 2 in FIG. 48. The lattices shown in all parts of this figure were graphically generated by the computational tool of this present disclosure for simulating the learning process of various binary-stiffness mechanical neural-network (MNN) scenarios.

To understand the learning approach, consider a 2 layer-deep triangular lattice with 2 input and 2 output nodes which is graphically depicted by the simulation tool as the simplified lattice shown in FIG. 45.

Each binary-stiffness beam within the lattice is represented by a single line and each node is represented by a circle. The thick bars along the top and bottom of the lattice represent grounded bodies that are held fixed.

Suppose it is desired that the lattice learns one shape-morphing behavior, which is labeled 'Behavior 1' in FIG. 46. This behavior is achieved when the lattice's upper input node, labeled 'i1,' is pushed down and to the right with a 45 degree angle and its lower input node, labeled 'i2,' is pushed up and to the right with a 45 degree angle using the same force magnitude as the force on the upper input node, and the resulting upper output node, labeled 'o1,' responds by displacing along the x-axis 0.1 mm and along the y-axis 0.04 mm while the lower output node, labeled 'o2,' responds by displacing along the x-axis 0.15 mm and along the y-axis −0.06 mm. It should be noted from FIG. 46 that the input-node forces and the desired output-node displacement targets of the behavior are represented as arrows and asterisks respectively.

To learn this behavior in the midst of changing and random loading scenarios at the input nodes, strain gauge sensors should be attached to the base of each beam's flexure bearings. These strain gauge sensors would determine how much each beam has contracted or expanded along the beam's axis as a consequence of the lattice being loaded so that the displacements of all of its nodes can be calculated. And since the axial stiffness of each beam is always known (since it is assigned), the input loads that caused the displacements of the nodes can be indirectly calculated so that the lattice can determine how it is being externally loaded.

A random combination of axial stiffness values (i.e., either the beam's high or low-stiffness state) would initially be assigned to each beam within the lattice. When the lattice senses that it is being loaded with the forces of the desired behavior, the resulting displacements of the output nodes would be used to calculate a mean-squared error (MSE) by subtracting their displacements from the target displacements of the desired behavior and averaging the resulting differences squared.

The beams would then be assigned a different combination of axial stiffness values according to an optimization algorithm so that when the process of loading, measuring, and calculating the MSE is repeated, the MSE is minimized to a final MSE value (i.e., the local minimum MSE onto which the optimizer converged) that corresponds with a working combination of beam stiffness values, which allows the lattice to achieve the desired behavior. It should be noted from FIG. 48 that a working combination of axial stiffness values was identified that enabled the lattice to achieve Behavior 1 with a final MSE of 0.00036 $mm^2$. Each of the two shades of representing beams in FIG. 46 represent the two states of axial stiffness that the beam can achieve. An exaggeration factor of 750 was multiplied by the displacements of all the nodes in the lattice of FIG. 46 aid in making the behavior more visibly noticeable.

It is important to recognize that there are multiple different combinations of beam stiffness values in addition to the one shown in FIG. 46 that can achieve the same behavior.

Thus, the same learning approach can enable MNN lattices to learn new behaviors in addition to the previous behaviors learned.

Suppose it is desired that a new combination of beam stiffness values is identified that achieves both Behavior 1 (e.g., FIG. 47) and a new behavior, which is labeled 'Behavior 2' and shown in FIG. 48. This new behavior is achieved when both input nodes, labeled 'it and 12,' are pushed up with vertical forces of equal magnitude without either output nodes displacing at all. It should be noted from FIG. 48 that the input-node forces and the desired output-node displacement targets of the behavior are represented as arrows and asterisks respectively.

To achieve both behaviors simultaneously, the combination of axial stiffness values that was identified for achieving only Behavior 1 from the previous learning attempt (i.e., the combination shown in FIG. 46) would be used as the new starting point (i.e., the initial stiffness combination assignment). The beams would then be assigned different combinations of axial stiffness values according to the same optimization algorithm so that when the process of loading, measuring, and calculating the MSE is repeated, the MSE is minimized until a new working combination of beam stiffness values is identified that allows the lattice to achieve both behaviors simultaneously. It's important that the MSE being calculated and minimized include the squared differences of the output-node displacements and the corresponding target displacements resulting from all the behaviors averaged together (i.e., both Behavior 1 and Behavior 2).

A possible solution is shown with the same exaggeration factor of 750 in FIG. 47 and FIG. 48. It should be noted that the same combination of axial stiffness values assigned to the lattice successfully achieved the two desired behaviors simultaneously with a final MSE of 0.0036 $mm^2$. This final MSE is an order of magnitude larger than the previous final MSE generated when only Behavior 1 was learned because learning more behaviors is generally more demanding than learning fewer behaviors. And it becomes more difficult to find a working combination of axial stiffness values, which produces output displacements that accurately achieve the target displacements of multiple behaviors simultaneously, especially when only two states of stiffness are available for each beam and only 21 beams are present. It should be noted also that the stiffness combination found in FIG. 47 and FIG. 48 are different from the original combination found in FIG. 46 but both combinations successfully achieve Behavior 1.

The optimization algorithm used to assign combinations of axial stiffness values to the beams within the MNNs of this present disclosure was specially customized to help binary-stiffness lattices to learn quickly and effectively. The algorithm randomly chooses a beam in the lattice and changes its axial stiffness to its alternate state. It then checks to see if loading the input nodes with the desired behaviors decreases the MSE of the output nodes given the new state. If it does not decrease the MSE, other beams are randomly assigned different states in turn to check whether the resulting MSE decreases. Any time the MSE decreases, the beam that made the difference remains switched to its new stiffness state and the entire process repeats. The algorithm continues until it finds a combination of axial stiffness values that can't produce a lower MSE when the stiffness state of every beam is individually switched.

Finally, it's important to recognize that when MNN learning is simulated to compare different scenarios, fair comparisons are most effectively achieved when the principle of load scaling is applied. Once the lattice has identified that it is being loaded with the forces specified in one of its desired behaviors (i.e., the input nodes are being loaded in the desired direction and with the desired magnitude ratios), an optimal scale factor is calculated that, when multiplied to all the input forces, produces the smallest MSE for every loading attempt in the learning process. This load scaling approach ensures that learning comparisons between lattices with different numbers of layers in particular are fairer because lattices with more layers typically need larger load magnitudes to push through the layers and displace the output nodes appreciable amounts. Thus, load scaling was applied to all the simulated results and comparisons of this present disclosure.

7.3. Further Discussion

Despite the many advantages discussed in the introduction, the downside of binary-stiffness MNN lattices of this type seen in FIG. 43 (i.e., the one simulated in FIG. 45 through FIG. 48) compared to actively-controlled MNN lattices of the type seen in FIG. 10, is that it's more difficult for binary-stiffness lattices to learn numerous behaviors with sufficient accuracy (i.e., a low enough final MSE so that the lattice actually achieves the desired behaviors). Although the lattice of FIG. 43 can learn the behaviors detailed in the simulation of FIG. 45 through FIG. 48 with impressive accuracy, it would be difficult for the lattice to learn many other behaviors since it can only use 21 beams and each beam can only achieve two discrete states of stiffness, which is one reason why the full lattice of FIG. 44 was not fabricated and tested experimentally. However, it is yet unknown whether large MNN lattices consisting of many binary-stiffness beams will show substantial promise for learning mechanical behaviors.

This section employs the simulation tool discussed previously to determine how large binary-stiffness MNN lattices would need to be, how large the differences between the high and low-stiffness states of their beams would need to be, and how small the low-stiffness states of their beams would need to be to successfully learn behaviors with sufficient accuracy. A case study is also provided to determine when a binary-stiffness MNN lattice has learned the maximum number of behaviors that is possible for it to learn. A measure for how long the learning process takes for each study is also provided. All the binary-stiffness beams that constitute the lattices simulated in the studies of this section are assumed to have the same nonaxial stiffness values, beam length, axial beam displacement limits, and packing configuration (i.e., triangular) as detailed in Section 7.2.2.

7.3.1 Study 1—Number of Layers and Stiffness Difference

The first study examined how binary-stiffness MNN learning is affected by the number of lattice layers and the difference between the high and low-stiffness values of the binary-stiffness beams that constitute the lattices, which also consist of 8 input and 8 output nodes. The low-stiffness state of the binary-stiffness beams were assumed to be 0.08 N/mm. The lattices of this study simulated MNN learning for two simultaneous behaviors.

Figure 49:
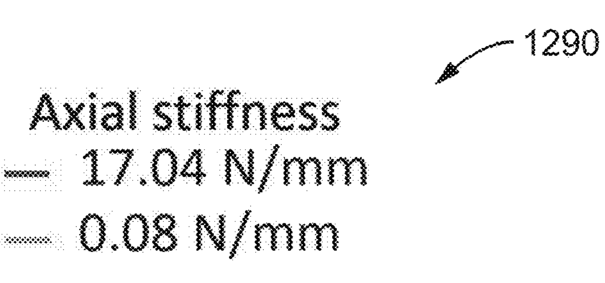
FIG. 49 and FIG. 50 are schematics of MNN beam lattices in testing axial stiffness, as utilized for an embodiment of the present disclosure.
Figure 49:
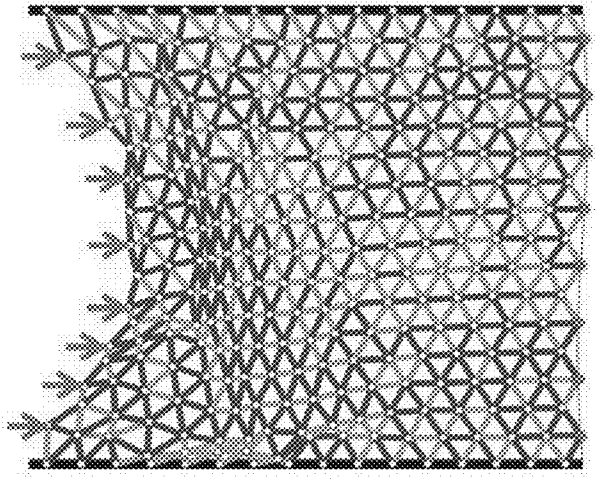
Figure 50:
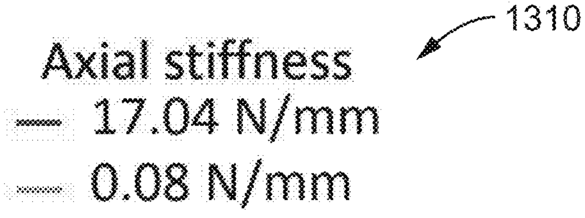
Figure 50:
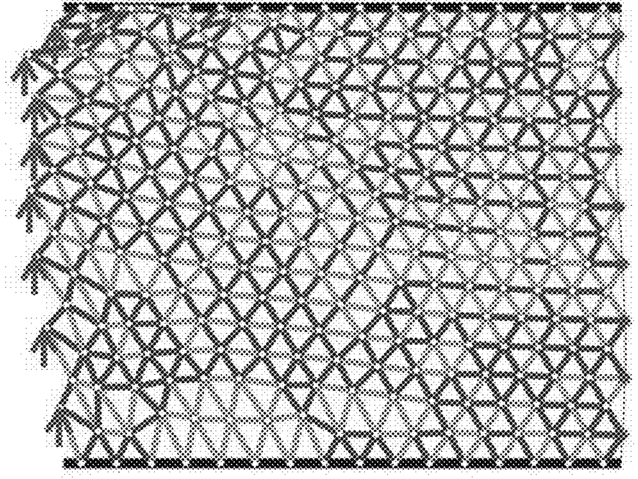
Figure 51:
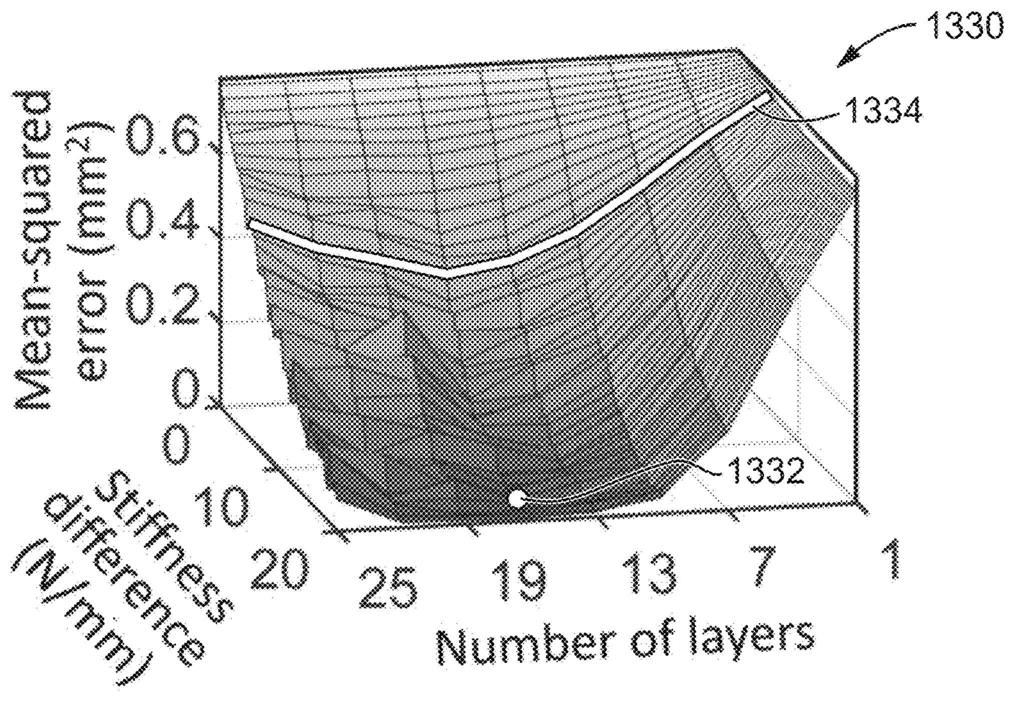
FIG. 51 and FIG. 52 are plots of Mean Squared Error (MSE) and number of iterations for a first study of FIG. 49 and FIG. 50, as utilized for an embodiment of the present disclosure.
Figure 52:
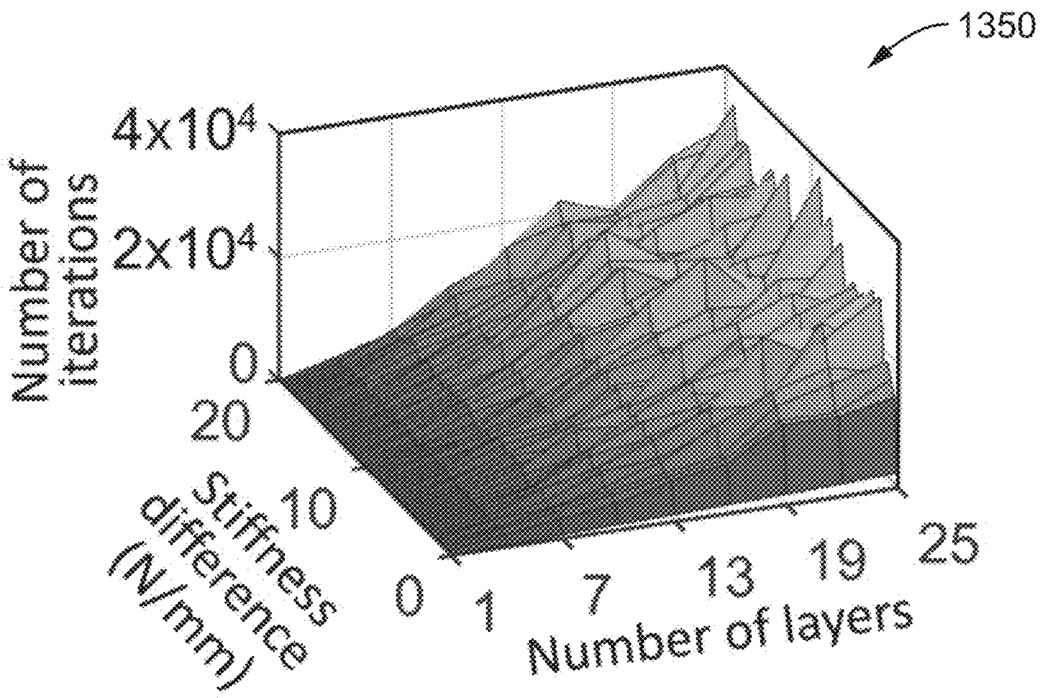

FIG. 49 through FIG. 52 illustrate example embodiments and results 1290, 1310, 1330 and 1350 of lattices and graphs of error and iterations. An example 16-layer lattice with a 16.96 N/mm difference in axial stiffness successfully learned the first desired sinusoidal behavior 1290 of FIG. 49 and the second desired sinusoidal behavior 1310 of FIG. 50 simultaneously. A plot of final mean-squared error (MSE) 1330 is seen in FIG. 51, and a plot of the number of iterations generated by the simulation tool for different numbers of layers and differences in axial stiffness values 1350 is seen in FIG. 52.

The first behavior, shown FIG. 49, was achieved when the lattice's input nodes were all pushed to the right with horizontal forces of the same magnitude and the output nodes displaced in response to target locations that lie along a sinusoidal curve with an amplitude of 1.25 mm. The second behavior, shown in FIG. 50 was achieved when the lattice's input nodes were all pushed up with vertical forces of the same magnitude and the output nodes displaced in response to target locations that lie along an inverted sinusoidal curve with an amplitude of 1.25 mm.

Many different MNN lattices from 1 to 25 layers deep and with 0 to 20 N/mm differences in stiffness between the high and low-stiffness state of the constituent binary-stiffness beams attempted to learn these two behaviors through simulation. One example 16-layer lattice with a 16.96 N/mm difference in axial stiffness successfully learned the two desired behaviors simultaneously with a final MSE of 0.0077 $mm^2$ as shown with an exaggeration factor of 40 in FIG. 49 and FIG. 50. It should be noted that although the lattice successfully achieved both behaviors using the same combination of axial stiffness values, the input nodes needed to be significantly displaced to achieve the desired displacement magnitude of the output nodes. This effect can be reduced and binary-stiffness MNN learning can typically be improved using rotary flexures FIG. 44 that exhibit greater compliance about their rotational axis. One reason for this is because the more compliant the rotary flexures are, the less strain energy they absorb from the work of the input forces and thus the more the output nodes can typically displace.

The resulting plot of the first study is provided in FIG. 51 showing 1330 the lowest (i.e., best) final MSE of 3 different learning attempts using 3 randomly generated starting assignments (i.e., combinations of beam axial-stiffness values). For scenarios with stiffness differences larger than 10 N/mm, the lowest MSE of 8 starting assignments were used to refine the optimal region. The dot 1332 corresponds with the example provided in FIG. 49 and FIG. 50. It should be noted that this example lies within the optimal region of the plot. The cross-section curve 1334 seen in the plot represents all the final MSE's that could be achieved by binary-stiffness MNNs with different numbers of layers (i.e., an axial stiffness difference of 6.62 N/mm). It should be noted from the plot that binary-stiffness MNNs can generally learn with higher accuracy (i.e., lower MSE) the more layers they possess and the larger the difference in stiffness states that their binary-stiffness beams can achieve. This trend makes sense since MNNs consisting of more binary-stiffness beams should typically allow for more combinations of axial stiffness values that achieve the same behaviors. Moreover, the larger the difference in axial stiffness states that each beam can achieve, the more differently the lattice can be made to behave. It should be noted, however, that MNN lattices can begin losing the ability to learn accurately with too many layers. Even with the principle of load scaling discussed in Section 7.2.3, lattices can become too deep for the loads on the input nodes to cause the output nodes to displace at all. This limitation arises in part because the beams are limited to contract and extend by a fixed amount (i.e., ±7 mm in this study) and they can't collide or pass through one another in practice. Thus, input-node forces can only penetrate so deep even if they are optimized to achieve the lowest achievable MSE.

The number of iterations for each of the scenarios simulated in the plot 1330 of FIG. 51 are also provided in the plot 1350 of FIG. 52. An iteration is defined as every time the lattice's input nodes are loaded to determine the resulting displacements of the lattice's output nodes during the learning process. Thus, this number multiplied by how long it would require to load the input nodes of a physical MNN and then measure its resulting output-node displacements is how much time would be required for a fabricated MNN of the kind studied here to learn the two sinusoidal behaviors. It should be noted from the trend in FIG. 52 that binary-stiffness MNNs with more layers require more time to learn since there are more beams with stiffness states that need to be switched during the optimization algorithm.

7.3.2. Study 2—Stiffness Difference and Low Stiffness State

The second study examined how binary-stiffness MNN learning is affected by the difference between the high and low-stiffness values of the beams that constitute the lattices and the value of the low-stiffness state of the beams. The lattices of this study consisted of 7 layers, 8 input nodes, and 8 output nodes. MNN learning was simulated on these lattices for the same two sinusoidal behaviors described in Section 7.3.1.

Figure 53:
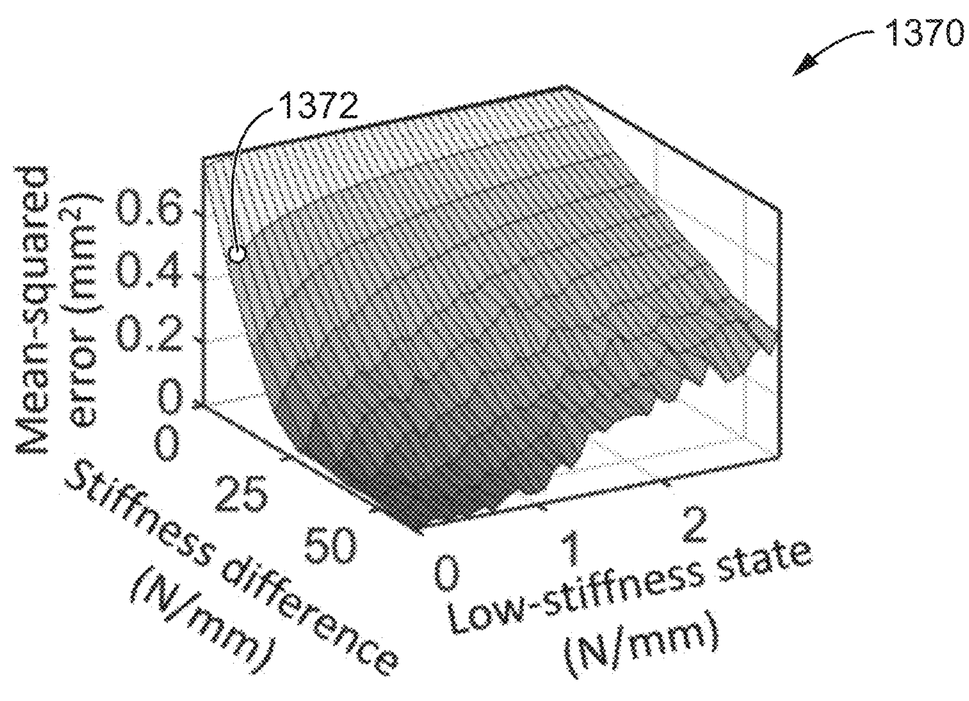
FIG. 53 and FIG. 54 are plots of Mean Squared Error (MSE) and number of iterations for a second study of FIG. 49 and FIG. 50, as utilized for an embodiment of the present disclosure.
Figure 54:
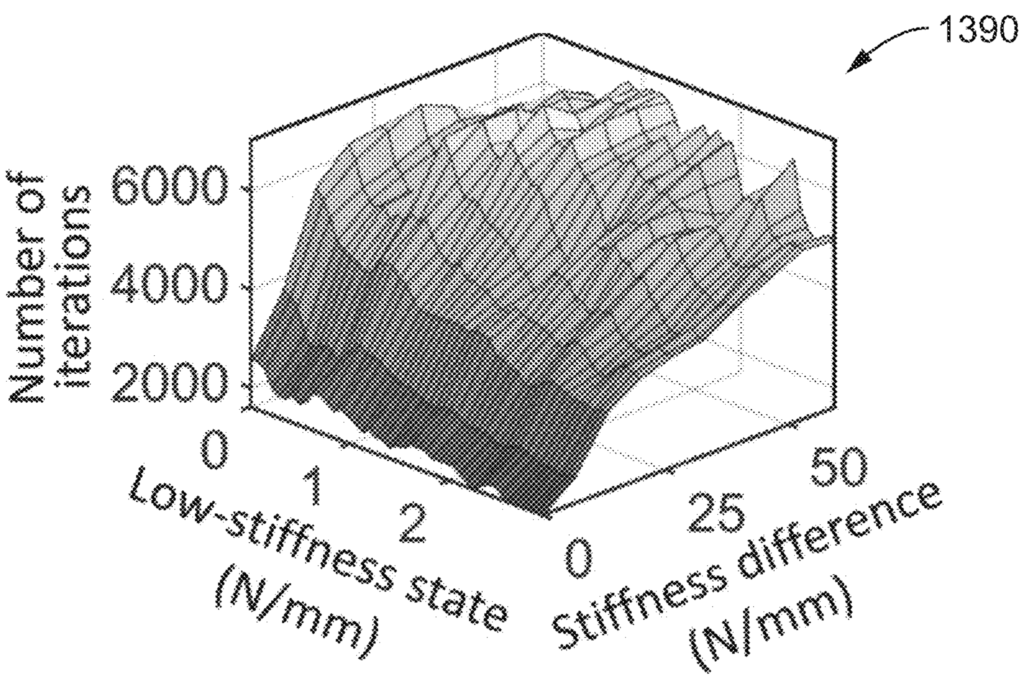

FIG. 53 and FIG. 54 illustrate plots 1370, 1390 for this second study. The resulting plot of FIG. 53 shows the lowest (i.e., best) final MSE of 3 different learning attempts using 3 randomly generated starting assignments (i.e., combinations of beam axial-stiffness values). The dot 1372, corresponds with the final MSE that would be achieved by a MNN that consists of the beam design used in the lattice of FIG. 43 (i.e., an axial stiffness difference of 6.62 N/mm and a low-stiffness state of 0.08 N/mm). It should be noted from the plot that binary-stiffness MNNs can generally learn with higher accuracy (i.e., lower MSE) the larger the difference in stiffness states that their binary-stiffness beams can achieve and the smaller their low-stiffness state is. Thus, the larger the ratio a binary-stiffness beam's stiffness difference to low-stiffness state is, the better the beam is for facilitating MNN learning.

In FIG. 53 is seen the final mean-squared error (MSE); while number of iterations is seen in FIG. 54 as generated by the simulation tool for various differences in axial stiffness values and different low-stiffness states for a 7-layer binary-stiffness MNN that learns the two sinusoidal behaviors of FIG. 49 and FIG. 50.

The number of iterations (defined in Section 7.3.1) for each of the scenarios simulated in the plot of FIG. 53 are also provided in the plot of FIG. 54. It should be noted from the trend in the plot of FIG. 54 that binary-stiffness MNNs with larger differences in stiffness tend to require more time to learn since beams that achieve larger changes in stiffness are more likely to produce a significant system change during the learning process and thus would require more iterations to settle on a solution. This trend is less obvious to see in the plot of FIG. 52 since increased layer numbers increases the learning time significantly more than the difference between beam stiffness states.

7.3.3. Study 3—Number of Random Behaviors

The third study examines how binary-stiffness MNN learning is affected when a lattice attempts to learn different numbers of random behaviors. The lattice of this study consists of 7 layers, 8 input nodes, and 8 output nodes. Its binary stiffness beams simulate the beams used in the lattice of FIG. 43 in that they achieve the same high and low-stiffness states (i.e., 6.70 N/mm and N/mm).

The computational tool was used to simulate the lattice attempting to learn different numbers of randomly generated behaviors. Random behaviors were generated by selecting input-node forces and output-node displacements with randomly generated x- and y-axis components between ±1 N and ±0.5 mm respectively. To ensure that each new behavior was sufficiently different from the previously generated behaviors, a MSE was calculated for each previous behavior by averaging the difference between the previous and new behavior's input forces squared. As long as the MSEs that were calculated from each of the previously generated behaviors all exceeded 0.3 N2, the new behavior was deemed sufficiently different. Once 1 to 100 sufficiently different behaviors were generated, three additional unique sets of different behaviors were generated for the lattice to learn. The lattice then attempted to simultaneously learn each unique set of behaviors three different times and the lowest final MSE was averaged with the lowest final MSEs generated by learning the other unique sets of behaviors. The resulting MSE average was plotted as described below.

Figure 55:
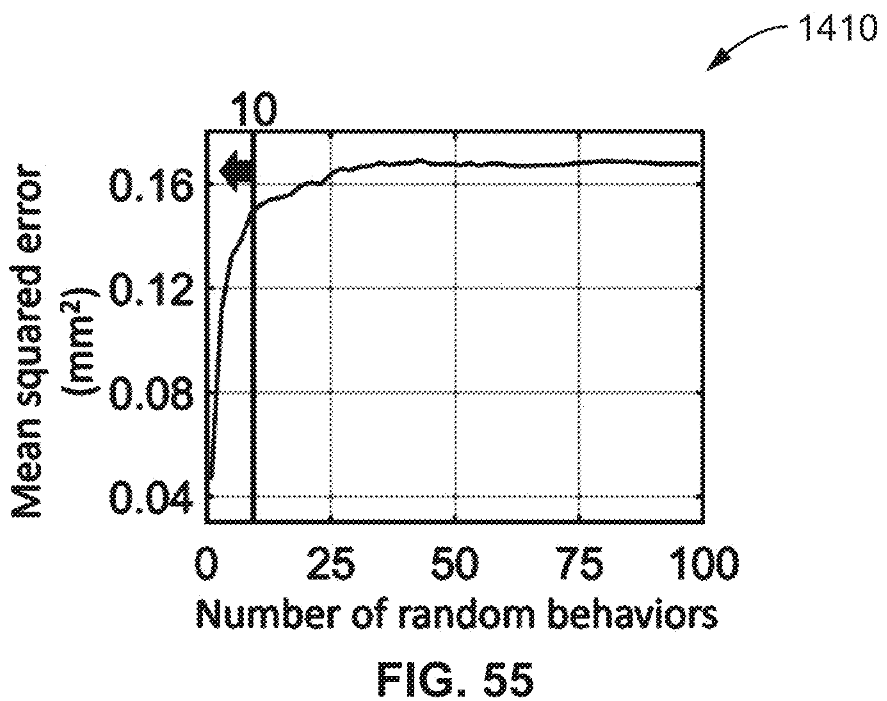
FIG. 55 and FIG. 56 are plots of Mean Squared Error (MSE) and number of iterations for a third study of FIG. 49 and FIG. 50, as utilized for an embodiment of the present disclosure.
Figure 56:
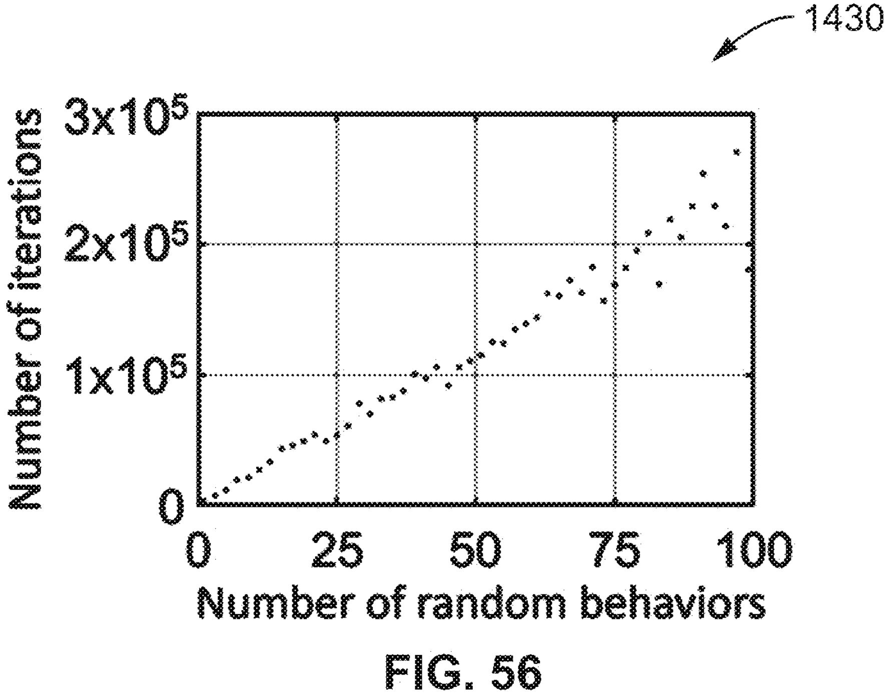
Figures 57, 58, 59, 60, 61, 62, 63:
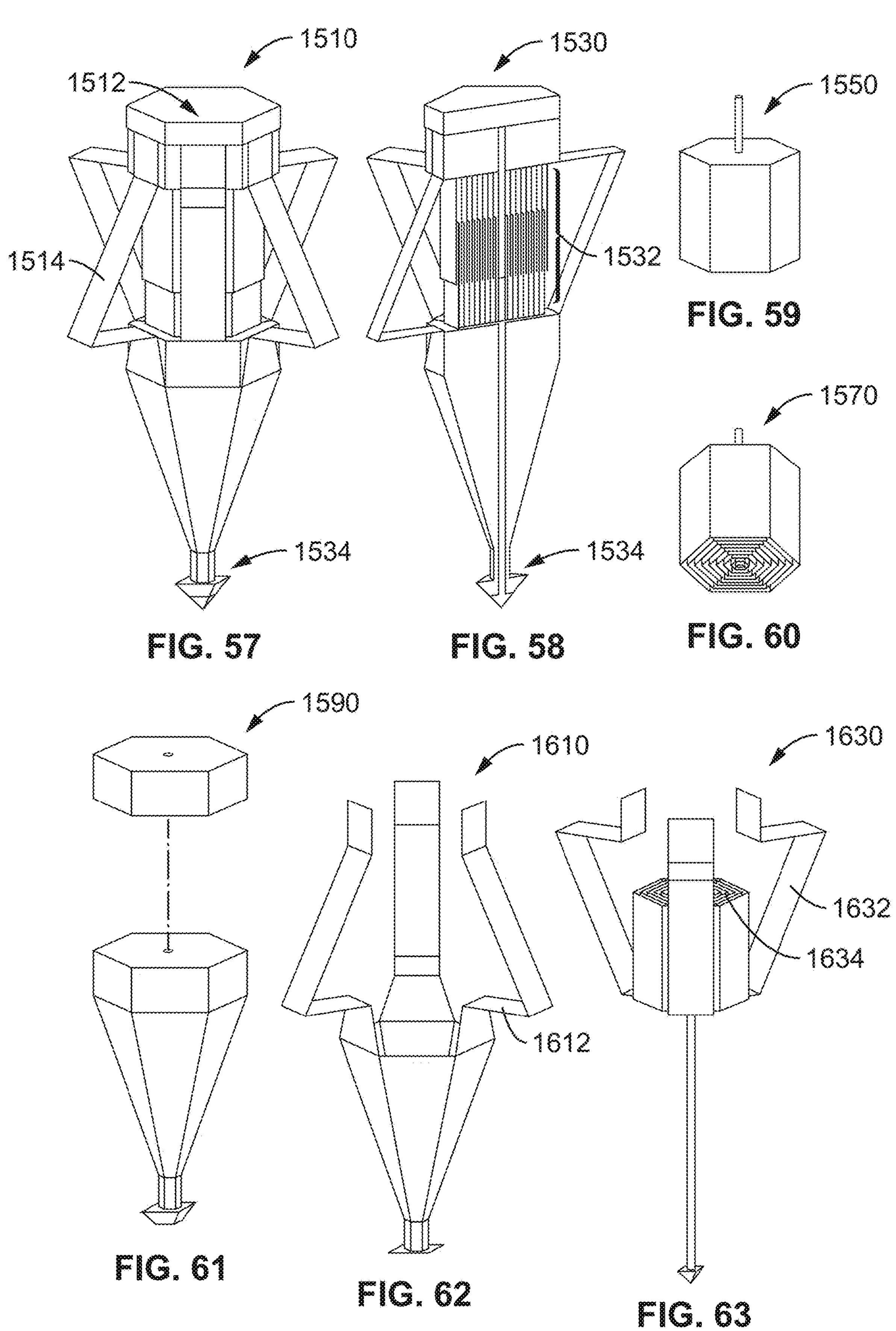
FIG. 57 through 64 are pictorial diagrams of a 3D micro-sized MNN, according to at least one embodiment of the present disclosure.
Figure 64:
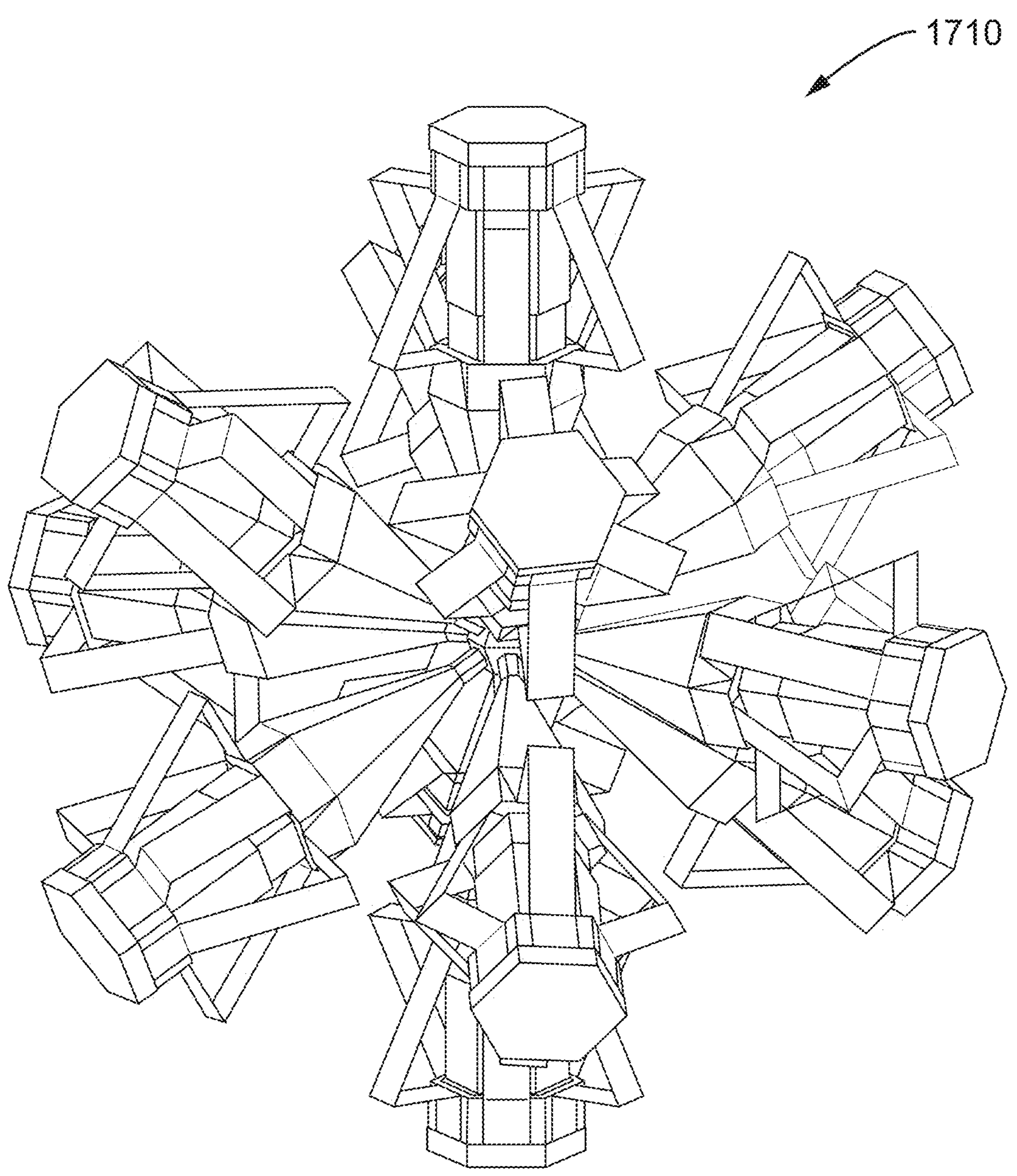

FIG. 55 and FIG. 56 illustrate 1410, 1420 plots of the final mean-squared error (MSE) in FIG. 61, and number of iterations generated by the simulation tool in FIG. 56, for a 7-layer lattice consisting of beams from FIG. 43 that attempt to learn different numbers of random behaviors.

This plot demonstrates that the 7-layer lattice, made of beams from FIG. 43, would not be able to accurately learn more than approximately 10 different behaviors of the kind generated. The plot plateaus at the worst MSE that the lattice produces when it is not able to learn the behaviors attempted. A binary-stiffness MNN lattice with more layers that consists of beams with larger differences in axial stiffness and smaller low-stiffness states could successfully learn substantially more behaviors (particularly if the behaviors were easier to learn with output node displacement limits that are smaller).

The number of iterations (defined in Section 7.3.1) generated for each attempt at learning the random behaviors simulated in the plot of FIG. 55 are also provided in the plot of FIG. 56. It should be noted from the trend of the plot that it takes the binary-stiffness MNN lattice more time to learn additional behaviors because the input nodes need to be loaded and the resulting displacements of the output nodes need to be measured for every behavior attempted in the learning process.

7.4. Conclusions on Binary Stiffness Beams

The present disclosure provides embodiments and studies how well mechanical neural-network (MNN) metamaterials that consist of binary-stiffness beams can learn desired shape-morphing behaviors. A binary-stiffness beam design is provided as an example and is used to inform the simulations of a computational tool used to conduct the studies. In general, it was determined that MNNs consisting of more layers of binary-stiffness beams that achieve larger differences in stiffness states with smaller low-stiffness states can learn more behaviors with higher accuracy but require more time to learn.

Such binary-stiffness MNNs can generally learn many behaviors simultaneously and with sufficient accuracy that their dramatic increase in learning speed coupled with their simplified design, fabrication requirements, and approach to learning justify them as a more practical solution to pursue for most MNN applications compared to other MNN approaches presented previously. Although this study was restricted to characterizing binary-stiffness MNNs that learned shape-morphing behaviors, such MNNs could learn many other kinds of quasi-static and dynamic behaviors using the same learning approach presented here. Thus, this present disclosure could enable a host of applications including armor that learns to redirect shock waves most effectively to minimize damage to what is being protected, buildings that learn to minimally shake during earthquakes of unanticipated and changing kind and magnitude, and aircraft wings that learn to optimally change their shape in response to fluctuating wind conditions to optimize fuel efficiency and increase maneuverability.

8. 3D Micro-sized Mechanical Neural Network

The present disclosure also describes the design of a 3D micro-sized mechanical neural network (MNN). This design is configured to allow filling practical 3D volumes of any size and shape using the periodic lattice design.

FIG. 57 through FIG. 64 illustrates an example embodiment of a 3D micro-sized mechanical neural network (MNN) in which the axial stiffness of each single beam is controlled. The device 1510 of FIG. 57 is configured for being repeated even in a micro-sized structure (i.e., less than 1 mm) unit cells as seen in the form of a rhombic dodecahedron 1710 in FIG. 64 having a unit cell consisting of 12 of the beams shown in FIG. 57. Then the structure 1710 of FIG. 64 can provide a building block which is connected to a plurality of other such blocks to create a 3D MNN material.

In FIG. 57 is shown 1510 a single beam in which axial stiffness of each single beam is controlled by an Integrated Circuit (IC) 1512 that can control their axial stiffness using closed-loop control. A series of flexures 1514 extend about the exterior, and one end extends down to a connection end 1534.

In FIG. 58 is shown 1530 a cross-section of a single beam showing its internal interleaved structure 1532 of combs. The IC chip of the beam can provide a voltage for controlling the conductive set of combs.

In FIG. 59 and FIG. 60 is shown 1550 and 1570, two different views of the actuator (e.g., comb structure) to actuate/contract the beam or it can be used to sense how much the beam is contracted or extended by reading its voltage. In this way the IC chip can perform closed-loop control to tune the axial stiffness of each beam for the purposes of MNN learning.

In FIG. 61 is shown some non-electrically conductive elements 1590, which only provide for a rigid structure, while providing insulation between opposite polarity drive voltages.

In FIG. 62 are shown 1610 elements which must be electrically conductive, comprising a portion of the bent flexures 1612. This conductive part connects to all the other beams in the lattice via the center of the unit cell and via the IC chips and thus can provide power to all the IC chips in the entire lattice if they are connected to a single lead. This conductive element is shown with multiple (depicted as three) bent blade flexures that stiffly constrain the beam to only be able to extend and contract along its axis. These flexures guide this translational deformation.

In FIG. 63 is shown another portion 1630 that must also be electrically conductive, but not in contact with the electrically conductive element shown in FIG. 62. This part also connects to all the other beams in the lattice through the center of the unit cell and with the IC chips and it should be used to provide electrical ground to all the IC chips in the entire lattice by connecting a single grounded lead to one of them. This element has bent blade flexures 1632 that help stiffly constrain the beam to only be able to extend and contract along its axis which will be grounded, while there is also shown the mating grounded end 1634 of the combs to help drive and sense the combs of FIG. 58 and FIG. 60. Since the combs can only produce a pulling force to contract the beams, they should all be biased to already be pulling inward a certain amount in the neutral position during operation. When the biased force is reduced, the beam will be extended by the flexures. In this way, the stiffness of the beam can be controlled in both directions (extending and contracting).

The entire lattice may for example be 3D printed, such as preferably using a process that can simultaneously print conductive and nonconductive materials. Present processes may require that a process halt be made to allow for a robotic arm to insert the IC chips. Finally, it should be noted that the design would have low power consumption requirements and would thus not generate significant heat because it relies on electrostatic comb drives.

9. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

A mechanical neural-network (MNN) apparatus, comprising: (a) a plurality of tunable beams configured for connection into a lattice of tunable beams of the MNN as a metamaterial; (b) wherein each of said plurality of tunable beams comprises an active actuator intermediate of its two distal ends, each of said distal ends configured as a node for attachment to one or more distal ends of other tunable beams of said plurality of tunable beams, or to fixed points; (c) a control circuit configured for providing proportional-derivative (PD) control for tuning axial displacement and/or stiffness in each of said plurality of tunable beams; (d) wherein said control circuit is configured for receiving a digital displacement signal (e[k]) as a difference between a reference offset value and a digital displacement feedback signal (wD[k]), in response to which said control circuit outputs a force drive signal (Fd[k]); (e) a digital-to-analog (DAC) converter is configured for converting the digital force drive signal (Fd[k]) to an analog signal for operating said active actuator of one of said plurality of tunable beams; (f) a sensor coupled to each of said plurality of tunable beams, for detecting stress and/or displacement, of the tunable beam; (g) an analog-to-digital converter (ADC) for converting an analog signal from the sensor into the digital displacement feedback signal (wD[k]); and (h) wherein said lattice of tunable beams of the MNN are configured for learning a set of properties by exposure to continuous external loads and to change its displacement and/or stiffness according to that learning in response to external load input.

A mechanical neural-network (MNN) apparatus, comprising: (a) a plurality of tunable beams configured for connection into a lattice of tunable beams of the MNN as a metamaterial; (b) wherein each of said plurality of tunable beams comprises an active actuator intermediate of its two distal ends, each of said distal ends configured as a node for attachment to one or more distal ends of other tunable beams of said plurality of tunable beams, or to fixed points; (c) a control circuit configured for providing proportional-derivative (PD) control for tuning axial displacement and/or stiffness in each of said plurality of tunable beams; (d) wherein said control circuit is configured for receiving a digital displacement signal (e[k]) as a difference between a reference offset value and a digital displacement feedback signal (wD[k]), in response to which said control circuit outputs a force drive signal (Fd[k]); (e) wherein said control circuit generates the force drive signal ($F_D$[k]), from the digital displacement signal (e[k]), by the following steps: (e)(i) obtaining a derivative of the digital displacement signal (e[k]), as a velocity signal (v[k]), which is multiplied by a derivative gain value (Kd) for the control circuit and which provides a damping coefficient; (e)(ii) receiving said digital displacement signal (e[k]) into a force displacement function (f(e[k])) which generates a force displacement output (x[k]) which determines force-displacement profiles for its associated beam; (e)(iii) multiplying said force displacement output (x[k]) by a proportional gain value (Kp) for the controller; (e)(iv) receiving said digital displacement signal (e[k]) into a flexure force function (g(e[k]) which is configured to output a signal which relates extension or contraction of said tunable beam along its axis to the force required to deform the tunable beam; (e)(v) performing a summation, wherein the velocity signal (v[k]) after being multiplied by the derivative gain value (Kd) is summed with the force displacement output (x[k]) after it is multiplied by the proportional gain value (Kp), and from this sum is subtracted the output of the flexure force function (g(e[k]), resulting in the summation outputting a force value (F(k)); and (e)(vi) receiving said force value (F(k)) into a calibration function which corrects for non-linearities of the actuator, and outputs the force drive signal ($F_D$[k]); (f) a digital-to-analog (DAC) converter is configured for converting the digital force drive signal (Fd[k]) to an analog signal for operating said active actuator of one of said plurality of tunable beams; (g) a sensor coupled to each of said plurality of tunable beams, for detecting stress and/or displacement, of the tunable beam; (h) an analog-to-digital converter (ADC) for converting an analog signal from the sensor into the digital displacement feedback signal (wD[k]); and (i) wherein said lattice of tunable beams of the MNN are configured for learning a set of properties by exposure to continuous external loads and to change its displacement and/or stiffness according to that learning in response to external load input.

A mechanical neural-network (MNN) apparatus, comprising: (a) a plurality of tunable beams configured for connection into a lattice of tunable beams of the MNN as a metamaterial; (b) wherein each of said plurality of tunable beams comprises an active actuator intermediate of its two distal ends, each of said distal ends configured as a node for attachment to one or more distal ends of other tunable beams of said plurality of tunable beams, or to fixed points; (c) a control circuit configured for providing proportional-derivative (PD) control for tuning axial displacement and/or stiffness in each of said plurality of tunable beams; (d) wherein said control circuit is configured for receiving a displacement signal (e[k]) as a difference between a reference offset value and a displacement feedback signal (wD[k]), in response to which said control circuit outputs a force drive signal (Fd[k]) for operating said active actuator of one of said plurality of tunable beams; (e) a sensor coupled to each of said plurality of tunable beams, for detecting stress and/or displacement, of the tunable beam as the displacement feedback signal (wD[k]); and (f) wherein said lattice of tunable beams of the MNN are configured for learning a set of properties by exposure to continuous external loads and to change its displacement and/or stiffness according to that learning in response to external load input.

A mechanical neural-network-based metamaterial configured to learn its properties.

A mechanical construct configured to learn its properties.

A metamaterial construct configured as a physical embodiment of an artificial neural network, wherein said construct is further configured to learn properties of the construct by exposure to external loads.

A mechanical neural network (MNN) that is configured to learn by tuning the stiffness of constituent beams in the MNN.

A mechanical construct configured as a physical embodiment of an artificial neural network, wherein said construct is further configured to learn properties of the construct by exposure to external loads.

A mechanical neural-network (MNN) comprising a plurality of layers of nodes, wherein said nodes analogous to the neurons within an artificial neural network.

A metamaterial construct comprising a lattice of tiny active beams that can be tuned to control their stiffness like the weights that are mathematically tuned in artificial neural networks to help the network learn to map inputs to desired outputs.

A microstructured architectured material configured to learn desired properties by means of a web of active flexible elements that constitute the material's microstructure.

The apparatus, method, construct, material, MNN, of any preceding implementation, wherein said control circuit generates the force drive signal ($F_D$[k]), from the digital displacement signal (e[k]), by the following steps: (a) obtaining a derivative of the digital displacement signal (e[k]), as a velocity signal (v[k]), which is multiplied by a derivative gain value (Kd) for the control circuit and which provides a damping coefficient; (b) receiving said digital displacement signal (e[k]) into a force displacement function (f(e[k])) which generates a force displacement output (x[k]) which determines force-displacement profiles for its associated beam; (c) multiplying said force displacement output (x[k]) by a proportional gain value (Kp) for the controller; (d) receiving said digital displacement signal (e[k]) into a flexure force function (g(e[k]) which is configured to output a signal which relates extension or contraction of said tunable beam along its axis to the force required to deform the tunable beam; (e) performing a summation, wherein the velocity signal (v[k]) after being multiplied by the derivative gain value (Kd) is summed with the force displacement output (x[k]) after it is multiplied by the proportional gain value (Kp), and from this sum is subtracted the output of the flexure force function (g(e[k]), resulting in the summation outputting a force value (F(k)); and (f) receiving said force value (F(k)) into a calibration function which corrects for non-linearities of the actuator, and outputs the force drive signal ($F_D$[k]).

The apparatus, method, construct, material, MNN, of any preceding implementation, wherein said lattice comprises a plurality of layers of nodes of said tunable beams.

The apparatus, method, construct, material, MNN, of any preceding implementation, wherein said lattice comprises a triangular lattice or square lattice of said tunable beams.

The apparatus, method, construct, material, MNN, of any preceding implementation, wherein said lattice comprises an irregular arrangement of said tunable beams.

The apparatus, method, construct, material, MNN, of any preceding implementation, wherein said lattice of tunable beams are arranged in two dimensions.

The apparatus, method, construct, material, MNN, of any preceding implementation, wherein said lattice of tunable beams are arranged in three dimensions.

The apparatus, method, construct, material, MNN, of any preceding implementation, wherein said lattice of tunable beams is configured to occupy areas, or volumes, of arbitrary shape.

The apparatus, method, construct, material, MNN, of any preceding implementation, wherein upon encountering a specific loading scenario, sensors in said lattice of tunable beams measure resulting displacements of nodes on the output side of the lattice of tunable beams, and determines mean squared error (MSE) of these displacements by subtracting them from target displacements and averaging the resulting differences squared; in response to this information said tunable beams update their stiffness values according to an optimization process, whereby in response to repeating this process resultant MSE is minimized until a working combination of beam stiffness values is identified.

The apparatus, method, construct, material, MNN, of any preceding implementation, wherein said active actuator comprises a voice coil.

The apparatus, method, construct, material, MNN, of any preceding implementation, wherein said active actuator comprises an actuator using conductive combs.

The apparatus, method, construct, material, MNN, of any preceding implementation, wherein said sensor comprises a strain gauge.

The apparatus, method, construct, material, MNN, of any preceding implementation, wherein said exposure to external loads is continuous.

The apparatus, method, construct, material, MNN, of any preceding implementation, wherein said exposure to external loads is continuous.

The apparatus, method, construct, material, MNN, of any preceding implementation, wherein the MNN is configured into three-dimensional lattices.

The apparatus, method, construct, material, MNN, of any preceding implementation, wherein the lattices occupy volumes of arbitrary shape.

The apparatus, method, construct, material, MNN, of any preceding implementation, wherein the beams are configured to be tuned using active actuators and sensors or using passive multi-stable elements.

The apparatus, method, construct, material, MNN, of any preceding implementation, wherein active flexible elements are joined together by rigid nodes.

The apparatus, method, construct, material, MNN, of any preceding implementation, wherein the material is an analogous physical embodiment of mathematical weights that determine values that are summed together by neurons within traditional artificial neural networks.

The apparatus, method, construct, material, MNN, of any preceding implementation, wherein by actively tuning the stiffness of active flexible elements in a similar fashion to how weights are trained within artificial neural networks, the material learns desired mechanical properties.

As used herein, the term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these groups of elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system, or method.

As used herein, the term "set" refers to a collection of one or more objects. Thus, for example, a set of objects can include a single object or multiple objects.

Relational terms such as first and second, top and bottom, upper and lower, left and right, and the like, may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, apparatus, or system, that comprises, has, includes, or contains a list of elements does not include only those elements but may include other elements not expressly listed or inherent to such process, method, article, apparatus, or system. An element proceeded by "comprises . . . a", "has . . . a", "includes . . . a", "contains . . . a" does not, without more constraints, preclude the existence of additional identical elements in the process, method, article, apparatus, or system, that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential feature or element of the technology described herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after the application is filed. Accordingly, the reader should consult the application as filed for the original content of the disclosure. Any deletion of content of the disclosure should not be construed as a disclaimer, forfeiture, or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure, but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A mechanical neural-network (MNN) apparatus, comprising:

(a) a plurality of tunable beams configured for connection into a lattice of tunable beams of the MNN as a metamaterial;

(b) wherein each of said plurality of tunable beams comprises an active actuator intermediate of its two distal ends, each of said distal ends configured as a node for attachment to one or more distal ends of other tunable beams of said plurality of tunable beams, or to fixed points;

(c) a control circuit configured for providing proportional-derivative (PD) control for tuning axial displacement and/or stiffness in each of said plurality of tunable beams;

(d) wherein said control circuit is configured for receiving a digital displacement signal (e[k]) as a difference between a reference offset value and a digital displacement feedback signal (wD[k]), in response to which said control circuit outputs a force drive signal (Fd[k]);

(e) a digital-to-analog (DAC) converter is configured for converting the digital force drive signal (Fd[k]) to an analog signal for operating said active actuator of one of said plurality of tunable beams;

(f) a sensor coupled to each of said plurality of tunable beams, for detecting stress and/or displacement, of the tunable beam;

(g) an analog-to-digital converter (ADC) for converting an analog signal from the sensor into the digital displacement feedback signal (wD[k]); and (h) wherein said lattice of tunable beams of the MNN are configured for learning a set of properties by exposure to continuous external loads and to change its displacement and/or stiffness according to that learning in response to external load input.

2. The apparatus of claim 1, wherein said control circuit generates the force drive signal ($F_D$[k]), from the digital displacement signal (e[k]), by the following steps:

(a) obtaining a derivative of the digital displacement signal (e[k]), as a velocity signal (v[k]), which is multiplied by a derivative gain value (Kd) for the control circuit, and which provides a damping coefficient;

(b) receiving said digital displacement signal (e[k]) into a force displacement function (f(e[k])) which generates a force displacement output (x[k]) which determines force-displacement profiles for its associated beam;

(c) multiplying said force displacement output (x[k]) by a proportional gain value (Kp) for the controller;

(d) receiving said digital displacement signal (e[k]) into a flexure force function (g(e[k]) which is configured to output a signal which relates extension or contraction of said tunable beam along its axis to the force required to deform the tunable beam;

(e) performing a summation, wherein the velocity signal (v[k]) after being multiplied by the derivative gain value (Kd) is summed with the force displacement output (x[k]) after it is multiplied by the proportional gain value (Kp), and from this sum is subtracted the output of the flexure force function (g(e[k]), resulting in the summation outputting a force value (F(k)); and (f) receiving said force value (F(k)) into a calibration function which corrects for non-linearities of the actuator, and outputs the force drive signal ($F_D$[k]).

3. The apparatus of claim 1, wherein said lattice comprises a plurality of layers of nodes of said tunable beams.

4. The apparatus of claim 1, wherein said lattice comprises a triangular lattice or square lattice of said tunable beams.

5. The apparatus of claim 1, wherein said lattice comprises an irregular arrangement of said tunable beams.

6. The apparatus of claim 1, wherein said lattice of tunable beams are arranged in two dimensions.

7. The apparatus of claim 1, wherein said lattice of tunable beams are arranged in three dimensions.

8. The apparatus of claim 1, wherein said lattice of tunable beams is configured to occupy areas, or volumes, of arbitrary shape.

9. The apparatus of claim 1, wherein upon encountering a specific loading scenario, sensors in said lattice of tunable beams measure resulting displacements of nodes on the output side of the lattice of tunable beams, and determines mean squared error (MSE) of these displacements by subtracting them from target displacements and averaging the resulting differences squared; in response to this information said tunable beams update their stiffness values according to an optimization process, whereby in response to repeating this process resultant MSE is minimized until a working combination of beam stiffness values is identified.

10. The apparatus of claim 1, wherein said active actuator comprises a voice coil.

11. The apparatus of claim 1, wherein said active actuator comprises an actuator using conductive combs.

12. The apparatus of claim 1, wherein said sensor comprises a strain gauge.

13. A mechanical neural-network (MNN) apparatus, comprising:

(a) a plurality of tunable beams configured for connection into a lattice of tunable beams of the MNN as a metamaterial;

(b) wherein each of said plurality of tunable beams comprises an active actuator intermediate of its two distal ends, each of said distal ends configured as a node for attachment to one or more distal ends of other tunable beams of said plurality of tunable beams, or to fixed points;

(c) a control circuit configured for providing proportional-derivative (PD) control for tuning axial displacement and/or stiffness in each of said plurality of tunable beams;

(d) wherein said control circuit is configured for receiving a digital displacement signal (e[k]) as a difference between a reference offset value and a digital displacement feedback signal (wD[k]), in response to which said control circuit outputs a force drive signal (Fd[k]);

(e) wherein said control circuit generates the force drive signal ($F_D$[k]), from the digital displacement signal (e[k]), by the following steps:

(i) obtaining a derivative of the digital displacement signal (e[k]), as a velocity signal (v[k]), which is multiplied by a derivative gain value (Kd) for the control circuit, and which provides a damping coefficient;

(ii) receiving said digital displacement signal (e[k]) into a force displacement function (f(e[k])) which generates a force displacement output (x[k]) which determines force-displacement profiles for its associated beam;

(iii) multiplying said force displacement output (x[k]) by a proportional gain value (Kp) for the controller;

(iv) receiving said digital displacement signal (e[k]) into a flexure force function (g(e[k]) which is configured to output a signal which relates extension or contraction of said tunable beam along its axis to the force required to deform the tunable beam;

(v) performing a summation, wherein the velocity signal (v[k]) after being multiplied by the derivative gain value (Kd) is summed with the force displacement output (x[k]) after it is multiplied by the proportional gain value (Kp), and from this sum is subtracted the output of the flexure force function (g(e[k]), resulting in the summation outputting a force value (F(k)); and (vi) receiving said force value (F(k)) into a calibration function which corrects for non-linearities of the actuator, and outputs the force drive signal ($F_D$[k]);

(f) a digital-to-analog (DAC) converter is configured for converting the digital force drive signal (Fd[k]) to an analog signal for operating said active actuator of one of said plurality of tunable beams;

(g) a sensor coupled to each of said plurality of tunable beams, for detecting stress and/or displacement, of the tunable beam;

(h) an analog-to-digital converter (ADC) for converting an analog signal from the sensor into the digital displacement feedback signal (wD[k]); and (i) wherein said lattice of tunable beams of the MNN are configured for learning a set of properties by exposure to continuous external loads and to change its displacement and/or stiffness according to that learning in response to external load input.

14. The apparatus of claim 13, wherein said lattice comprises a plurality of layers of nodes of said tunable beams.

15. The apparatus of claim 13, wherein said lattice comprises a triangular lattice or square lattice of said tunable beams.

16. The apparatus of claim 13 wherein said lattice comprises a random arrangement of said tunable beams.

17. The apparatus of claim 13, wherein said lattice of tunable beams are arranged in two dimensions.

18. The apparatus of claim 13, wherein said lattice of tunable beams are arranged in three dimensions.

19. The apparatus of claim 13, wherein said lattice of tunable beams is configured to occupy areas, or volumes, of arbitrary shape.

20. The apparatus of claim 13, wherein upon encountering a specific loading scenario, the lattice sensors measure resulting displacements of nodes on the output side of the lattice of tunable beams and determines mean squared error (MSE) of these displacements by subtracting them from target displacements and averaging the resulting differences squared; in response to this said tunable beams update their stiffness values according to an optimization process, whereby in response to repeating this process resultant MSE is minimized until a working combination of beam stiffness values is identified.

21. The apparatus of claim 13, wherein said active actuator comprises a voice coil.

22. The apparatus of claim 13, wherein said active actuator comprises an actuator using conductive combs.

23. The apparatus of claim 13, wherein said sensor comprises a strain gauge.

24. A mechanical neural-network (MNN) apparatus, comprising:

(a) a plurality of tunable beams configured for connection into a lattice of tunable beams of the MNN as a metamaterial;

(b) wherein each of said plurality of tunable beams comprises an active actuator intermediate of its two distal ends, each of said distal ends configured as a node for attachment to one or more distal ends of other tunable beams of said plurality of tunable beams, or to fixed points;

(c) a control circuit configured for providing proportional-derivative (PD) control for tuning axial displacement and/or stiffness in each of said plurality of tunable beams;

(d) wherein said control circuit is configured for receiving a displacement signal (e[k]) as a difference between a reference offset value and a displacement feedback signal (wD[k]), in response to which said control circuit outputs a force drive signal (Fd[k]) for operating said active actuator of one of said plurality of tunable beams;

(e) a sensor coupled to each of said plurality of tunable beams, for detecting stress and/or displacement, of the tunable beam as the displacement feedback signal (wD[k]); and (f) wherein said lattice of tunable beams of the MNN are configured for learning a set of properties by exposure to continuous external loads and to change its displacement and/or stiffness according to that learning in response to external load input.

* * * * *